US012755526B2

(12) United States Patent
Omari et al.

(10) Patent No.: US 12,755,526 B2
(45) Date of Patent: Oct. 6, 2026

(54) SUBJECT TRACKING SYSTEMS FOR A MOVABLE IMAGING SYSTEM

(71) Applicant: GoPro, Inc., San Mateo, CA (US)

(72) Inventors: Sammy Omari, Zurich (CH); Joseph A. Enke, Campbell, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/405,395

(22) Filed: Jan. 5, 2024

(65) Prior Publication Data

US 2024/0144669 A1 May 2, 2024

Related U.S. Application Data

(63) Continuation of application No. 16/878,240, filed on May 19, 2020, now Pat. No. 11,869,234, which is a (Continued)

(51) Int. Cl.

*G06V 20/13* (2022.01)
*B64U 10/13* (2023.01)

(Continued)

(52) U.S. Cl.

CPC ............. *G06V 20/13* (2022.01); *B64U 10/13* (2023.01); *G01S 13/76* (2013.01); *G01S 13/878* (2013.01);

(Continued)

(58) Field of Classification Search

CPC ........ G06V 20/13; G06V 20/17; B64U 10/13; B64U 2101/30; B64U 2201/104;

(Continued)

(56) References Cited

U.S. PATENT DOCUMENTS 9,177,229 B2 11/2015 Merler
9,696,404 B1 7/2017 Doyle (Continued)

OTHER PUBLICATIONS

Jardetzky et al., Storage and synchronization for distributed continuous media, 1995 (Year: 1995).

*Primary Examiner* — Francis Geroleo

(74) *Attorney, Agent, or Firm* — Young Basile Hanlon & MacFarlane, P.C.

(57) ABSTRACT

A method provides capturing successive video image frames with an imaging device to generate a video. Processing the successive video image frames to determine positions of multiple subjects with the successive video image frames. Obtaining information for the multiple subjects from one or more sensors physically attached to respective ones of the multiple subjects. Determining a region of interest containing the multiple subjects in the successive video image frames of the video. Obtaining additional video image frames that include the multiple subjects. Processing the additional video image frames so that the one or more multiple subjects are maintained within the additional video image frames. Identifying a single subject out of the multiple subjects within the additional video image frames. Providing live videos that include the single subject to a sharing service via an application in communication with the imaging device regarding the single subject.

20 Claims, 30 Drawing Sheets

Related U.S. Application Data continuation of application No. 15/918,694, filed on Mar. 12, 2018, now abandoned, which is a continuation-in-part of application No. 15/656,559, filed on Jul. 21, 2017, now Pat. No. 10,636,150.

(60) Provisional application No. 62/372,549, filed on Aug. 9, 2016, provisional application No. 62/364,960, filed on Jul. 21, 2016.

(51) Int. Cl.

| | |
|---|---|
| ***B64U 101/30*** | (2023.01) |
| ***G01S 13/76*** | (2006.01) |
| ***G01S 13/87*** | (2006.01) |
| ***G06T 7/246*** | (2017.01) |
| ***G06V 20/17*** | (2022.01) |
| ***H04N 23/695*** | (2023.01) |

(52) U.S. Cl.
CPC .............. *G06T 7/248* (2017.01); *G06V 20/17* (2022.01); *H04N 23/695* (2023.01); *B64U 2101/30* (2023.01); *B64U 2201/104* (2023.01)

(58) Field of Classification Search
CPC ....... G01S 13/76; G01S 13/878; G06T 7/248; H04N 23/695
See application file for complete search history.

(56) References Cited

U.S. PATENT DOCUMENTS

| | | | | |
|---|---|---|---|---|
| 9,769,387 | B1 | 9/2017 | Beard | |
| 10,187,580 | B1 | 1/2019 | Beard | |
| 10,636,150 | B2 | 4/2020 | Omari | |
| 10,768,639 | B1 | 9/2020 | Meisenholder | |
| 11,869,234 | B2 | 1/2024 | Omari | |
| 2008/0267451 | A1 | 10/2008 | Karazi | |
| 2012/0062732 | A1* | 3/2012 | Marman | G06T 7/277 348/142 |
| 2013/0058525 | A1 | 3/2013 | Sugio | |
| 2014/0003661 | A1 | 1/2014 | Kwon | |
| 2014/0336848 | A1 | 11/2014 | Saund | |
| 2015/0109457 | A1* | 4/2015 | Stout | H04N 5/222 348/169 |
| 2015/0154447 | A1 | 6/2015 | Wilson | |
| 2015/0179219 | A1 | 6/2015 | Gao | |
| 2015/0279021 | A1 | 10/2015 | Wu | |
| 2016/0018822 | A1 | 1/2016 | Nevdahs | |
| 2016/0092739 | A1 | 3/2016 | Oami | |
| 2017/0083748 | A1* | 3/2017 | Zhou | G06F 18/211 |
| 2017/0203840 | A1* | 7/2017 | Myslinski | B64D 5/00 |
| 2017/0300759 | A1 | 10/2017 | Beard | |
| 2018/0025498 | A1 | 1/2018 | Omari | |
| 2018/0095459 | A1* | 4/2018 | Bachrach | G06F 3/00 |
| 2018/0204331 | A1 | 7/2018 | Omari | |
| 2019/0096069 | A1 | 3/2019 | Qian | |
| 2020/0349721 | A1 | 11/2020 | Omari | |

* cited by examiner

SUBJECT TRACKING SYSTEMS FOR A MOVABLE IMAGING SYSTEM

CROSS-REFERENCE TO RELATED APPLICATION(S)

This application is a continuation of U.S. application Ser. No. 16/878,240, filed May 19, 2020, which is a continuation of U.S. application Ser. No. 15/918,694, filed Mar. 12, 2018, which is a continuation-in-part of U.S. application Ser. No. 15/656,559, filed Jul. 21, 2017, now U.S. Pat. No. 10,636,150, which claims priority to and the benefit of U.S. Provisional Application No. 62/372,549, filed Aug. 9, 2016, and U.S. Provisional Application No. 62/364,960, filed Jul. 21, 2016, the entire disclosures of which are incorporated by reference herein.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to subject tracking systems for a movable imaging platform including enhancements to location prediction, trajectory generation, voice command recognition, compositional technique, and system architecture and data-flow for tracking and synchronization.

BACKGROUND

It is desirable in many circumstances to be able to track a particular subject when recording video. Providing tracking commands to a movable imaging platform using manually operated controls may be too difficult and complex in certain situations, such as a situation where the operator of the movable imaging platform is also a subject to be tracked.

A tracking system works best when locations of the movable imaging platform and subject can be accurately known. Global Positioning System receivers can be utilized to provide a reasonable degree of accuracy, but they are not ideal in all circumstances.

It is also desirable in many circumstances to be able to track a particular subject when recording video. Once a subject has been identified in a video stream by a subject tracking system, the tracking system may automatically or semi-automatically frame the subject within the video. Furthermore, it may be desirable to limit the region in which an aerial-based subject tracking system operates in order ensure the safety of the user and at the same time ensure that the tracking system continues to function robustly.

SUMMARY

A movable imaging system may include a movable imaging assembly (MIA), such as an unmanned aerial vehicle (UAV), that has a movable imaging device, such as a camera, attached to it. The movable imaging system may also include a controller or external device that is communicatively connected to the MIA using, e.g., a wireless link.

According to an implementation, a method is provided for tracking a subject with an imaging system forming a part of a movable imaging assembly. The method incudes capturing an image frame using an imaging sensor of the imaging system and locating the subject within a region of interest in the image frame. The region of interest is determined utilizing a motion model and data from a sensor associated with the subject or the movable imaging assembly. The method can also include transferring the image frame to an external device that is connected to the MIA, displaying the transferred image frame on an external display of the external device, and displaying a bounding box around the subject in a position based on a position of the region of interest.

According to another implementation, a method is provided for tracking a subject with an imaging system forming a part of a movable imaging assembly. The method includes capturing a first image frame using an imaging sensor of the imaging system and locating the subject within the first image frame at a first set of frame coordinates. The method then includes capturing a second image frame using the imaging sensor and locating the subject within the second image frame at a second set of frame coordinates. The method further includes capturing a third image frame using the imaging sensor, determining a third set of frame coordinates at which the subject is predicted to be using a motion model and based on the first frame coordinates and the second frame coordinates, and defining a region of interest having a predefined boundary based on the third set of frame coordinates. Finally, the method includes locating the subject by searching within the region of interest.

According to another implementation, a method is provided for tracking a subject with an imaging system forming part of an MIA. The method includes specifying a constraint on movement that limits motion of the MIA relative to a frame of reference that is the target or a fixed global positioning satellite system frame and moving the MIA in accordance with the specified constraints while capturing image frames with an image sensor of the imaging system.

According to another implementation, a method is provided for tracking a target with an imaging system forming part of an MIA. The method includes defining a movable first volume positioned relative to the target having a first boundary within which the MIA may allowably move during flight. The method then includes defining a movable second volume positioned relative to the target and contained within the first volume having a second boundary within which the MIA may not allowably move during flight. The method further includes receiving, by the MIA, a movement command to a trajectory point within the second volume and moving the MIA to a modified trajectory point within the first volume that is not within the second volume and that is proximate to the trajectory point. Finally, the method includes capturing an image with an image sensor of the imaging system while the MIA is at the modified trajectory point.

According to another implementation, a method is provided for tracking a target with an imaging system forming part of an MIA. The method includes selecting a compositional technique defining a composition to apply for image frames captured with an image sensor of the imaging system, detecting a movement of the target, calculating an MIA trajectory point to achieve the composition for image frames predicted to be captured with the image sensor based on the movement of the target, moving the MIA to the calculated trajectory point, and capturing one or more image frames with the imaging system at the calculated trajectory point.

According to another implementation, a method is provided for tracking a target with an imaging system forming part of an MIA that includes specifying a constraint on movement that limits motion of the MIA relative to a frame of reference (FOR) that is the target or a fixed global positioning satellite system frame. The method also includes moving the MIA in accordance with the specified constraints while capturing image frames with an image sensor of the imaging system. In the method, the specifying of the constraint on movement includes receiving a voice command signal that is an audio signal or a digital reproduction of the audio signal, performing a speech-to-text conversion on the received voice command signal to produce converted text, searching a command database containing valid commands using the converted text to find a matching valid command that matches the converted text, and determining the constraint on movement based on the matching valid command.

According to another implementation, a method is provided for determining a distance between an MIA and a moving target being tracked by an imaging device of the MIA, including analyzing signals of ultra-wide-band transceivers (UWBTs) distributed between the MIA and the moving target, each of the UWBTs being affixed to one of the MIA and the moving target, determining a distance between the MIA and the moving target based on the analyzed signals, and providing the determined distance to a tracking system that is utilized by the MIA to track the moving target.

According to another implementation, a method is provided for tracking a subject with an imaging system forming part of an MIA. The method includes capturing a first image frame using an imaging sensor of the imaging system, transferring the first image frame to an external device that is connected to the MIA, locating the subject within the transferred first image frame at a first set of frame coordinates, displaying the transferred first image frame on an external display of the external device, and displaying a bounding box around the subject in the transferred first image frame on the external display. The method further includes capturing a second image frame using the imaging sensor, transferring the second image frame to the external device, locating the subject within the transferred second image frame at a second set of frame coordinates, displaying the transferred second image frame on the external display, and displaying a bounding box around the subject in the transferred second image frame on the external display. The method further includes capturing a third image frame using the imaging sensor, transferring the third image frame to the external device, and determining a third set of frame coordinates at which the subject is predicted to be using a motion model and based on the first frame coordinates and the second frame coordinates. Finally, the method further includes displaying a bounding box at a position related to the third set of frame coordinates on the external display.

A method for tracking a subject in successive image frames includes obtaining previous image frames with an imaging device, processing the previous image frames, obtaining motion information of the imaging device and a subject, determining a region of interest, obtaining a subsequent image frame, and processing the region of interest. The processing includes determining previous frame positions of the subject therein. The motion information is obtained with sensors physically associated with one or more of the imaging device and the subject. The region of interest is located in a predetermined spatial relationship relative to a predicted frame position of the subject.

A method for tracking a subject in successive image frames includes determining a predicted frame location of a subject, determining a region of interest, obtaining a subsequent image frame, and processing the region of interest to locate the subject. The predicted frame location is a location at which the subject is estimated to appear in a subsequent image frame to be obtained at a subsequent time. The determining of the region of interest includes determining the location of the region of interest to be in a predetermined spatial relationship relative to the predicted frame location. The obtaining of the subsequent image frame is performed at a subsequent time with an imaging device.

A movable imaging system includes a movable platform, an imaging device, and a tracking system. The movable platform is movable in real space. The imaging device is for capturing successive image frames that form a video, and is connected to the movable platform. The tracking system is for tracking a subject in the successive image frames. The tracking system locates a region of interest for a subsequent image frame at a predicted frame location of the subject in a future image frame. The predicted frame location is based on previous frame positions of the subject in the successive images, motion information of the imaging device, and motion information of the subject. The tracking system processes the region of interest of the future image frame to locate the subject in the future image frame.

In an implementation, a method is provided for controlling a movable imaging assembly having a movable platform and an imaging device coupled to and movable relative to the movable platform. The method includes receiving user inputs that define an MIA position relative to a target and a frame position of the target within image frames captured by the imaging device. The user inputs include a horizontal distance, a circumferential position, and a horizontal distance that define the MIA position, and include a horizontal frame position and a vertical frame position that define the frame position. The method further includes predicting a future position of the target for a future time, and moving the MIA to be in the MIA position at the future time and moving the imaging device for the target to be in the frame position for an image frame captured at the future time.

In an implementation, a method is provided for controlling a movable imaging assembly having a movable platform and an imaging device coupled to and movable relative to the movable platform. The method includes receiving user inputs that define an MIA position relative to a target and a frame position of the target within image frames captured by the imaging device. The method further includes predicting a future position of the target for a future time and moving the MIA to be in the MIA position at the future time and moving the imaging device for the target to be in the frame position for an image frame captured at the future time.

In an implementation, a method is provided for controlling a movable imaging assembly having a movable platform and an imaging device coupled to and movable relative to the movable platform. The method includes predicting a future zone position at a future time of one or more restricted zones defined relative to a target and in which the MIA is restricted from intruding. The method also includes predicting whether intended flight instructions will result in the MIA intruding the one or more restricted zones at the future time. The method also includes controlling the MIA according to the intended flight instructions if the MIA is predicted to not intrude the one or more restricted zones with the intended flight instructions, or controlling the MIA according to modified flight instructions if the MIA is predicted to intrude the one or more restricted zones with the intended flight instructions.

A method provides capturing video image frames with an imaging device to generate a video. Processing the video image frames to determine previous positions of multiple subjects. Obtaining motion information for the multiple subjects from one or more sensors physically attached to respective ones of the multiple subjects. Determining a region of interest in a video image frame of the video image frames containing the multiple subjects in a predefined spatial relationship. Obtaining additional video image frames that include the region of interest with the imaging device. Processing the additional video image frames so that the multiple subjects are maintained within the additional video image frames. Identifying the multiple subjects within the additional video image frames. Providing live videos that include the multiple subjects to a sharing service via an application of the imaging device.

A method provides capturing video image frames of multiple subjects to generate a video comprising the multiple subjects with an image capture device. Determining a location of the multiple subjects in the video image frames according to information from one or more sensors physically attached to the multiple subjects and information from the video image frames that were previously captured. Determining a region of interest of additional video image frames based on information from the one or more sensors. Obtaining the additional video image frames at a subsequent time with the image capture device. Processing the region of interest of the video image frames to locate the multiple subjects individually. Sharing video clips captured by the image capture device via an application that is in communication with a service and the image capture device.

An imaging system including a platform, an imaging device, sensors, and a tracking system. The imaging device is in communication with the platform and configured to capture video image frames that form a video. The sensors are associated with multiple subjects and the imaging device. The tracking system is configured to: maintain the multiple subjects in the video image frames by locating a region of interest for additional video image frames of the multiple subjects based on any previous positions of the multiple subjects. The tracking system generates motion information for respective ones of the multiple subjects using the respective sensors physically attached to the multiple subjects. The tracking system processes the region of interest to locate the multiple subjects in future video image frames. The tracking system frames the multiple subjects within the future video image frames by automatically or semi-automatically adjusting the imaging device. The tracking system locates one subject of the multiple subjects within the region of interest. The tracking system provides a link configured to provide a live preview of the video being captured so that the video is remotely displayed.

A method provides capturing successive video image frames with an imaging device to generate a video. Processing the successive video image frames to determine positions of multiple subjects with the successive video image frames. Obtaining information for the multiple subjects from one or more sensors physically attached to respective ones of the multiple subject. Determining a region of interest containing the multiple subjects in the successive video image frames of the video. Obtaining additional video image frames that include the multiple subjects. Processing the additional video image frames so that the one or more multiple subjects are maintained within the additional video image frames. Identifying a single subject out of the multiple subjects within the additional video image frames. Providing live videos that include the single subject to a sharing service via an application in communication with the imaging device regarding the single subject.

A method provides capturing video image frames of multiple subjects to generate a video comprising the multiple subjects with an image capture device. Locating the multiple subjects in the video image frames according to information from one or more sensors physically attached to the multiple subjects and information from the video image frames that were previously captured. Determining a region of interest of additional video image frames based on information from the one or more sensors. Obtaining the additional video image frames at a subsequent time with the image capture device. Processing the region of interest of the video image frames to locate the multiple subjects individually. Identifying a single subject that was located individually within the additional video image frames. Sharing video clips captured by the image capture device via an application that is in communication with a service and the image capture device regarding the single subject.

An imaging system including: a platform; an imaging device, and sensors. The imaging device in communication with the platform and configured to capture video image frames that form a video. The sensors associated with multiple subjects and the imaging device. The imaging device is configured to: maintain the multiple subjects in the video image frames by locating a region of interest for additional video image frames of the multiple subjects. Generate motion information for respective ones of the multiple subjects using the respective sensors physically attached to the multiple subjects. Process the region of interest to locate the multiple subjects in future video image frames. Automatically or semi-automatically focusing the imaging device on the region of interest. Locate a single subject of the multiple subjects within the region of interest. Provide a link configured to provide a live preview of the video being captured so that the video is remotely displayed regarding the single subject of the multiple subjects.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

All original Figures disclosed herein are © Copyright 2024 GoPro Inc. All rights reserved.

DETAILED DESCRIPTION

Implementations of the present technology will now be described in detail with reference to the drawings, which are provided as illustrative examples to enable those skilled in the art to practice the technology. The figures and examples below are not meant to limit the scope of the present disclosure to a single implementation or embodiment, but other implementations and embodiments are possible by way of interchange of or combination with some or all of the described or illustrated elements. Wherever convenient, the same reference numbers will be used throughout the drawings to refer to same or like parts.

Figure 1:
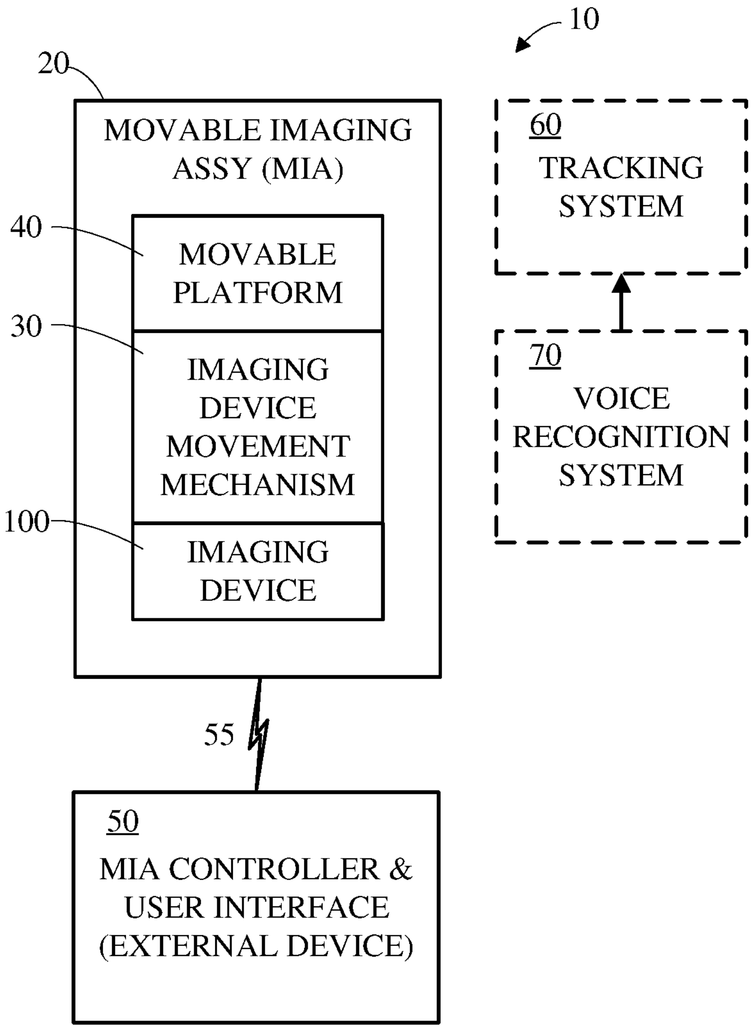
FIG. 1 is a block diagram of a movable imaging system and high-level components according to various implementations of this disclosure.

FIG. 1 is a block diagram of a movable imaging system 10 and high-level components according to various implementations of this disclosure. The movable imaging system 10 may have two primary components: a movable imaging assembly or MIA 20 and an external device 50, such as an MIA controller with a user interface. These components may be communicatively connected via a link 55. The link 55 may be wireless or wired. Other components may also be included within the movable imaging system 10. For example, the MIA 20 may comprise an imaging device 100, such as a camera (as used herein, the term "camera" is defined broadly to include any form of imaging device) that can be used to capture still and video images. The MIA 20 may include a movable platform 40 that can be moved positionally and/or rotationally with respect to a fixed reference ground. The MIA 20 may also include an imaging device movement mechanism 30 that allows the imaging device 100 to move positionally and/or rotationally with respect to the movable platform 40.

In some implementations, the external device 50 may correspond to a smartphone, a tablet computer, a phablet, a smart watch, a portable computer, and/or another device configured to receive user input and communicate information with the imaging device 100, imaging device movement mechanism 30, and/or movable platform 40 individually, or with the MIA 20 as a whole.

In one or more implementations, the link 55 may utilize any wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the link 55 may be effectuated using a wired interface, e.g., HDMI, USB, digital video interface, display port interface (e.g., digital display interface developed by the Video Electronics Standards Association (VESA), Ethernet, Thunderbolt), and/or other interface.

The UI of the external device 50 may operate a software application (e.g., GoPro Studio®, GoPro App®, and/or other application) configured to perform a variety of operations related to camera configuration, control of video acquisition, and/or display of video captured by the imaging device 100. An application (e.g., GoPro App)® may enable a user to create short video clips and share video clips to a cloud service (e.g., Instagram®, Facebook®, YouTube®, Dropbox®); perform full remote control of imaging device 100 functions; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 100 and/or displaying the captured information.

By way of an illustration, the UI of the external device 50 may receive a user setting characterizing image resolution (e.g., 3840 pixels by 2160 pixels), frame rate (e.g., 60 frames per second (fps)), and/or other settings (e.g., location) related to an activity (e.g., mountain biking) being captured by the user. The UI of the external device 50 may communicate these settings to the imaging device 100 via the link 55.

A user may utilize the UI of the external device 50 to view content acquired by the imaging device 100. A display of the UI of the external device 50 may act as a viewport into a 3D space of the content. In some implementations, the UI of the external device 50 may communicate additional information (e.g., metadata) to the imaging device 100. By way of an illustration, the UI of the external device 50 may provide orientation of the UI of the external device 50 with respect to a given coordinate system to the imaging device 100 to enable determination of a viewport location or dimensions for viewing of a portion of the panoramic content, or both. By way of an illustration, a user may rotate (sweep) the UI of the external device 50 through an arc in space. The UI of the external device 50 may communicate display orientation information to the imaging device 100 using a communication interface such as link 55. The imaging device 100 may provide an encoded bitstream configured to enable viewing of a portion of the content corresponding to a portion of the environment of the display location as the imaging device 100 traverses the path. Accordingly, display orientation information sent from the UI of the external device 50 to the imaging device 100 allows user selectable viewing of captured image and/or video.

In many instances, it is desirable to track a target (which may include one or more subjects) with the MIA 20. Various forms of tracking may be utilized, including those discussed below and in U.S. Provisional Patent Application Ser. No. 62/364,960, filed Jul. 21, 2016, and herein incorporated by reference in its entirety. A tracking system 60 may be utilized to implement the described forms of tracking. The tracking system 60 may comprise a processor and algorithms that are used for tracking the target. The tracking system 60 is shown in dashed lines since it may be included entirely within the MIA 20 or entirely within the external device 50, or portions of the tracking system 60 may be located or duplicated within each of the MIA 20 and the external device 50. The tracking system 60 may control the MIA 20, the imaging device movement mechanism 30, and/or the imaging device 100 to locate a subject S within successive image frames and/or to physically move the MIA 20 and/or the imaging device 100 to maintain the subject S within a field of view of the imaging device 100, even as the subject S moves in real space and/or relative to the MIA 20. A voice recognition system 70 may also be utilized to interact with the tracking system 60. The voice recognition system 70 is defined in more detail below.

Figure 2A:
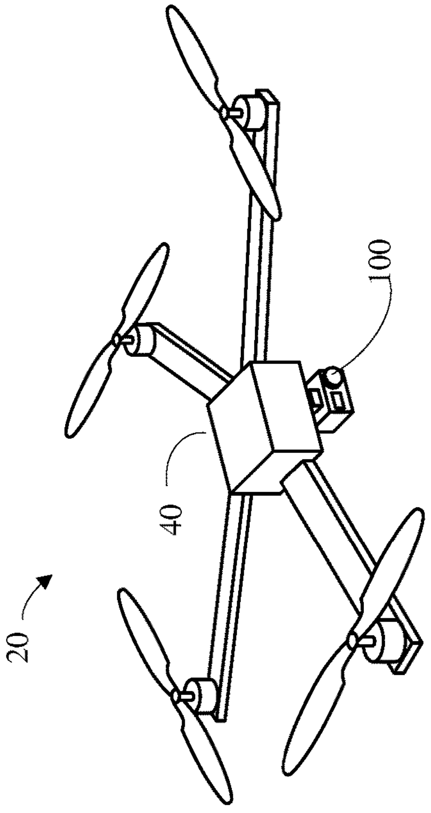
FIG. 2A is a pictorial illustration of the MIA according to an implementation.

FIGS. 2A-2D are pictorial illustrations of implementations of the components shown in FIG. 1. FIG. 2A is a pictorial illustration of the MIA 20 according to an implementation. In the implementation shown, the MIA 20 includes a movable platform 40 that is a quadcopter drone, but the invention is not limited to this implementation. The MIA 20 could be any form of an aerial vehicle or any form of movable device that is movable with respect to a fixed ground, which could include movable mechanical systems that are tied to the earth. As shown in FIG. 2A, the imaging device 100 is fixedly mounted in the front of the movable platform 40 so that it points in a direction along an axis of the movable platform 40. However, in various implementations, the mounting of the imaging device 100 to the movable platform 40 is done using the imaging device movement mechanism 30.

Figure 2B:
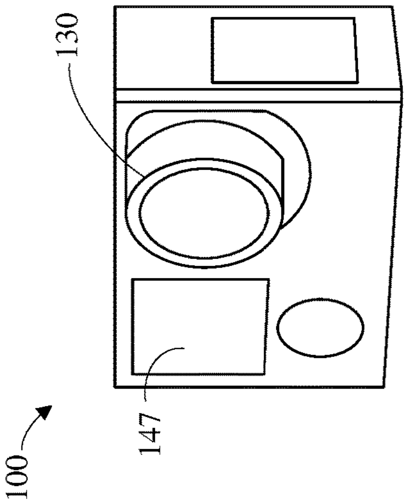
FIG. 2B is a pictorial illustration of the imaging device according to an implementation.

FIG. 2B is a pictorial illustration of the imaging device 100. In FIG. 2B, the imaging device 100 is a GoPro Hero4® camera, however any type of imaging device 100 may be utilized. The imaging device 100 may include a video camera device. FIG. 2B also shows a lens 130 of the camera, along with a display 147 (e.g., display screen).

Figure 2C:
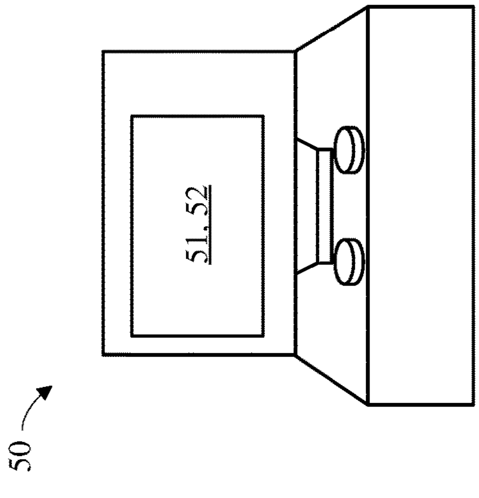
FIG. 2C is a pictorial illustration of an MIA controller and user interface according to an implementation.

FIG. 2C is a pictorial illustration of an external device 50, specifically, an MIA controller and user interface according to an implementation. The user interface may further comprise a display system 51 with a display device 52. The MIA controller may further comprise a communications interface via which it may receive commands both for operation of the movable platform 40, such as the UAV or drone, and operation of the imaging device 100. The commands can include movement commands, configuration commands, and other types of operational control commands.

Figure 2D:
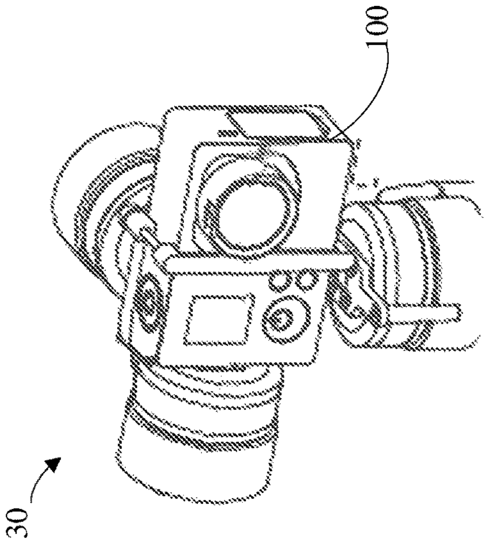
FIG. 2D is a pictorial illustration of the imaging device of FIG. 2B within a movement mechanism.

FIG. 2D is a pictorial illustration of the imaging device 100 within the imaging device movement mechanism 30. The imaging device movement mechanism 30 couples the imaging device 100 to the movable platform 40. The implementation of the imaging device movement mechanism 30 shown in FIG. 2D is a three-axis gimbal mechanism that permits the imaging device 100 to be rotated about three independent axes. However, the imaging device movement mechanism 30 may include any type of translational and/or rotational elements that permit rotational and/or translational movement in one, two, or three dimensions.

Figure 3:
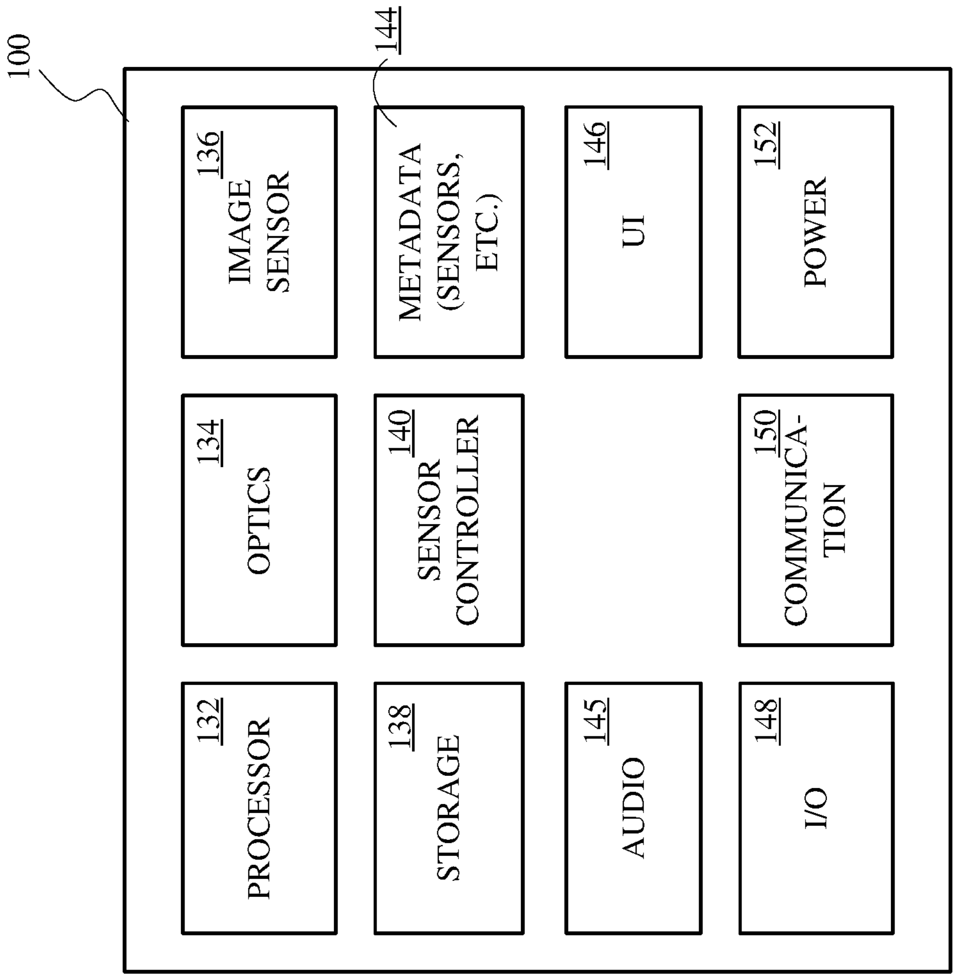
FIG. 3 is a block diagram illustrating components of an imaging device according to an implementation.

As illustrated in FIG. 3, which is a block diagram illustrating components of an imaging device 100 according to an implementation, the imaging device 100 may include a processor 132 which controls operation of the imaging device 100. In some implementations, the processor 132 may include a system on a chip (SOC), microcontroller, microprocessor, CPU, DSP, ASIC, GPU, and/or other processors that control the operation and functionality of the imaging device 100. The processor 132 may interface with mechanical, electrical, sensory, or power modules and/or a UI module 146 via driver interfaces and/or software abstraction layers. Additional processing and memory capacity may be used to support these processes. These components may be fully controlled by the processor 132. In some implementation, one or more components may be operable by one or more other control processes (e.g., a GPS receiver may include a processing apparatus configured to provide position and/or motion information to the processor 132 in accordance with a given schedule (e.g., values of latitude, longitude, and elevation at 10 Hz)).

The imaging device 100 may also include image optics 134 (e.g., optics module), which may include the lens 130 as an optical element of the imaging device 100. In some implementations, the lens 130 may be a fisheye lens that produces images having a fisheye (or near-fisheye) field of view (FOV). Other types of image optics 134 may also be utilized, such as, by way of non-limiting example, one or more of a standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, the optics module 134 may implement focus controller functionality configured to control the operation and configuration of the camera lens.

The optics module 134 may receive light from an object and couple received light to an image sensor 136, discussed below.

The imaging device 100 may include one or more image sensors 136 including, by way of non-limiting examples, one or more of a charge-coupled device (CCD) sensor, active pixel sensor (APS), complementary metal-oxide semiconductor (CMOS) sensor, N-type metal-oxide-semiconductor (NMOS) sensor, and/or other image sensor. The image sensor 136 may be configured to capture light waves gathered by the optics module 134 and to produce image(s) data based on control signals from a sensor controller 140, discussed below. The image sensor 136 may be configured to generate a first output signal conveying first visual information regarding an object. The visual information may include, by way of non-limiting example, one or more of an image, a video, and/or other visual information. The optics module 134 and the image sensor 136 may be embodied in a housing.

The imaging device may further include an electronic storage 138 (e.g., an electronic storage element) in which configuration parameters, image data, code for functional algorithms and the like may be stored. In some implementations, the electronic storage 138 may include a system memory module that is configured to store executable computer instructions that, when executed by the processor 132, perform various camera functionalities including those described herein. The electronic storage 138 may include storage memory configured to store content (e.g., metadata, images, audio) captured by the imaging device 100.

The electronic storage 138 may include non-transitory memory configured to store configuration information and/or processing code configured to enable, e.g., video information and metadata capture, and/or to produce a multimedia stream comprised of, e.g., a video track and metadata in accordance with the methodologies of the present disclosure. In one or more implementations, the processing configuration may include capture type (video, still images), image resolution, frame rate, burst setting, white balance, recording configuration (e.g., loop mode), audio track configuration, and/or other parameters that may be associated with audio, video, and/or metadata capture. Additional memory may be available for other hardware/firmware/software needs of the imaging device 100. The memory and processing capacity may aid in management of processing configuration (e.g., loading, replacement), operations during a startup, and/or other operations. Consistent with the present disclosure, the various components of the imaging device 100 may be remotely disposed from one another and/or aggregated. For example, one or more sensor components may be disposed distal from the imaging device 100. Multiple mechanical, sensory, or electrical units may be controlled by a learning apparatus via network/radio connectivity.

The processor 132 may interface to the sensor controller 140 in order to obtain and process sensory information for, e.g., object detection, face tracking, stereo vision, and/or other tasks.

The processor 132 may also interface one or more metadata sources 144 (e.g., metadata module). The metadata sources 144, in more detail, may include sensors such as an inertial measurement unit (IMU) including one or more accelerometers and/or gyroscopes, a magnetometer, a compass, a global positioning satellite (GPS) sensor, an altimeter, an ambient light sensor, a temperature sensor, a pressure sensor, a heart rate sensor, a depth sensor (such as radar, an infra-red-based depth sensor, such as a Kinect-style depth sensor, and a stereo depth sensor) and/or other sensors. The imaging device 100 may contain one or more other metadata/telemetry sources, e.g., image sensor parameters, battery monitor, storage parameters, and/or other information related to camera operation and/or capture of content. The metadata sources 144 may obtain information related to environment of the imaging device 100 and aspects in which the content is captured.

By way of a non-limiting example, the accelerometer may provide device motion information including acceleration vectors representative of motion of the imaging device 100, from which velocity vectors may be derived. The gyroscope may provide orientation information describing the orientation of the imaging device 100, the GPS sensor may provide GPS coordinates, time, and identifying location of the imaging device 100, and the altimeter may obtain the altitude of the imaging device 100. In some implementations, the metadata sources 144 may be rigidly coupled to the imaging device 100 such that any motion, orientation, or change in location of the imaging device 100 also occurs for the metadata sources 144.

The sensor controller 140 and/or the processor 132 may be operable to synchronize various types of information received from the metadata sources 144. For example, timing information may be associated with the sensor data. Using the timing information, metadata information may be related to content (photo/video) captured by the image sensor 136. In some implementations, the metadata capture may be decoupled from the video/image capture. That is, metadata may be stored before, after, and in-between one or more video clips and/or images. In one or more implementations, the sensor controller 140 and/or the processor 132 may perform operations on the received metadata to generate additional metadata information. For example, the processor 132 may integrate the received acceleration information to determine a velocity profile of the imaging device 100 during a recording of a video. In some implementations, video information may consist of multiple frames of pixels using any applicable encoding method (e.g., H.262, H.264, Cineform, and/or other codec). In some implementations, the imaging device 100 may include, without limitation, video, audio, capacitive, radio, vibrational, ultrasonic, infrared, radar, LIDAR and/or sonar, and/or other sensory devices.

The imaging device 100 may include audio devices 145, such as one or more microphones configured to provide audio information that may be associated with images acquired by the image sensor 136. Two or more microphones may be combined to form a microphone system that is directional. Such a directional microphone system can be used to determine the direction or location of a sound source and/or to eliminate undesirable noise originating in a particular direction. Various audio filters may be applied as well. The sensor controller 140 may receive image and/or video input from the image sensor 136 and audio information from the audio devices 145. In some implementations, audio information may be encoded using, e.g., AAC, AC3, MP3, linear PCM, MPEG-H, and/or other audio coding formats (audio codec). In one or more implementations of spherical video and/or audio, the audio codec may include a 3-dimensional audio codec. For example, an Ambisonics codec can produce full surround audio including a height dimension. Using a G-format Ambionics codec, a special decoder may not be required.

In some implementations, one or more external metadata devices (not shown) may interface to the imaging device 100 via a wired link (not shown), e.g., HDMI, USB, coaxial audio, and/or other interface. The metadata obtained by the imaging device 100 may be incorporated into the combined multimedia stream using any applicable known methodologies.

The imaging device 100 may include its own display (e.g., display 147 shown in FIG. 2B) as a part of its UI 146 (e.g., UI module). The display may be configured to provide information related to camera operation mode (e.g., image resolution, frame rate, capture mode, sensor mode, video mode, photo mode), connection status (connected, wireless, wired connection), power mode (e.g., standby, sensor mode, video mode), information related to metadata sources (e.g., heart rate, GPS), and/or other information. The UI 146 may include other components (e.g., one or more buttons) configured to enable the user to start, stop, pause, and/or resume sensor and/or content capture. User commands may be encoded using a variety of approaches, including but not limited to duration of button press (pulse width modulation), number of button presses (pulse code modulation), or a combination thereof. By way of an illustration, two short button presses may initiate sensor acquisition mode, and a single short button press may be used to communicate (i) initiation of video or photo capture and cessation of video or photo capture (toggle mode) or (ii) video or photo capture for a given time duration or number of frames (burst capture). Other user command or communication implementations may also be realized, e.g., one or more short or long button presses.

In some implementations, the UI 146 may include virtually various types of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the imaging device 100. The imaging device 100 may further include, in some implementations, an input/output or I/O module 148. The I/O module 148 may be configured to synchronize the imaging device 100 with other cameras and/or with other external devices, such as a remote control, a second capture device, a smartphone, the UI of the external device 50 of FIG. 1A, and/or a video server. The I/O module 148 may be configured to communicate information to/from various I/O components. In some implementations the I/O module 148 may include a wired and/or wireless communications interface (e.g., Wi-Fi, Bluetooth, USB, HDMI, Wireless USB, Near Field Communication (NFC), Ethernet, a radio frequency transceiver, and/or other interfaces) configured to communicate to one or more external devices (e.g., UI of the external device 50 in FIG. 1 and/or another metadata source). In some implementations, the I/O module 148 may interface with LED lights, a display, a button, a microphone, speakers, and/or other I/O components. In one or more implementations, the I/O module 148 may interface to an energy source, e.g., a battery, and/or a DC electrical source.

In some implementations, the I/O module 148 of the imaging device 100 may include one or more connections to external computerized devices to allow for, among other things, configuration and/or management of remote devices, e.g., as described above with respect to FIG. 1 and/or as described below with respect to FIG. 3. The I/O module 148 may include any of the wireless or wireline interfaces discussed above, and further, may include customized or proprietary connections for specific applications.

In some implementations, a communication device 150 may be coupled to the I/O module 148 and may include a component (e.g., a dongle) having an infrared sensor, a radio frequency transceiver and antenna, an ultrasonic transducer, and/or other communications interfaces used to send and receive wireless communication signals. In some implementations, the communication device 150 may include a local (e.g., Bluetooth, Wi-Fi) and/or broad range (e.g., cellular LTE) communications interface configured to enable communications between the imaging device 100 and a remote device (e.g., the UI of the external device 50 in FIG. 1). The communication device 150 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, the communication device 150 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication device 150 may be represented using formats including one or more of hypertext markup language (HTML), extensible markup language (XML), and/or other formats. One or more exchanges of information between the imaging device 100 and outside devices may be encrypted using encryption technologies including one or more of secure sockets layer (SSL), transport layer security (TLS), virtual private networks (VPNs), Internet Protocol security (IPsec), and/or other encryption technologies.

The imaging device 100 may include a power system 152 tailored to the needs of the applications of the imaging device 100. For example, for a small-sized, lower-power action camera having a wireless power solution (e.g. battery, solar cell, inductive (contactless) power source, rectification, and/or other power supply) may be used.

Location Prediction for Subject Tracking

Figure 4A:
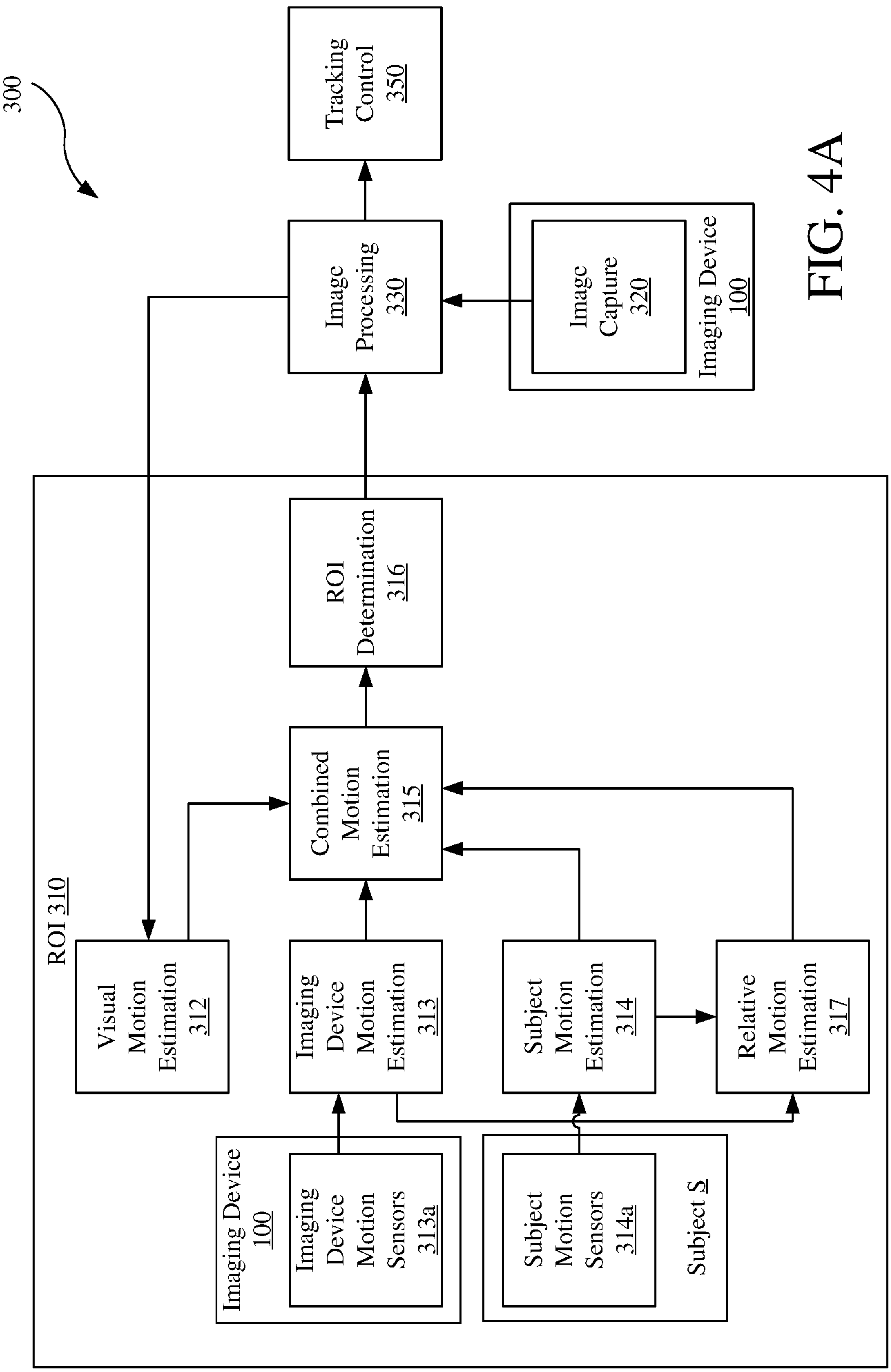
FIG. 4A is a block diagram of a tracking system.
Figure 4B:
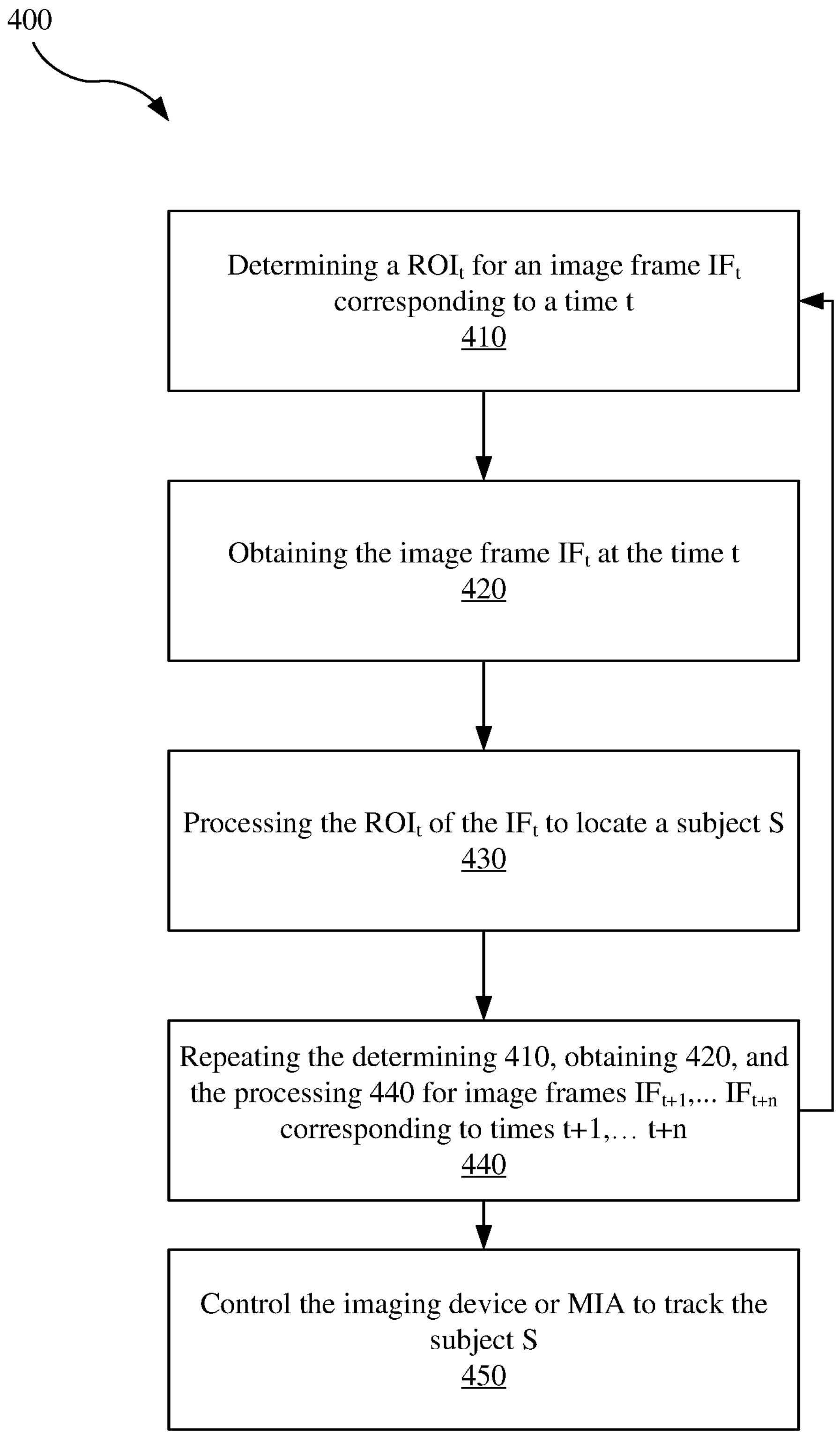
FIG. 4B is a is a flowchart of a technique for tracking a subject in video image frames, which may be implemented by the tracking system of FIG. 4A.

Referring to FIGS. 4A-4B, a tracking system 300 and a method or technique 400 are provided tracking a subject S in successive image frames obtained by the imaging device 100 (e.g., video). The tracking system 300 may be implemented wholly or partially by the tracking system 60. It may be desirable in many circumstances to track a particular subject when recording a video, such as by locating the subject in successive image frames of the video (e.g., identifying and determining frame positions of the subject), for example, to control the imaging device 100 and/or MIA 20 to ensure that the subject S remains in the image frames. Subject tracking may be difficult, for example, with simultaneous movement of the subject and the imaging device 100 and/or by taking significant time and/or consuming significant computing resources when large amounts of video data are capture (e.g., high resolution image frames, such as 4 k).

Rather than process (e.g., search) an entire image frame to locate (e.g., identify and/or determine a position of) the subject S therein, the technique 400 determines a region of interest (ROI) of the image frame to be processed. The ROI is a portion (e.g., window) of the image frame, which is smaller than the entire image frame and thereby requires less time and/or less computing resources to be processed than the entire image frame.

As shown in FIG. 4A, the tracking system 300 includes various modules performed by various hardware components to implement the technique 400, and may also include or be in communication with various sensors associated with the imaging device 100 and/or the subject S. The tracking system 300 and its various modules are introduced below at a high level with further description of the techniques implemented thereby discussed in still further detail below.

The modules may be included in and/or operated by various components of the movable imaging system 10 (e.g., the MIA 20, the imaging device 100, the external device 50, the tracking system 60, etc.). For example, the tracking system 300 includes a module 310 (e.g., an ROI module) for determining the ROI for a particular image frame, a module 320 (e.g., an image capture module) for obtaining the imaging frame, and a module 330 (e.g., an image processing module) for processing the image frame, such as the ROI of the image frame. The tracking system 300 may also include a module 350 (e.g., a tracking control module) for controlling the imaging device 100 and/or the MIA 20.

The ROI module 310 includes a module 312 (e.g., an estimation module, or visual motion estimation module) for determining a visual motion estimate (e.g., a visual motion estimation module), a module 313 for determining an imaging device motion estimate (e.g., an imaging device motion estimation module, and/or a module 314 for determining a subject motion estimate (e.g., a subject motion estimation module), along with a module 315 for determining a combined motion estimate (e.g., a combined motion estimation module), and a module 316 for determining the ROI (e.g., an ROI determination module). The ROI module 310 may further include a module 317 for determining relative motion between the subject S and the imaging device (e.g., a relative motion estimation module). Various of the modules may be omitted in accordance with the technique 400 and variations thereof described below.

The visual motion estimation module 312 may receive visual information from the imaging processing module 330, such as previous positions of the subject S in previously captured image frames, from which the visual motion estimate is determined.

The imaging device motion estimation module 313 may receive motion information of the imaging device 100, or other components of the MIA 20, such as the movable platform 40 and/or the imaging device movement mechanism 30, with motion sensors 313*a* physically associated therewith. The motion sensors 313*a* associated with the imaging device 100 may include the metadata sources 144. The imaging device motion estimate is determined from information received from the motion sensors 313*a*, as discussed in further detail below.

The subject device motion estimation module 314 may receive motion information of the subject S with motion sensors 314*a* physically associated therewith. For example, the motion sensors 314*a* may be sensors of the external device 50 being held or attached to the subject S. The subject device motion estimate is determined from the information received from the sensors 314*a*.

The relative motion estimation module 317 may, if included, receive visual information and/or motion information from the estimation modules 312, 313, 314 and/or the sensors 313*a*, 314*a*.

The combined motion estimation module 315 receives the estimates from the estimation modules 312, 313, 314, 317 from which the combined motion estimate is determined.

The ROI determination module 316 receives the combined motion estimate from which the size and/or position of the ROI is determined.

As shown in the flowchart of FIG. 4B, the technique 400, which may be implemented by the subject tracking system 300, generally includes operations of determining 410 the ROI for an image frame IF t corresponding to a time t, obtaining 420 the image frame IF t at the time t, and processing 430 the ROI of the image frame to locate a subject S within the image frame IFt, which may also include determining a size of the subject S in the image frame IFt. The technique 400 may further include repeating 440 the determining 410 (e.g., determining a new region of interest), the obtaining 420, and the processing 430 for still further image frames IFt+1, IFt+2, . . . . IFt+n to be obtained at subsequent times t+1, t+2, . . . t+n (e.g., related to a new subject or a third subject). The technique 400 may also include controlling 450 the imaging device 100 and/or the MIA 20 to track the subject S, for example, to maintain the subject S (e.g., a first subject, a second subject, or a third subject) in subsequent image frames. For example, the controlling 450 may include controlling the location and/or orientation of the movable platform 40 (e.g., using output devices, such as a rotor), the location and/or orientation of the imaging device 100 with respect to the movable platform 40 (e.g., by operating the imaging device movement mechanism 30), and/or by controlling the imaging device 100 (e.g., with a zoom function).

The image frame for which the ROI is determined may be referred to as a subsequent image frame or a future image frame. The determining 410 of the ROI may be performed in various manners described below, for example, by the ROI module 310. The obtaining 420 of the image frame is performed, for example, by the image capture module 320 with the imaging device 100, which may be part of the MIA 20, by capturing the image frame as discussed above. The processing 430 of the $ROI_t$ is performed for the image frame $IF_t$, for example, by the image processing module 330 with the imaging device 100, the MIA 20, the external device 50, and/or the tracking system 60 according to any suitable technique to determine the frame position $S_{POSt}$ in the image frame $IF_t$, such as by determining a centroid of the subject S.

The determining 410 of the ROI may be performed in various manners and may include determining a position of the ROI for the image frame and may further include determining a size of the ROI. For example, and as discussed in further detail below, ROI may be determined for a future image frame according to previous positions of the subject S within previously obtained image frames, motion of the imaging device 100, motion of the subject S, relative motion between the imaging device 100 and the subject S, or combinations thereof. Furthermore, the position of the ROI may be based on a position in which the subject S is predicted to be in the subsequent image frame. As used herein, the terms “frame position” or “subject frame position” refer to the position of the subject S in an image frame, which may include positions at which the subject S has been determined to be located in obtained image frames and may also include a position at which the subject S is located in an obtained image frame that has yet to be processed for locating the subject S therein.

Figure 5A:
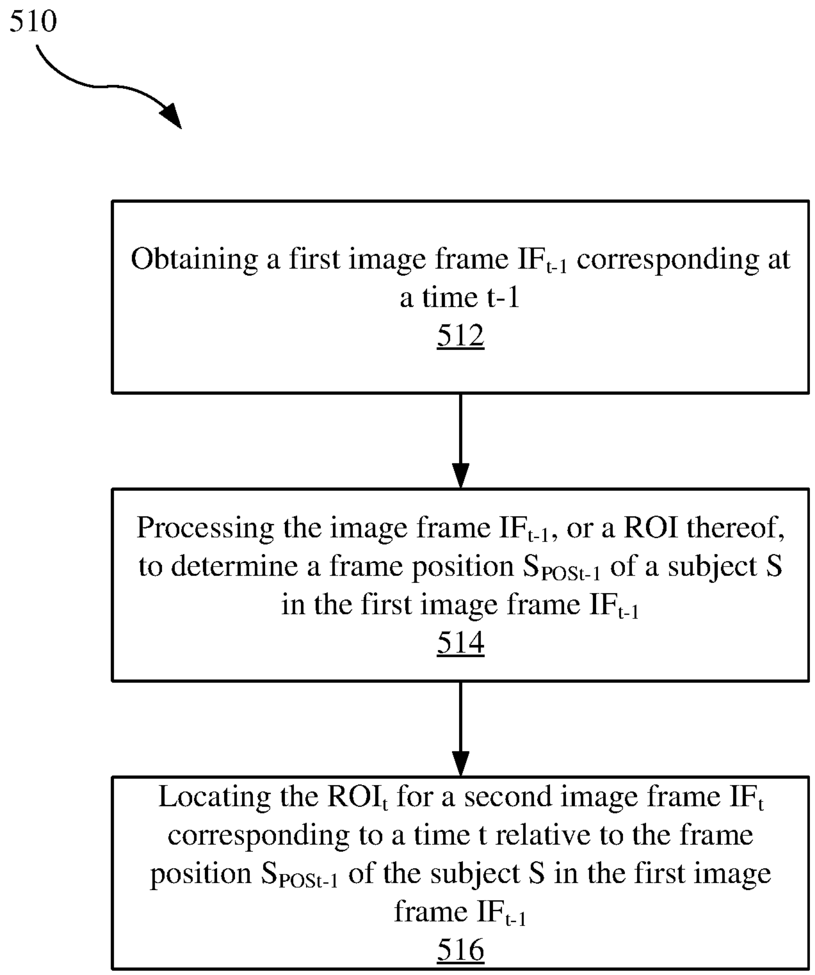
FIG. 5A is a flowchart of a technique for determining a region of interest, which may be used in the technique of FIG. 4.
Figure 5B:
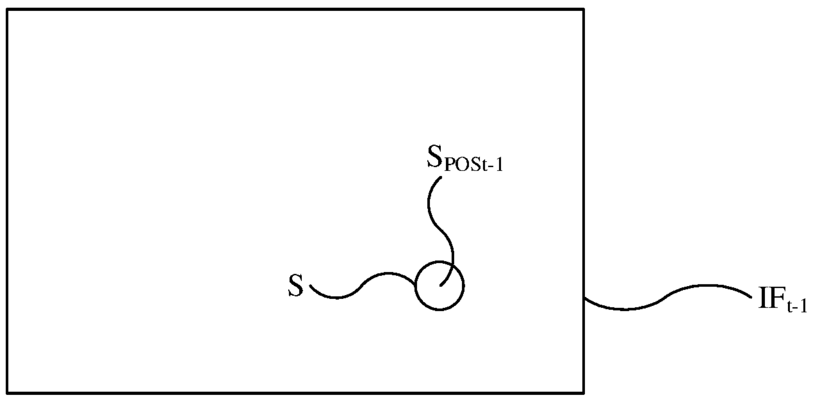
FIGS. 5B-5C are pictorial representations of video image frames that illustrate subject tracking with the technique of FIG. 5A.
Figure 5C:
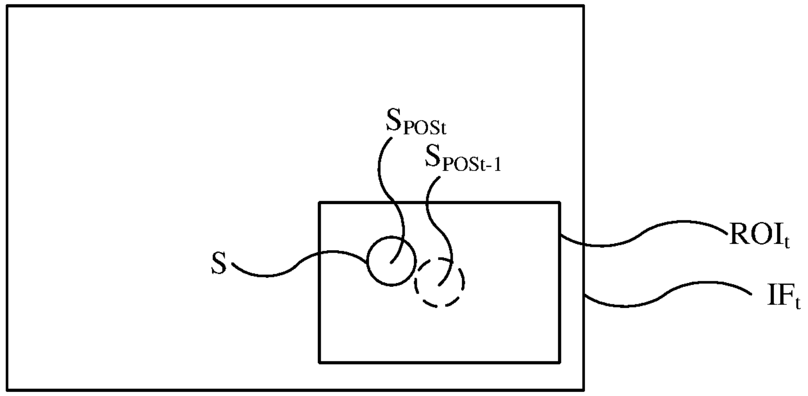

Referring to FIGS. 5A-5C, the ROI for a future image frame may be located relative to the frame position of the subject S in a previous frame. FIG. 5A is a flowchart of a technique 510 for determining the ROI, while FIGS. 5B-5C illustrate the technique 510 visually. The technique 510 presumes close proximity of the subject S in successive image frames and does not predict or estimate specific future locations at which the subject S might appear in a future image frames. The technique 510 may, for example, be implemented by the ROI module 310, including the visual motion estimation module 312 and the ROI determination module 316.

The technique 510 may be used to perform the operation for the determining 410 of the ROI in the technique 400. The technique 510 includes operations of obtaining 512 a first image frame $IF_{t-1}$ at a time t−1 (See FIG. 5B), processing 514 a first image frame $IF_{t-1}$ (or an ROI thereof) to determine a frame position $S_{POSt-1}$ of the subject S in the first frame $IF_{t-1}$ (see FIG. 5B), and locating 516 the $ROI_t$ for a second image frame $IF_t$ in a predetermined spatial relationship relative to the first frame position $S_{POSt-1}$ (see FIG. 5C). The technique 510 may be repeated as part of the technique 400 for subsequent image frames $IF_{t+1}$, $IF_{t+2}$, . . . $IF_{t+n}$. The first image frame $IF_{t-1}$ may also be referred to as a prior or previous image frame, while the second image frame $IF_t$ may be referred to as a subsequent or future image frame or a successive image frame (e.g., being obtained immediately subsequent to the first image frame $IF_{t-1}$, for example, in a video stream obtained by the imaging device 100 at a frame rate, such as 30 fps).

The obtaining 512 of the first image frame $IF_{t-1}$ may be the obtaining 420 performed in the technique 400 for an image frame from prior to the image frame $IF_t$. The processing 514 may be for an entirety of the image frame $IF_{t-1}$, or may be for an ROI thereof (e.g., as determined in a prior operation of the technique 510). The locating 516 of the $ROI_t$ may include centering the $ROI_t$ on the frame position $S_{POSt-1}$ of the subject S in the first frame $IF_{t-1}$. The $ROI_t$ may, for example, be rectangular as shown (e.g., having a common aspect ratio with the entire image frame), square, or another suitable shape.

The technique 510 may also include determining a size of the $ROI_t$. For example, the size of the $ROI_t$ may be determined according to a size of the subject S, for example, in the image frame $IF_{t-1}$, for example, increasing or decreasing in size if the subject S appears in the image frame $IF_{t-1}$ larger or smaller as compared to a previous image frame. For example, the size of the $ROI_t$ may be determined according to a predicted size of the subject S in the image frame $IF_t$. Alternatively, the size of the ROI may be a default size or may be fixed as the technique 510 is performed for successive image frames. Generally speaking, a larger $ROI_t$ results in a higher likelihood of the subject S being within the image frame $IF_t$, while a smaller $ROI_t$ results in a lesser likelihood.

Referring to FIGS. 6A-6E a technique 610 and variations thereof are provided for determining the ROI (i.e., the size and the location) relative to a predicted frame position of the subject S in the future image frame. Such techniques may be performed with various different information and/or in various different manners. Such information may include visual information obtained from previously obtained image frames, motion information of the imaging device 100, and/or motion of the subject S, which may be obtained from the previously obtained images and/or various sensors associated therewith. The term "predicted frame position" or "predicted subject frame position" refers to the position at which the subject S is estimated (e.g., predicted, estimated, likely, etc.) to appear in the subsequent image frame. In some implementations, the technique 400 may include initially performing the technique 510 to determine the ROI for one or more initial image frames (e.g., a second image frame in a video image stream), and include later performing another technique (e.g., the technique 610) to determine the ROI for later image frames (e.g., after sufficient visual and/or motion data is acquired to perform the technique 610). The technique 610 may be implemented by the ROI module 310, including the visual, imaging device, subject, relative, and/or combined motions modules 312-315, 317 and the ROI determination module 316.

Figure 6A:
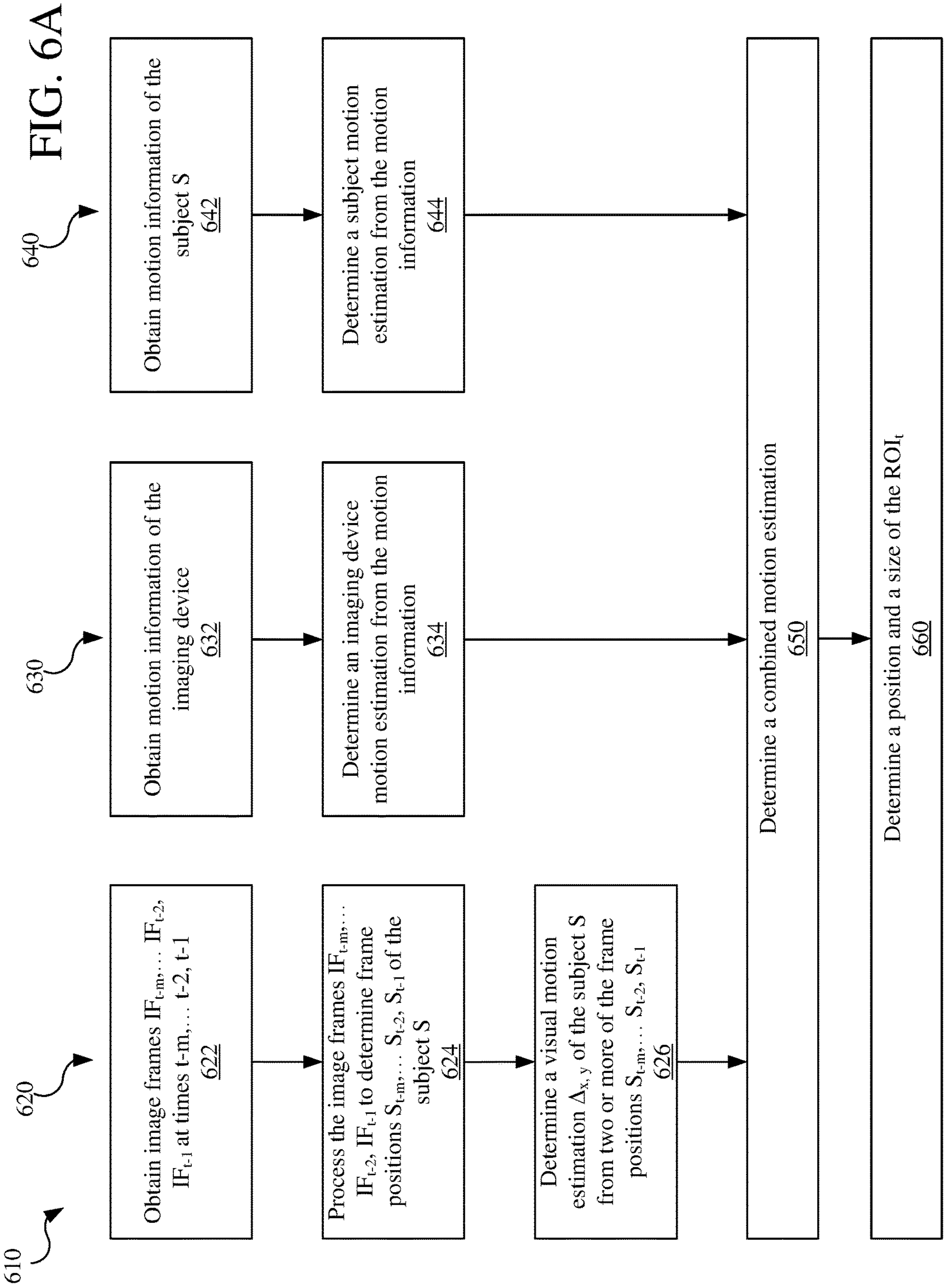
FIG. 6A is a flowchart of another technique for determining a region of interest, which may be used in the technique of FIG. 4.
Figure 6B:
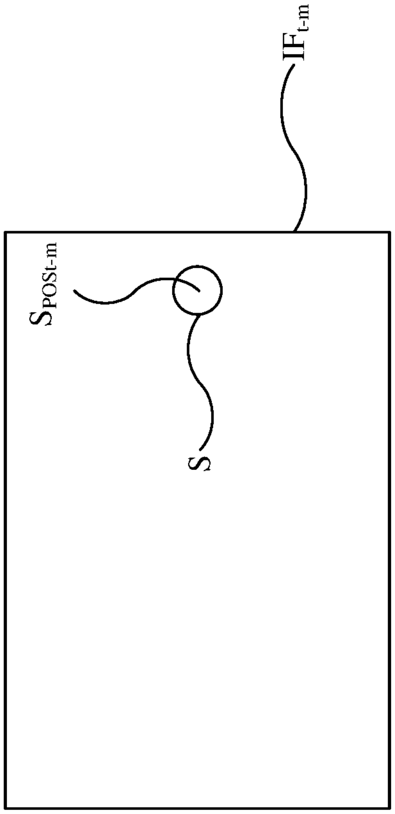
FIGS. 6B-6E are pictorial representations of video image frames that illustrate subject tracking with the technique of FIG. 6A.
Figure 6C:
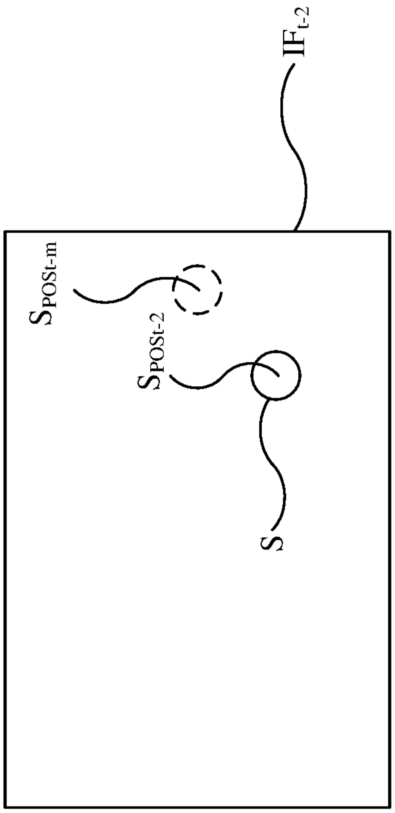
Figure 6D:
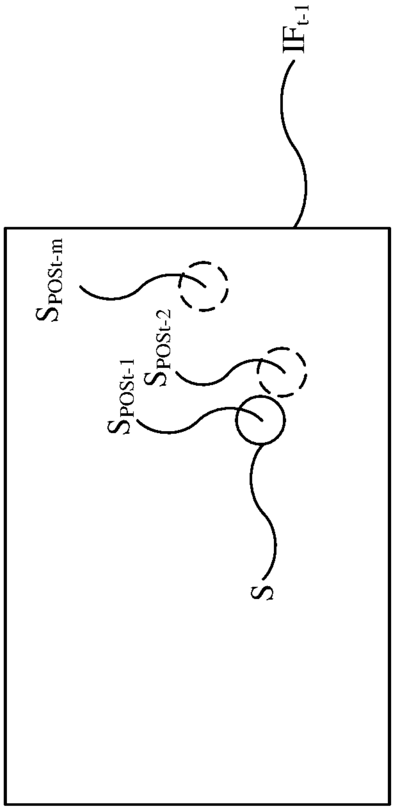

FIG. 6A is a flowchart of a technique 610 for determining the ROI, while FIGS. 6B-6E illustrate the technique 610 visually. The technique 610 may be used to perform the operation for the determining 410 of the $ROI_t$ in the technique 400. The technique 610 includes operations of: determining 620 a motion estimate of the subject S according to previously obtained image frames (e.g., a visual motion estimate), determining 630 a motion estimate of the imaging device 100 in real space (e.g., an imaging device motion estimate), and determining 640 a motion estimate of the subject S in real space (e.g., a subject motion estimate). The technique 612 further includes determining 650 a motion estimate of the subject S according to the one or more of the visual motion estimate, imaging device motion estimate, and the subject motion estimate (e.g., a combined motion estimate), and determining 660 a size and location of the $ROI_t$ from the combined motion estimate. The term "real space" refers to a fixed spatial frame of reference, which may be global coordinates or another defined coordinate system. The motion estimates may, for example, be estimates for a change of position of the subject S in the image frames IF, or may be an estimate of motion of the imaging device 100 or the subject S from which estimates of the changes of position of the subject S may be derived.

The operation for the determining 620 of the visual motion estimate is, for example, performed by the visual motion estimation module 312 according to a motion model. The visual motion estimate is an estimate of a change of position of the subject S in the image frame (e.g., a change in X, Y coordinates or predicted X, Y coordinates). The motion model uses the frame positions of the subject S in two or more previously obtained image frames $IF_{t-m}$, . . . $IF_{t-2}$, $IF_{t-1}$ and a motion model to predict motion of the subject S, for example, from the image frame $IF_{t-1}$ to the image frame $IF_t$. The determining 620 generally includes operations of obtaining 622 the image frames $IF_{t-m}$, . . . $IF_{t-2}$, $IF_{t-1}$ (see FIGS. 6B-6D), processing 624 the image frames $IF_{t-m}$, . . . $IF_{t-2}$, $IF_{t-1}$ to determine frame positions $S_{t-m}$, . . . $S_{t-2}$, $S_{t-1}$ of the subject S therein (see FIGS. 6B-6D), and determining 626 a visual motion estimate $\Delta_{x,\ y}$ of the subject S using the frame positions $S_{t-m}$, . . . $S_{t-2}$, $S_{t-1}$ and a motion model (see FIG. 6E).

Figure 6E:
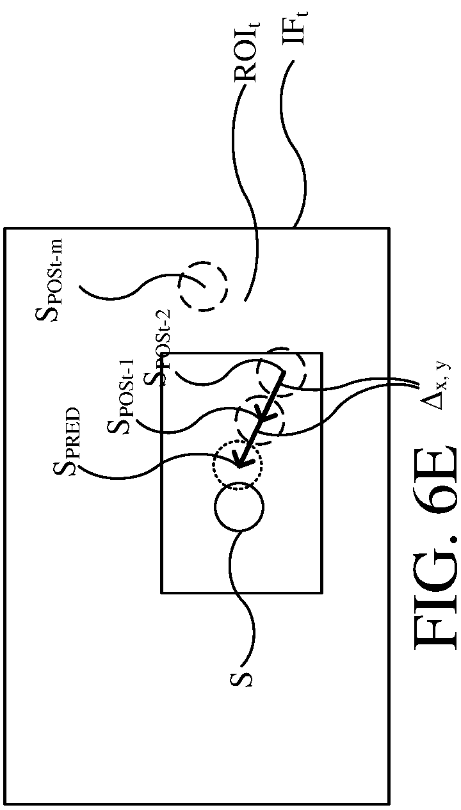

The motion model may, as illustrated in FIG. 6E, be a constant motion model that assumes constant motion of the subject S between the two most recent image frames (e.g., $IF_{t-1}$ and $IF_{t-2}$) and between the most recent image frame and the subsequent image frame (e.g., $IF_{t-1}$). For example, the constant motion may be a two-dimensional frame position change $\Delta_{x,\ y}$, or may be a three-dimensional frame position change $\Delta_{x,\ y,\ z}$ that additionally accounts for a distance in a direction perpendicular to the image frame (e.g., based on a change of size of the subject S in the image frames or measured distances between the subject S and the imaging device 100). Alternatively, the motion model may use more than two frame positions from previously obtained image frames (e.g., three, four, or more), which may more accurately determine the visual motion estimate by considering more information, for example, using line fitting (e.g., a linear motion model), curve fitting (e.g., a curvileinear motion model, for example, using polynomials and/or splines), or a recursive filter (e.g., an extended Kalman filter (EKF)).

The determining 620 of the visual motion estimate may further include determining a confidence value associated therewith, which may be referred to as a visual motion estimate confidence value. The confidence value is a measure of accuracy and/or certainty of visual motion estimate. The confidence value may be used in the determining 650 of the combined motion estimate, for example, to weight and/or filter the visual motion estimate among the imaging device motion estimate and the subject motion estimate.

Instead or additionally, the visual motion estimate may be, or be based on, relative motion of the imaging device 100 and the subject S as derived from the successive images. This may be referred to as a relative motion estimate, which may be determined by the relative motion estimation module 317. For example, direction and distance measurements (e.g., a vector) of the imaging device 100 and the subject S may calculated from the frame positions of the subject S in previous image frames and from a focal distance associated therewith (or other measure of distance between the subject S and the imaging device 100), and changes therein. A motion model (e.g., line or curve fitting model) may be applied to the previous direction and distance measurements to predict future relative motion of the imaging device 100 and the subject S from which the visual motion estimate may be derived.

Instead or additionally, the visual motion may be based on motion vectors created during video processing (e.g., encoding and/or compression techniques). When the image frames are encoded using certain video encoding techniques, such as H.264 (MPEG-4 Part 10, Advanced Video Coding), the encoding utilizes motion vectors created by the video encoder between the last and the current video image frames. These motion vectors may be utilized to predict or refine the visual motion estimate.

The operation for the determining 630 of the imaging device motion estimate is, for example, performed by the subject motion estimation module 313 according to motion information of the imaging device 100. The imaging device motion estimate is an estimate of motion of the imaging device 100 in real space, for example, from time t−1 to t. Alternatively, the imaging device motion estimate may be an estimate of motion of the subject S between the image frame $IF_{t-1}$ and the image frame $IF_t$ due to motion of the imaging device 100 in real space. The determining 630 of the imaging device motion estimate generally includes operations of obtaining 632 motion information of the imaging device 100, and determining 634 the imaging device motion estimate from the motion information.

The motion information of the imaging device 100 may include orientation information and position information. The motion information may also be referred to as egomotion. Orientation information may, for example, include roll, pitch, yaw, and higher order terms thereof, such as rotational velocity and/or rotational acceleration. Position information may, for example, include horizontal coordinates (e.g., global positioning or Euclidean coordinates), elevation, and higher order terms thereof, such as translational velocity and/or acceleration.

Orientation information and position information may be obtained from the various sensors 313*a* physically associated with the imaging device 100, such as the metadata sources 144. The various sensors may be coupled to the imaging device 100 itself, or may be coupled to other components of the MIA 20, such as the movable platform 40 and the imaging device movement mechanism 30. In one example, the imaging device 100 includes an embedded gyroscope, which includes one or more gyroscopes to detect rotation of the imaging device 100 in multiple axes relative to real space (e.g., the roll, pitch, and yaw). In another example, the MIA 20, or the movable platform 40 thereof, may include a global positioning system, a gyroscope, accelerometers, a barometer, a compass, an altimeter, a barometer, a magnetometer, an optical flow sensor, and/or an IMU (which may include one or more of the aforementioned sensors) from which the motion information (e.g., orientation and/or position, or changes therein) of the movable platform 40 may be determined in real space. The imaging device movement mechanism 30 may additionally include position sensors, which measure the motion information (e.g., orientation and/or position, or changes therein) of the imaging device 100 relative to the movable platform 40. Thus, from motion information of the movable platform 40 and of the imaging device movement mechanism 30, motion information of the imaging device 100 may be determined.

Still further, motion information of the imaging device 100 in real space may be obtained from the previously obtained image frames $IF_{t-m}$ . . . , $IF_{t-2}$, $IF_{t-1}$. For example, the position and/or orientation of the imaging device 100 (e.g., the MIA 20) may be obtained by observing changes in the frame position and/or size of references points fixed in real space (e.g., features of the terrain which the subject S may move relative to).

The determining 630 of the imaging device motion estimate may further include determining a confidence value associated therewith, which may be referred to as an imaging device motion estimate confidence value. The confidence value is a measure of accuracy and/or certainty the of imaging device motion estimate, which may, for example, be based on the reliability of the motion information (e.g., time delay and/or frequency relative to the time between successive image frames, accuracy of the sensors, availability and/or operation of the sensors, etc.). The confidence value may be used in the determining 650 of the combined motion estimate, for example, to weight and/or filter the subject motion estimate among the imaging device motion estimate and the subject motion estimate.

The operation for the determining 640 of the subject motion estimate is, for example, performed by the subject motion estimation module 314 according to motion information of the subject S. The subject estimation is an estimate of motion of the subject S in real space and/or relative to the imaging device 100, for example, from time t−1 to t. Alternatively, the subject motion estimate may be an estimate of motion of the subject S between the image frame $IF_{t-1}$ and the image frame $IF_t$ due to motion of the subject S in real space and/or relative motion of the subject S to the imaging device 100. The determining 640 of the subject motion estimate generally includes operations of obtaining 642 motion information of the subject S, and determining 644 the subject motion estimate from the motion information of the subject S.

The motion information of the subject S may include position information. The position information may, for example, include coordinates (e.g., global positioning or Euclidean coordinates) and/or elevation of the subject S in real space, and higher order terms thereof, such as translational velocity and/or acceleration. The position information may instead or additionally include relative positional information between the subject S and the imaging device 100, such as a distance therebetween and/or directional information (e.g., a vector).

Position information may be obtained from various sensors 314*a* and/or transmitters physically associated with the subject S. For example, a beacon device, such as the external device 50, a smartphone, accelerometers, a dedicated beacon device, or the beacon schema described below, may be carried by, coupled to, or otherwise physically associated with the subject S. The sensors and/or transmitters may be used to determine the position, velocity, and/or acceleration of the subject S in real space (e.g., as with a global positioning system and/or accelerometers).

The determining 640 of the subject motion estimate may further include determining a confidence value associated therewith, which may be referred to as subject motion estimate confidence value. The confidence value is a measure of accuracy and/or certainty of the subject motion estimate, which may, for example, be based on the reliability of the motion information (e.g., time delay and/or frequency relative to the time between successive image frames, accuracy of the sensors, etc.). The confidence value may be used in the determining 650 of the combined motion estimate, for example, to weight and/or filter the subject motion estimate among the imaging device motion estimate and the subject motion estimate.

Instead or additionally, the subject motion estimate may be a measure of relative movement between the subject S and the imaging device 100. This may also be referred to as a relative motion estimate, which may be determined by the relative motion estimation module 317. For example, the imaging device 100, the MIA 20, and/or the subject S may include sensors 313*a*, 314*a* by which distance and direction may be measured. For example, the imaging device 100 and/or the MIA 20 may include sensors (e.g., ultrasonic transceivers) that send and receive signals by which a distance and changes in distance (e.g., direction) may be measured between the imaging device 100 and the subject S. Similarly, the subject S may include a transmitter (e.g., beacon) that sends signals by which a distance and changes in distance (e.g., direction) may be measured (e.g., based on the time between sending and receiving the signal).

The operation for the determining 650 of the combined motion estimate is, for example, performed by the combined motion estimation module 315 according to the visual frame motion estimate, the imaging device motion estimate, and/or the subject motion estimate. The combined motion estimate is an estimate of the movement that the subject S will undergo from the image frame $IF_{t-1}$ to the future image frame $IF_t$, or may be the predicted frame position $S_{PRED}$ of the subject S in the image frame $IF_t$. The visual frame estimation, the imaging device motion estimate, and/or the subject motion estimate are combined (e.g., fused) to determine the combined motion estimate. As referenced above, confidence values associated with each of the visual frame motion estimate, the imaging device motion estimate, and the subject motion estimate may be used, for example, to weight and/or filter each such estimation in determining the combined motion estimate. For example, the imaging device motion estimate, the subject motion estimate, and/or the relative motion estimate may be used to account for motion of the imaging device and the subject S (e.g., egomotion) accounted for in the visual motion estimate. For example, the imaging device motion estimate, the subject motion estimate, and/or the relative motion estimate may be determined as expected frame motion (i.e., a change of position of the subject S in the image frame) and be added (e.g., in weighted or unweighted form) to the visual motion estimate. By combining the various motion estimates, the $ROI_t$ the predicted frame location $S_{PRED}$ may be more accurate, thereby allowing the $ROI_t$ to be sized smaller to provide reduced computing time and/or reduced computing resources for tracking the subject S in successive image frames.

The operation for the determining 660 of the size and the location of the $ROI_t$ is, for example, performed by the ROI determination module 316 and includes determining a predicted frame location $S_{PRED}$ of the subject S in the image frame $IF_t$ and locating the $ROI_t$ relative to the predicted frame location $S_{PRED}$ (e.g., in a predetermined location, such as centered on thereon).

The determining 660 also includes determining the size of the $ROI_t$, which may include increasing or decreasing a size of the $ROI_t$ as compared to a previous $ROI_{t-1}$. The size of the $ROI_t$ may be increased, for example, if the combined motion estimate indicates the imaging device 100 will be closer to the subject S, which would be expected to appear larger in the image frame $IF_t$ and possibly require processing a larger portion of the image frame $IF_t$ to locate the subject S therein. The size of the $ROI_t$ may also be increased, for example, in circumstances in which the predicted location $S_{PRED}$ may be less reliable, for example, with faster movements (e.g., relatively large change between the predicted frame position $S_{PRED}$ and the previous frame position $S_{POSt-1}$) and/or relatively low confidence values being associated with each of the visual frame motion estimate, imaging device motion estimate, and/or the subject motion estimate. Alternatively, the $ROI_t$ may be sized to a default size or may not change in size for different image frames IF (e.g., have a fixed size, such as ¼, ⅛, or 1/16 of a total size of the image frames).

Variations of the techniques 400, 510, and 610 are contemplated. For example, in the technique 610, the determining 650 of the combined motion estimate may be omitted, and the determining 660 of the $ROI_t$ may be performed directly with the visual motion estimate, the imaging device motion estimate, and/or the subject motion estimate. Furthermore, one or more of the operations for the determining 626, 634, and 644 of the various motion estimates may be omitted with the operation for the determining 650 the combined motion estimate or the operation for the determining 660 of the ROI being performed with the image frames and/or motion information from the operations of obtaining 622, 632, 642.

One or more of the modules 310-317, 320, 330 and the techniques 400, 510, and 610 can be performed and/or implemented, for example, by executing a machine-readable program or other computer-executable instructions, such as instructions or programs described according to JavaScript, C, or other such instructions. The steps, or operations, of the modules or techniques, or any other technique, method, process, or algorithm described in connection with the implementations disclosed herein can be implemented directly in hardware, firmware, software executed by hardware, circuitry, or a combination thereof, for example, of the MIA 20, the imaging device 100, the external device 50, and/or the tracking system 60.

Trajectory Generation for Subject Tracking

Degrees of Freedom

Figure 7B:
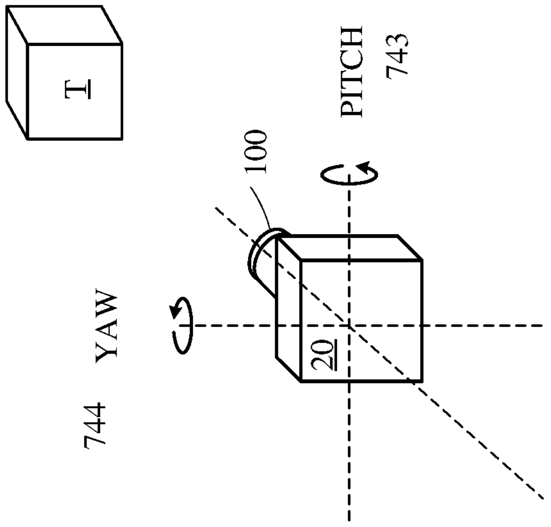
FIGS. 7A and 7B are pictorial illustrations of an imaging device positioned with respect to a target.
Figure 7A:
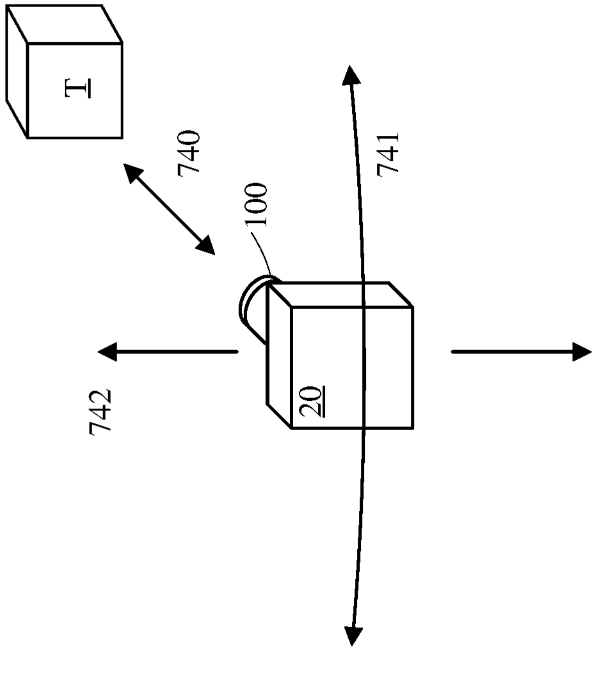
Figure 7C:
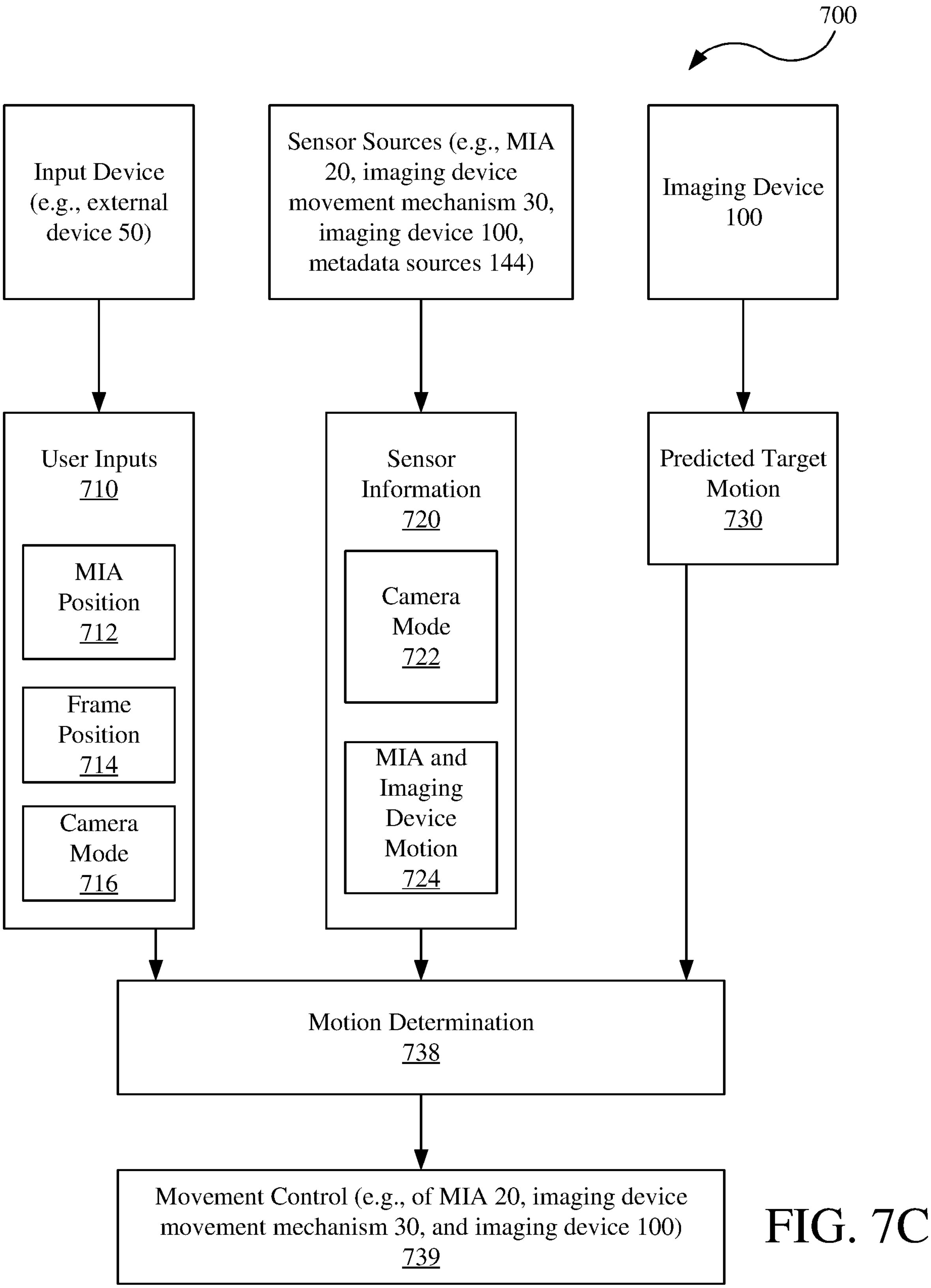
FIG. 7C is a block diagram of an implementation of a tracking system.

Referring to FIGS. 7A-7C, a flight or tracking system 700 and a method or technique 700*a* performed thereby are provided for receiving user instructions for moving the MIA 20 and the imaging device 100 relative to a target T, so as to maintain the target T within the image frames of images captured by the imaging device 100. The tracking system

700 and the method performed thereby may be included in and/or implemented by various components of the movable imaging system 10 (e.g., the MIA 20, the imaging device 100, the external device 50, the tracking system 60, etc.). For example, the tracking system 700 includes a module 710 (e.g., a user input module) for receiving user inputs, for example, via the external device 50.

Once a subject or a target has been determined as present in a video stream as captured by an aerial subject tracking system or MIA 20, it is desirable to automatically or semi-automatically accurately frame the subject within the video image frames. For stationary targets, a manual framing may not be too difficult, once a manual control of the movable platform 40 has been mastered. However, moving targets can present a much more complex scenario, and a specific control becomes much more difficult.

According to an implementation, an automatic or semi-automatic control of the MIA 20 can be effected to operate within certain constraints. According to a first constraint, and referring to FIGS. 7A and 7B, which are pictorial illustrations of the MIA 20 and the imaging device 100 of the MIA 20 with respect to a target T, when the target T moves, a motion of the MIA 20 can be defined as having the MIA 20 follow the target T with a constant delta in altitude (e.g., vertical) and horizontal position with respect to the target T. A constant delta in the horizontal position can mean: a) the horizontal position of the target T is fixed within the video image frames, that is, the MIA 20 moves as the target T changes direction of travel (e.g., the MIA 20 will remain behind the target, and adapt automatically to changes in direction of travel); or b) the horizontal position of the target T is fixed in a GPS frame, meaning the MIA 20 position is fixed irrespective of a direction of travel of target T. The motion of the MIA 20 may be described as relative to a frame of reference (FOR) that is either a target T or a fixed GPS framework.

A user may provide input to the MIA 20 via the external device 50 such as the MIA controller and UI described in respect to FIG. 1. This may allow control of, or selection of, e.g., five DOFs, three of which are related to control of the movable platform 40 relative to the target, and two of which are related to orientation of the imaging device 100 with respect to the movable platform 40. That is, the user may select the position of the MIA 20 relative to target (e.g., MIA position) and the position of the target within the image frame (e.g., target frame position), while operation of the MIA 20 and the imaging device movement mechanism 30 (e.g., the gimbal) is performed automatically (e.g., by a controller of the MIA 20 and/or the external device 50) to achieve the MIA position and the target frame position. As discussed in further detail below, the user may select the MIA position of the MIA 20 relative to the target directly (e.g., inputting specific values), via a predetermined flight pattern (e.g., choreographed flight pattern), or both, and the user may select the frame position of the target in the image frame directly, via predetermined scene selections, or both. The distances or coordinates of the MIA position and the frame position may be referred to as user-selectable degrees of freedom or user-selectable constraints. As also discussed in further detail below, the MIA 20 (e.g., via a controller thereof and/or the controller) controls movement of the MIA 20 to achieve the MIA position and the frame position by controlling movement of the MIA 20 in real space (e.g., six degrees of freedom including translation in X-, Y-, and Z-axes, and yaw, pitch, and roll) and movement of the imaging device 100 relative thereto via the imaging device movement mechanism 30 (e.g., in two or three degrees of freedom including yaw, pitch, and roll). Movement of the MIA 20 may be referred to as occurring in MIA degrees of freedom (e.g., MIA DOFs), and movement of the imaging device 100 relative to the MIA 20 may be referred to as occurring in imaging device degrees of freedom (e.g., imaging device DOFs).

As illustrated in FIG. 7A, according to an implementation, the MIA 20 can be set to operate according to: a) a first user-selectable DOF 740 in which the MIA 20 moves in a radial direction towards or away from the target T (e.g., a horizontal distance between the MIA 20 and the target T); b) a second DOF 741 in which the MIA 20 moves in a tangential direction (e.g., a circumferential or angular position of the target T relative to the MIA 20), i.e., along a circular trajectory around target; and c) a third DOF 742 in which the MIA 20 moves in a vertical direction or in altitude relative to the target T (e.g., a vertical distance between the MIA 20 and the target T). As referenced above, the circumferential position may be defined relative to a trajectory of the target T (e.g., 0 degrees being in front of the target and 180 degrees being behind the target) or a fixed frame of reference (e.g., GPS coordinates, such as 0 degrees being north, and 180 degrees being south).

As illustrated in FIG. 7B, and according to an implementation, the imaging device 100 can be rotated by use of, e.g., the imaging device movement mechanism 30, such as a gimbal, to allow adjustment of the imaging device 100 within the MIA 20. The user input via the external device 50 can thus be set to operate according to: d) a fourth DOF 743 in which the vertical position of the target T may be adjusted within the video stream (e.g., image frame) by, e.g., pitching the imaging device movement mechanism 30 (e.g., a vertical frame position); and e) a fifth DOF 744 in which the horizontal position of target T within camera stream may be adjusted by yawing the imaging device movement mechanism 30 and/or the MIA 20 (e.g., a horizontal frame position). The orientation of the image frame relative to the target T and/or relative to a horizontal plane may be maintained by rolling, pitching, or yawing the imaging device movement mechanism 30 (e.g., as the MIA 20 rolls, pitches, or yaws to achieve translational movement, as with a quadcopter type device). By combining operations of all five user-selectable DOFs 740, 741, 742, 743, 744 discussed above, the MIA 20 and the imaging device 100 can automatically adjust position (e.g., the horizontal, vertical, and circumferential positions of the MIA 20 relative to the target T) and orientation (e.g., the roll, pitch, and yaw of the MIA 20 relative to the target T) together with the orientation (e.g., pitch, heading (i.e., yaw), and/or roll angles) of the imaging device 100 relative to the MIA 20 (i.e., by operating the imaging device movement mechanism 30). This may ensure the correct placement of the target T or subject within the image (e.g., in the image frames) as well as the correct relative position of the MIA 20 with respect to the target T or subject.

These user-selectable DOFs 740, 741, 742, 743, 744 (e.g., user-selectable constraints) can be operated individually or in combination. The user-selectable DOFs 740, 741, 742, 743, 744 may be input directly by the user and/or may be choreographed over time to produce complex motion of the imaging device 100 relative to the target T.

For example, for a first period of time, motion may be constrained to operating solely within the second DOF 741, but then for a second period of time, combined constraints of the first DOF 740, the third DOF 742, and fourth DOF 743 may be used in order to produce choreographed cinematic type video of the target T. The constraints may be implemented using tracking techniques defined herein.

For example, the user may input the DOF 740 (e.g., the radial or horizontal distance), the DOF 741 (e.g., circumferential or angular position), and the DOF 742 (e.g., the vertical distance) individually and as fixed values. The user may also input a frame of reference by which the DOF 741 (i.e., the circumferential or angular position) is determined according to a trajectory of the target T or a fixed reference frame (e.g., GPS coordinates). The user may instead input one or more of the DOFs 740, 741, and 742 in conjunction with a choreographed flight pattern (e.g., predetermined flight pattern) in which one or more of the other DOFs 740, 741, and 742 are varied automatically. In one example, the user may input two of the DOFs 740, 741, 742, while the third of the DOFs 740, 741, 742 is varied according to a choreographed flight pattern that is selectable by the user. For example, the user may input the DOF 740 (e.g., the horizontal distance) and the DOF 742 (e.g., the vertical distance) and select a choreographed DOF 741 by which the DOF 741 (e.g., the circumferential position) is varied automatically (e.g., to orbit the target T at a predetermined, fixed, variable, or user-selectable speed). In another example, the user may input one of the DOFs 740, 741, 742, while the other two DOFs 740, 741, 742 are varied according to a choreographed flight pattern that is selectable by the user. For example, the user may input the DOF 741 (e.g., the circumferential position) and select choreographed DOFs 740, 742 by which the DOF 740 (e.g., the horizontal distance) and the DOF 742 (e.g., the vertical distance) are varied automatically (e.g., to fly away from and back toward the target T at predetermined or user-selectable positions at a fixed or user selectable speed).

The user may input the DOF 743 (e.g., the horizontal target frame position) and the DOF 744 (e.g., the vertical target frame position) individually and as fixed values. The user may specify a particular location, region, or bounding box within the image frame over which or in which the target T is to be positioned, for example, by inputting the DOF 743 and the DOF 744, and/or a size of a region or bounding box.

Further, the user may be guided or restricted in the DOF 743 and the DOF 744 according to a setting of the imaging device 100, such as a frame width setting. For example, the imaging device 100 may be configured with different settings for capturing images with different widths of image frames. For wider settings, the captured images may be subject to greater distortion moving closer to the edges of the image frames. Accordingly, the user may be guided to input the DOFs 743 and 744 where less distortion would be expected, or may be restricted (i.e., prevented) from inputting the DOFs 743, 744 where too great of distortion might be expected (e.g., for capturing quality images of the target T and/or for visually tracking the target T).

Still further, the user may input the DOF 743 and the DOF 744 according to a predetermined scene selection, for example, in which the target T is positioned within the image frames according to the rule of thirds, as selected by the user.

The user may input the DOFs 740, 741, 742, 743, 744, for example, via the external device 50 (e.g., using physical buttons, a touch screen, and/or voice inputs). Operation of the MIA 20 and the imaging device movement mechanism 30 to achieve the DOFS, 740, 741, 742, 743, 744 may be controlled by the external device 50, a controller of the MIA 20, and/or a controller of the imaging device 100 (e.g., according to instructions stored in memory and executed by a processor according to user input of the DOFs, various other information obtained from various sensors (e.g., IMU, position sensors, GPS, or other metadata source 144), and image information (e.g., from processing image frames captured by the imaging device 100).

Referring to FIG. 7C, a block diagram is provided for the tracking system 700 in which the user may input the MIA position and the target frame position and by which the MIA 20 and the imaging device 100 are operated.

In a first module 710 user inputs are received (e.g., a user input module). The user inputs may, for example, be received by the external device 50. In a submodule 712 (e.g., a MIA position module), user inputs are received for the MIA position, which may include receipt of inputs for the DOF 740 (horizontal distance), DOF 741 (circumferential position), and DOF 742 (vertical distance). As described above, the submodule 712 may receive inputs as one of more of (a) fixed values for DOFs 740, 741, 742, (b) fixed values for two of the DOFs 740, 741, 742 and a user-selectable choreographed flight pattern by which the other of the DOFs 740, 741, 742 is varied, or (c) fixed values for one of the DOFs 740, 741, 742 and another user-selectable choreographed flight pattern by which the two other of the DOFs 740, 741, 742 are varied. The submodule 712 may also receive a user input specifying a frame of reference as either being fixed (i.e., fixed in real space) or trajectory dependent (i.e., based on a trajectory of the target). The submodule 712 may, for example, receive user the user inputs via the external device 50.

In a second submodule 714 (e.g., a frame position module), user inputs are received for the target frame position, which may include receipt of inputs for the DOF 743 (horizontal frame position), the DOF 744 (vertical frame position). As described above, the submodule 714 may receive user inputs as one or more of (a) a position, (b) a region, or (c) a bounding box within the image frame. The submodule 712 may also receive user input of a size of the bounding box. Still further, the second submodule 714 may, based on an image frame width setting, guide or restrict to limited inputs for the DOFs 743, 744, or allow the user to select a scene selection by which the DOFs 743, 744 are predetermined.

In a third submodule 716 (e.g., a camera mode module), the user may input a camera mode selection pertaining to an image frame width setting.

In a second module 720 (e.g., a sensor information module), sensor or movement information is determined. In a first submodule 722, sensor information may be determined for the camera mode of (e.g., image frame width setting) and/or an image stream from the imaging device 100. In a second submodule 724 (e.g., a MIA and imaging device motion module), sensor or movement information is obtained regarding motion of the MIA 20 and the imaging device 100 relative thereto, such as the position and/or orientation of the MIA 20 in real space and the imaging device 100 relative to the MIA 20 and changes (e.g., velocity) or rates of changes (e.g., acceleration) thereof. Such motion information may be obtained from sensors of the MIA 20 (e.g., IMU, GPS, altimeter, etc.), the imaging device movement mechanism 30 (e.g., position sensors thereof), and/or the imaging device 100 (e.g., sensors thereof, such as an IMU or accelerometers, and/or derived from the image stream captured thereby).

In a third module 730 (e.g., predicted target motion module)), predicted motion and/or future positions of the target T is determined, for example, according to the image stream (e.g., by identifying the target T in image frame, determining positions of the target T in the image frame, and determining changes in position of the target T in the image frames).

In a fourth module 738 (e.g., motion determination module), desired motion for the MIA 20 and the imaging device 100 are determined according to the predicted motion of the target T (i.e., from module 730) and motion information of the MIA 20 and the imaging device 100 relative thereto (i.e., from the submodule 724) to achieve the user-selectable DOFS 740, 741, 742, 743, 744. For example, using a motion module of the MIA 20, desired motion of the MIA 20 is determined according to the predicted motion of the target T and the motion information obtained and/or derived from submodule 724 (e.g., current position and orientation of the MIA 20 relative to the target T, change therein, and rates of change therein) to achieve the DOFs 740, 741, 742 (i.e., horizontal, angular, and vertical positions of the MIA 20 relative to the target T) at subsequent times corresponding to the predicted motion or positions of the target T. Desired motion of the imaging device 100 relative to the MIA 20 may be determined according to the predicted motion of the target T and the desired motion of the MIA 20, so as to achieve the DOFs 743, 744 (i.e., horizontal and vertical frame positions)

In a fifth module 739 (e.g., movement control module), the MIA 20 and the imaging device movement mechanism 30 are controlled according to achieve the desired motion of the MIA 20 and the imaging device 100 relative thereto. For example, in the case of the MIA 20 being a quadcopter, rotors of the MIA 20 may be rotated at different rates so as to yaw, pitch, and roll the MIA 20 to translationally move the MIA 20. In the case of the imaging device movement mechanism 30 being a three-axis gimbal, motors pivot the imaging device 100 relative to the MIA 20 about the three axes.

The modules 710, 720, 730, 738, 739 and submodules may be implemented by one or more of the tracking system 60, the MIA 20, the external device 50, the imaging device 100 and/or various hardware components thereof (e.g., processors, memories, and/or communications components). Further, it should be understood that the various submodules may be standalone modules separate from the parent module or other submodules associated therewith.

Figure 7D:
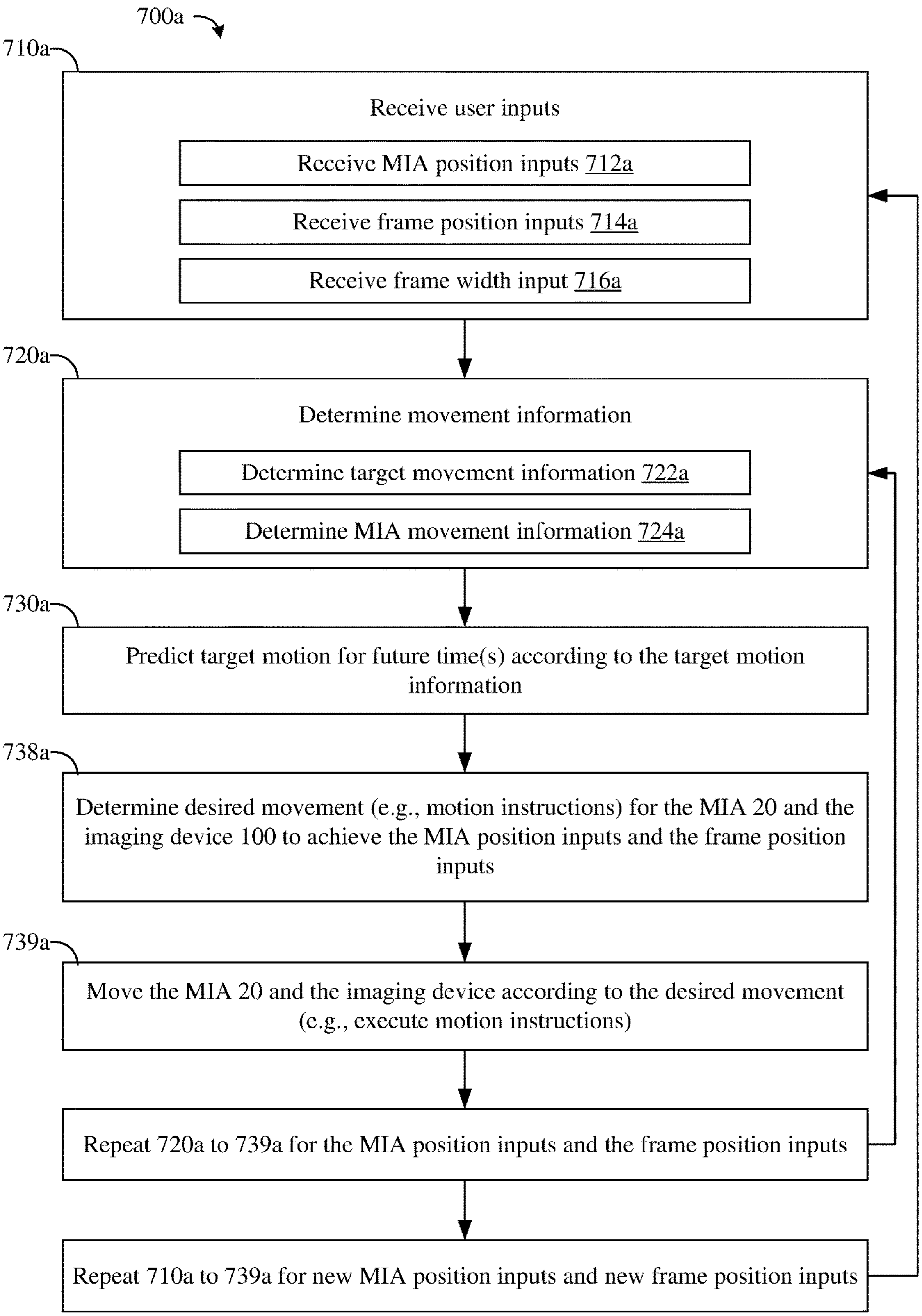
FIG. 7D is a flow diagram of a method implemented by the tracking system of FIG. 7C.

Referring to FIG. 7D, a set of operations of the method 700*a* are described for controlling the MIA 20 according to user input instructions. At 710*a*, user inputs are received, for example by the external device 50. The user inputs include MIA position inputs, which are used to define a position of the MIA 20 with respect to the target T, and frame position inputs, which are used to define a position of the target T within image frames, such as those captured by the imaging device 100. As 712*a*, the MIA position inputs are received, which may include one or more degrees of freedom or constraints according to which the MIA 20 is to be moved relative to the target T. The MIA position inputs may define one or more of a vertical distance, a circumferential position, or a vertical distance between the MIA 20 and the target T. One or more of the MIA position inputs may be received as fixed values that define the horizontal distance, the circumferential position, or the vertical distance. One or more of the user inputs may be received as a selection of a choreographed flight pattern by which another of the horizontal distance, the circumferential position, or the vertical distance are varied. The MIA position inputs may additionally define a frame of reference of the MIA 20, for example, as being relative to a fixed reference frame or a trajectory of the target.

At 714*a*, the frame position inputs are received, which may include one or more degrees freedom or constraints according to which the target T is to be positioned within image frames captured by the imaging device 100. The frame position inputs may define one or more of a horizontal position or a vertical position of the target within the image frame. One or more of the frame position inputs may be received as fixed values that define the horizontal position or the horizontal position, which may include defining a position of the target T (e.g., a pixel location), a bounding box (e.g., a region constrained in horizontal and vertical dimensions), or another region (e.g., a horizontal or vertical region). When receiving the frame position inputs, the user may be guided or restricted to provide frame position inputs according to an image frame width.

At 716*a*, user inputs may also be received to specify a camera mode that defines an image frame width setting.

At 720*a*, movement information is determined for the MIA 20 and for the target T. At 722*a*, target movement information is determined for the target T, which may be derived from image frames captured by the imaging device 100 and processed to locate the target T within the imagine frames and/or to locate the target T with respect to the MIA 20. Target movement information may, for example, include a position and/or velocity of the target T relative to a reference frame and/or the MIA 20.

At 724*a*, MIA movement information is determined for the MIA 20, which may be collected from sensors associated therewith (e.g., the metadata sources 144, thereof, which may include an IMU, GPS sensor, accelerometers, gyroscopes, altimeters, etc.). MIA movement information may, for example, include position and velocity of the MIA 20 relative to a reference frame (e.g., translational movement) and may also include orientation and orientation change rates of the MIA 20 relative to the reference frame (e.g., roll, pitch, and/or yaw). MIA movement information may be used to determine the target movement information, for example, by accounting for changes in position and/or orientation of the MIA 20 when evaluating motion of the target T between the image frames.

At 730*a*, target motion of the target T is predicted according to the target movement information. For example, a position of the target T (e.g., a predicted or future target position) may be predicted or determined for one or more future times. For example, the predicted target position may be determined according to a previous position and velocity of the target T (e.g., past target positions and target velocity).

At 738*a*, desired motion (e.g., movement instructions) of the MIA 20 and the imaging device 100 relative thereto is determined according to the predicted target position and the MIA motion information to achieve the MIA position inputs (e.g., the horizontal distance, circumferential position, vertical distance, and/or frame of reference of the MIA 20 relative to the target T) and the frame position inputs (e.g., the horizontal position and the vertical position of the target T within image frames) at the one or more future times.

At 739*a*, the MIA 20 and the imaging device 100 are moved to achieve the desired motion of the MIA to achieve the MIA position inputs and the frame position inputs. For example, the movement instructions are executed to operate the MIA 20 and the imaging device movement mechanism 30.

Steps 720*a* to 739*a* are then repeated to continue to achieve the MIA position inputs and the frame position inputs. Step 710*a* may be repeated to receive new user inputs.

Flight Restriction Volumes

Figure 7E:
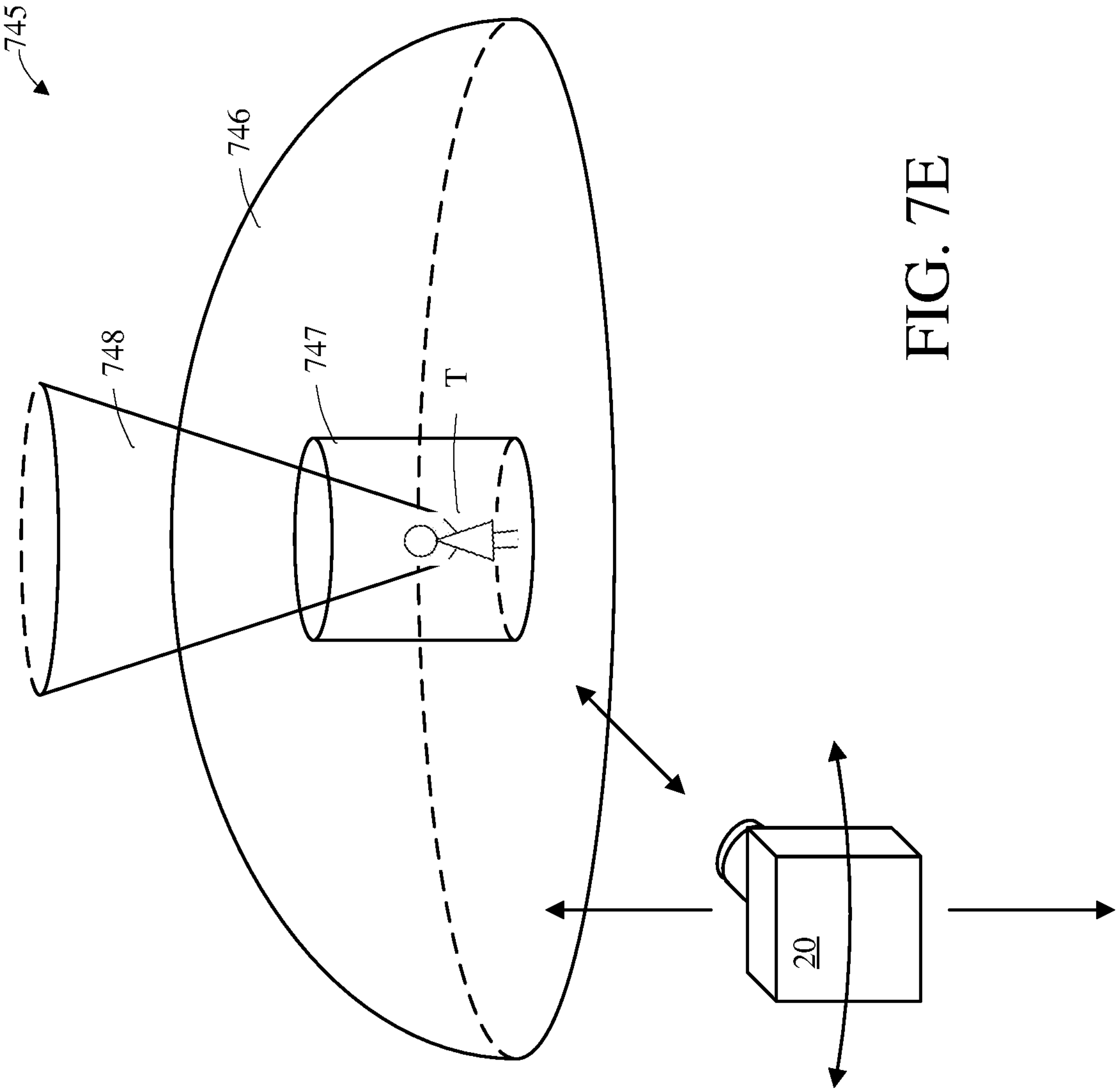
FIG. 7E is a pictorial perspective view of the MIA of FIG. 2A operating within predefined volumes.
Figure 7F:
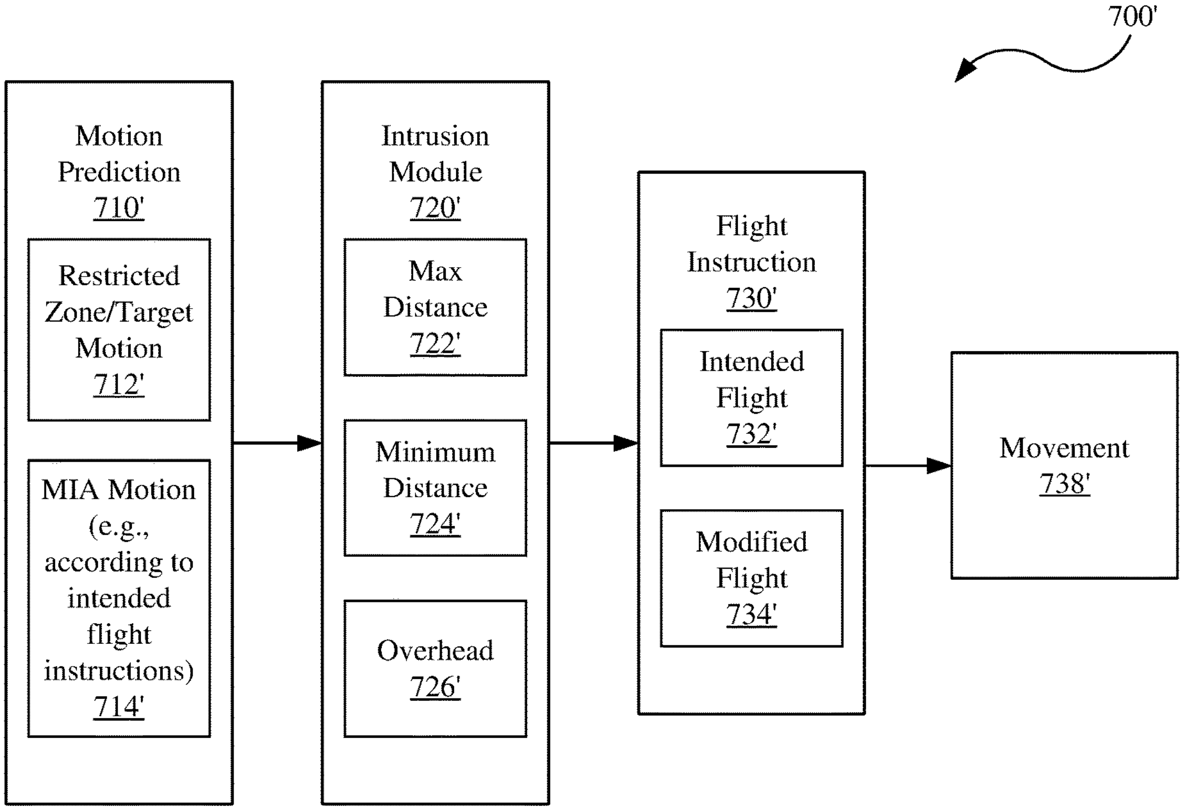
FIG. 7F is a block diagram of an implementation of another tracking system.
Figure 7G:
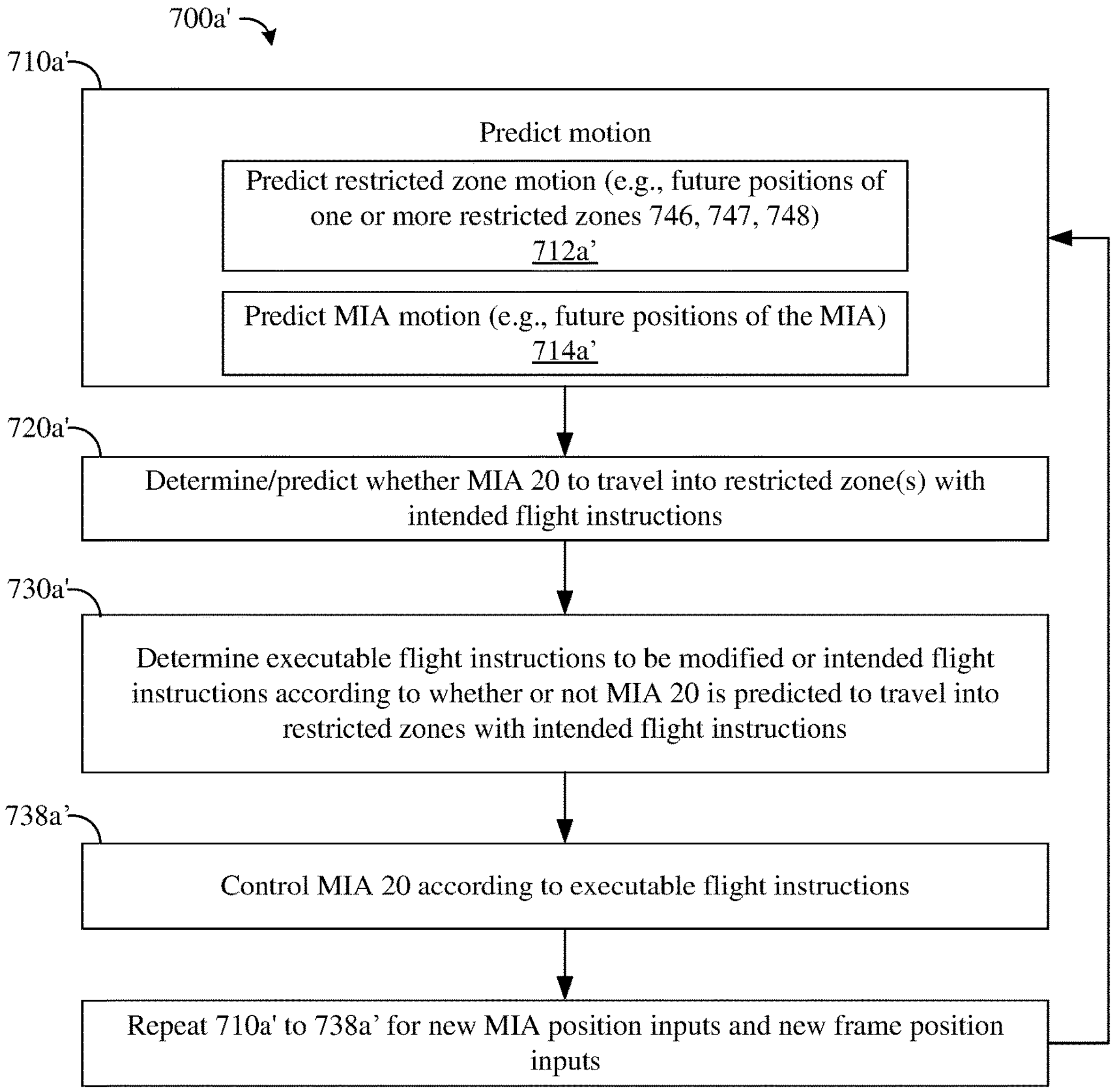
FIG. 7G is a flow diagram of a method implemented by the tracking system of FIG. 7F.

Referring to FIGS. 7E-7G, a flight or tracking system 700' and a method or technique implemented thereby are provided to movement of the MIA 20 within restricted areas defined relative to the target T (e.g., for tracking and/or collision avoidance purposes. The tracking system 700' and the method performed thereby may be included in and/or implemented by various components of the movable imaging system 10 (e.g., the MIA 20, the imaging device 100, the external device 50, the tracking system 60, etc.).

It may be desirable to create certain flight restriction volumes or zones in order ensure the safety of the user and at the same time ensure that the tracking system associated with the MIA 20 continues to function robustly. To that end, regardless of other MIA 20 motion trajectories or constraints, a further delineation of allowable and non-allowable volumes relative to a target may be defined within which flight is permitted or not permitted, respectively. These allowable and non-allowable volumes may override other calculations of trajectories for the MIA 20 in order to maintain safety of persons or property (including the MIA 20), or to ensure that the subject S remains within view of the imaging device 100.

FIG. 7E is a pictorial perspective view of the MIA 20 operating outside predefined restricted zones 745, or within predefined volumes. A restricted zone 746 (e.g., a first volume) may be defined as an outermost boundary outside of which the MIA 20 may operate. Conversely, In one implementation, this restricted zone 746 could be, e.g., a half-sphere (or approximation thereof) whose surface constitutes a predefined maximum distance allowable from the MIA 20 to the target T to ensure that the tracking system 700' does not lose the target T (e.g., is able to locate the target T, for example, using direct or indirect wireless communication between the target T and the MIA 20 and/or visual identification of the target T in successive image frames obtained by the imaging device 100). This first restricted zone 746 could also include a boundary that ensures that a distance between the MIA 20 and the external device 50 or the subject S (e.g., when using a GPS position of the subject), when a direct wireless link exists, does not exceed a maximum range of the wireless connection. The maximum range can be variable and can be a function of the number of other devices operating within a same Wi-Fi frequency spectrum or may be based on other factors that can impact transmission distances. A margin of safety may be applied to any of the volumes, surfaces, or surface point distances discussed herein. Other constraints may also be incorporated into the definition of the restricted zone 746, such as no-fly zones, etc., such as conversely defining a first volume in which the MIA 20 is permitted.

A second restricted zone 747 may be defined by, e.g., a cylinder, whose surface represents a minimum distance to the target T and within which constitutes a no-fly zone around the subject to ensure the safety of the subject. Finally, a restricted zone 748 (e.g., a conical region) may be defined to account for a maximum extent of pitch permitted for the imaging device 100 with respect to the MIA 20 in order to ensure that the tracking system 700' does not lose the target T (e.g., that the target T is not outside a field of view of the imaging device 100). For example, the imaging device 100 may, by the imaging device movement mechanism 30, have a limited range of motion relative to the MIA 20 that results in regions below the MIA 20 outside the field of view of the imaging device 100. The third restricted zone 748 is a region relative to the target T, which the MIA 20 is avoided or prevented from flying into in order to maintain the target T within the field of view of the imaging device 100. This restricted zone 748 may be defined as a cone, and operation of the MIA 20 within this cone may be avoided.

These restricted zones 746, 747, 748 may also be designed to take into consideration motion of the target T in the image caused by the motion of the MIA 20. This motion may be kept within certain predefined limits to ensure proper operation of the tracking system. In other words, changes in speed and direction of the MIA 20 may be constrained to occur below a certain change rate if the MIA 20 is operating in a mode where it tracks the target T. If a motion estimate of the target T is available, this information may be incorporated to reduce the maximal allowed motion.

If a trajectory of the MIA 20 established by other criteria would cause the MIA 20 to enter a non-allowed volume, the trajectory may be modified so that it remains within an allowed volume. For example, the trajectory of the MIA 20 may be modified to include a point within the allowed volume nearest a point of the original trajectory that was within a non-allowed volume.

Referring to FIG. 7F, a block diagram is provided for a flight or tracking system 700' that implements a technique of method **700*a*'** by which the restricted flight zones are utilized.

In a first module 710' (e.g., motion prediction module), predicted motion of the restricted zones 746, 747, 748 and the MIA 20 are determined. In a first submodule 712' (e.g., restriction zone motion or target motion module), predicted motion of the restricted zones 746, 747, 748 is determined by predicting motion of the target T. For example, motion of the target T may be predicted according to past positions of the target T relative to a reference frame (e.g., GPS coordinates) or the MIA 20, which may have been determined visually (e.g., according to identifying and locating the target T in past image frames captured by the imaging device 120) and/or sensor information (e.g., obtained by sensors associated with the target T, the MIA 20, and/or the imaging device 100). In a second submodule 714' (e.g., MIA predicted motion module), predicted motion of the MIA 20 is determined according to intended flight instructions. The intended flight instructions may, for example, include user-defined flight instructions (i.e., based on inputs from a user, such as for translational movement in vertical and horizontal directions) and/or automated flight instructions (e.g., for the MIA 20 to follow the target T). The predicted motion of the MIA 20 may be determined, for example, according to a motion model of the MIA 20 and the intended flight instructions, for the subsequent times. The predicted motion of the MIA 20 may also be determined according to motion information of the MIA 20 (e.g., position and/or orientation, changes therein, and/or rates of change therein), which may be determined according to the image stream of the imaging device 100 and/or sensors of the MIA 20 (e.g., IMU, GPS, altimeter, etc.) and accounted for in the motion model. Motion of the target T and/or the MIA 20 may be determined in the manners described above with respect to the tracking system 300 and the technique 400.

In a second module 720' (e.g., flight intrusion module), it is predicted whether the predicted motion of the MIA 20 and the restricted zones 746, 747, 748 will result in the MIA 20 flying (e.g., intruding) into the restricted zones 746, 747, 748. In a first submodule 722' (e.g., max distance module), it is determined whether the predicted motion would result in the MIA 20 flying into the restricted zone 746 (e.g., outside a radial distance from the target T, such as a distance at which the target T can no longer be tracked or identified in image frames or other distance value). In a second submodule 724' (e.g., a minimum distance module), it is determined whether the predicted motion would result in the MIA 20 flying into the restricted zone 747 (e.g., inside a radial or circumferential distance from the target T, such as a distance to prevent inadvertent collisions between the MIA 20 and the target T. In a third submodule 726' (e.g., overhead module), it is determined whether the predicted motion would result in the MIA 20 flying into the restricted zone 748 (e.g., inside a region in which the target T will or may be outside the field of view of the MIA 20, such as due to travel limits of the imaging device movement mechanism 30). It should be noted that fewer or more restricted zones may be defined relative to the target T, such that fewer or more modules may be utilized. Further, a single module may cooperatively determine whether the prediction motion would result in the MIA 20 flying into any of the multiple restricted zones.

In a third module 730' (e.g., flight instruction module), executable flight instructions are determined. In a first submodule 732' (e.g., intended flight module), if the predicted motion of the MIA 20 is determined to not take the MIA 20 into the restricted zones 746, 747, 748, the intended flight instructions are determined to be the executable flight instructions. In a second submodule 734' (e.g., modified flight module), if the predicted motion of the MIA 20 is determined to take the MIA 20 into one of the restricted zones 746, 747, 748, modified instructions are determined to be the executable flight instructions. The modified flight instructions are different than the intended flight instructions and which are predicted to not take the MIA 20 into any of the restricted zones 746, 747, 748.

In a fourth module 738' (e.g., movement module), the MIA 20 is controlled according to the executable flight instructions.

The various modules 710', 720', 730', 738' and the submodules thereof may be implemented by one or more of the tracking system 60, the MIA 20, the external device 50, the imaging device 100 and/or various hardware components thereof (e.g., processors, memories, and/or communications components). Further, it should be understood that the various submodules may be standalone modules separate from the parent module or other submodules associated therewith.

Referring to FIG. 7G, a set of operations of the method 700*a*' are described for controlling the MIA 20 according to restricted flight zones.

At 710*a*', motion of one or more restricted zones 746, 747, 748 and the MIA 20 are predicted. At 712*a*', motion of the one or more restricted zones is predicted. For example, future position(s) of the one or restricted zones is determined or predicted for one or more future time. Because the restricted zones are defined relative to the target T, in predicting motion (e.g., future positions) of the restricted zones, motion (e.g., future positions) of the target T may be predicted. Motion of the target T may be performed as described previously, for example, by determining the position and velocity of the target T according to images frames previously captured by the imaging device 100. Motion information of the MIA 20 may be used to determine target motion, for example, by taking into account position, velocity, orientation, and change in orientation of the MIA 20 determined, for example, according to metadata sources 144 (e.g., various movement sensors) associated with the MIA 20.

The restricted zones may include one or more of the restricted zones 746, 747, 748. The restricted zone 746 may define a maximum allowable distance between the MIA 20 and the target T (e.g., outside of which travel is restricted). The restricted zone 747 may define a minimum allowable distance between the MIA 20 and the target T (e.g., inside of which travel is restricted). The restricted zone 748 may define a region overhead or above the target T (e.g., inside of which travel is restricted), which may be a region in which the target T may be outside a field of view of the imaging device 100.

At 714*a*', motion of the MIA 20 is predicted according to intended flight instructions. For example, future positions of the MIA 20 are predicted or determined for future time(s) corresponding to those of the future time(s) associated with the predicted positions of the restricted zones 746, 747, 748. Predicted motion of the MIA 20 may be determined as described previously, for example, according to a motion model MIA 20 that predicts movement of the MIA 20 according to movement characteristics of the MIA 20, the intended flight instructions, and the MIA motion information.

At 720*a*', it is determined or predicted whether the prediction motion of the MIA 20 will result in the MIA 20 travelling into the restricted zones 746, 747, 748 at the future times. For example, the future position of the MIA 20 is compared to the restricted zones 746, 747, 748 at their respective predicted positions for the future time(s). The intended flight instructions may, for example, be input manually by the user or those performed according to choreographed flight maneuvers.

At 730*a*', executable flight instructions are determined. If at 720*a*', the MIA 20 is predicted to not travel into one of the restricted zones 746, 747, 748 at the future time, the intended flight instructions are determined to be the executable flight instructions. If at 720*a*', the MIA 20 is predicted to travel into one of the restricted zones 746, 747, 748 at the future time, modified instructions are determined to be the executable flight instructions. The modified instructions are predicted to not result in the MIA 20 traveling into the restricted zones 746, 747, 748.

At 738*a*', the MIA 20 is controlled according to the executable flight instructions.

Scene Composition and Framing Preservation

Cinematography benefits significantly from utilizing composition and framing techniques that have been historically developed. Such techniques can be applied with regard to the images and video obtained by use of the MIA 20. This introduces greater complexity than simply identifying and keeping track of a single subject or target T, as it may involve cinematic framing and trajectory by defining, identifying, and/or detecting a subject, multiple subjects and/or a scene and/or a cinematic element such as a backlight, horizon, or other compositional aspects. The following techniques may be applied to the system.

First, consideration may be given to placement of a target T within a particular scene. Determining which features form parts of the scene can be useful so that the target T can be in front of the scene and preferably not obscured by parts of the scene during movement. Backlight may be considered to be in front of the scene and behind subject(s), and the maintenance of backlight (or any other particular form of lighting) can be set as a parameter constraining motion. Fixtures or stationary objects may be considered as located in a fixed place throughout a scene whereas subjects may be considered as dynamic actors within a scene.

Figure 8:
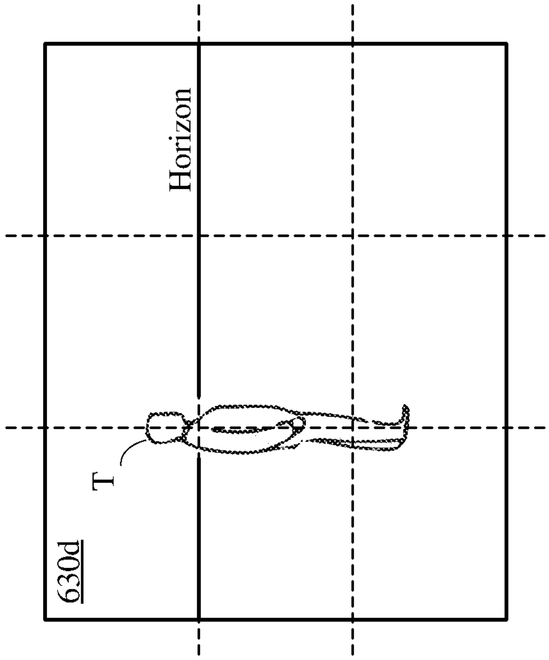
FIG. 8 is a pictorial representation of a video image frame that illustrates an application of the rule of thirds.

FIG. 8 is a pictorial representation of a video image frame 630*d* that illustrates an application of the rule of thirds, which is splitting a frame into a three by three grid that defines ideal placement for various elements within the frame as shown. The imaging device 100 may be positioned to maintain the horizon at an upper third position within the frame 630*d*, here, along a topmost horizontal grid line, and the target T within the left third of the frame 630*d*. In other applications of the rule of thirds, the horizon may be locked along the other of the horizontal grid lines and the target T can be captured so as to be located near various intersections of horizontal and vertical grid lines.

Other known compositional techniques may be further applied, such as the golden ratio, use of diagonals, element balancing, leading lines, symmetry and patterns, and use of negative space, and/or other techniques. A composition can ensure that there is adequate headroom for the subject, i.e., that the subject is framed such that ratios between subject features, top of subject, and top of frame form a reasonable ratio. Ratios may be sustained as the subject moves through the frame and as the imaging device 100 moves, for example, within or along with the MIA 20. Furthermore, a composition can ensure that there is adequate lead room, i.e., adequate space in front of a subject's motion or subject's heading.

All of the compositional techniques may be stored in a library along with algorithms and/or parameters used to define and implement the techniques. One or more of these compositional techniques by be selectable and operable simultaneously.

Any of the techniques described above for determining motion of the imaging device 100 or predicting or restraining motion of the subject S (or the target T) may be applied to creating and maintaining the compositional features described above. By way of example only, applying the constraints as described above with respect to FIGS. 7A and B may be utilized to create these specific compositional features.

Voice Command Tracking

Figure 9A:
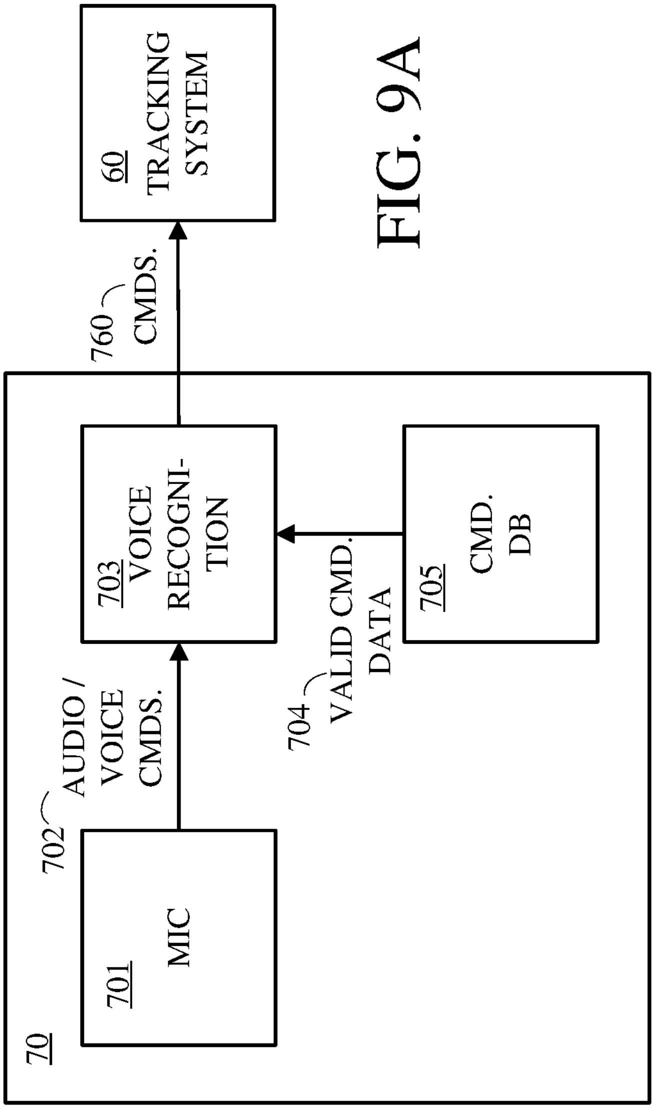
FIG. 9A is a block diagram of an implementation of a voice recognition system that may interact with a tracking system.
Figure 9B:
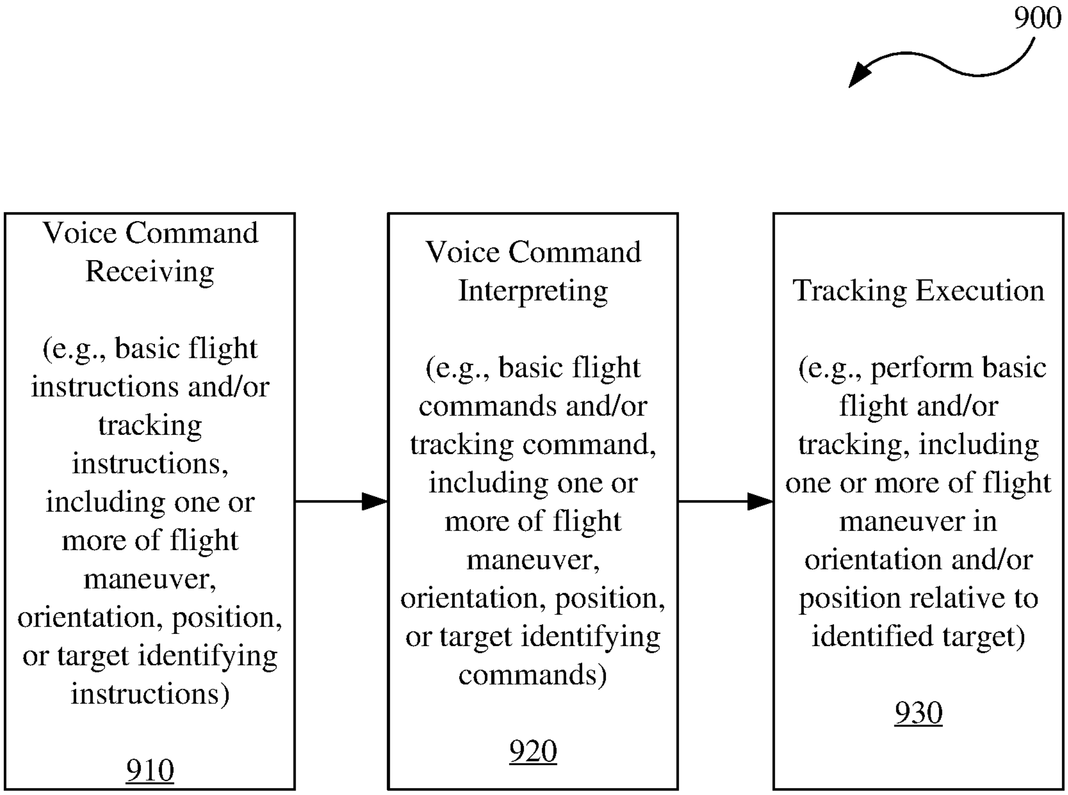
FIG. 9B is a block diagram of an implementation of a voice-controlled tracking system.
Figure 9C:
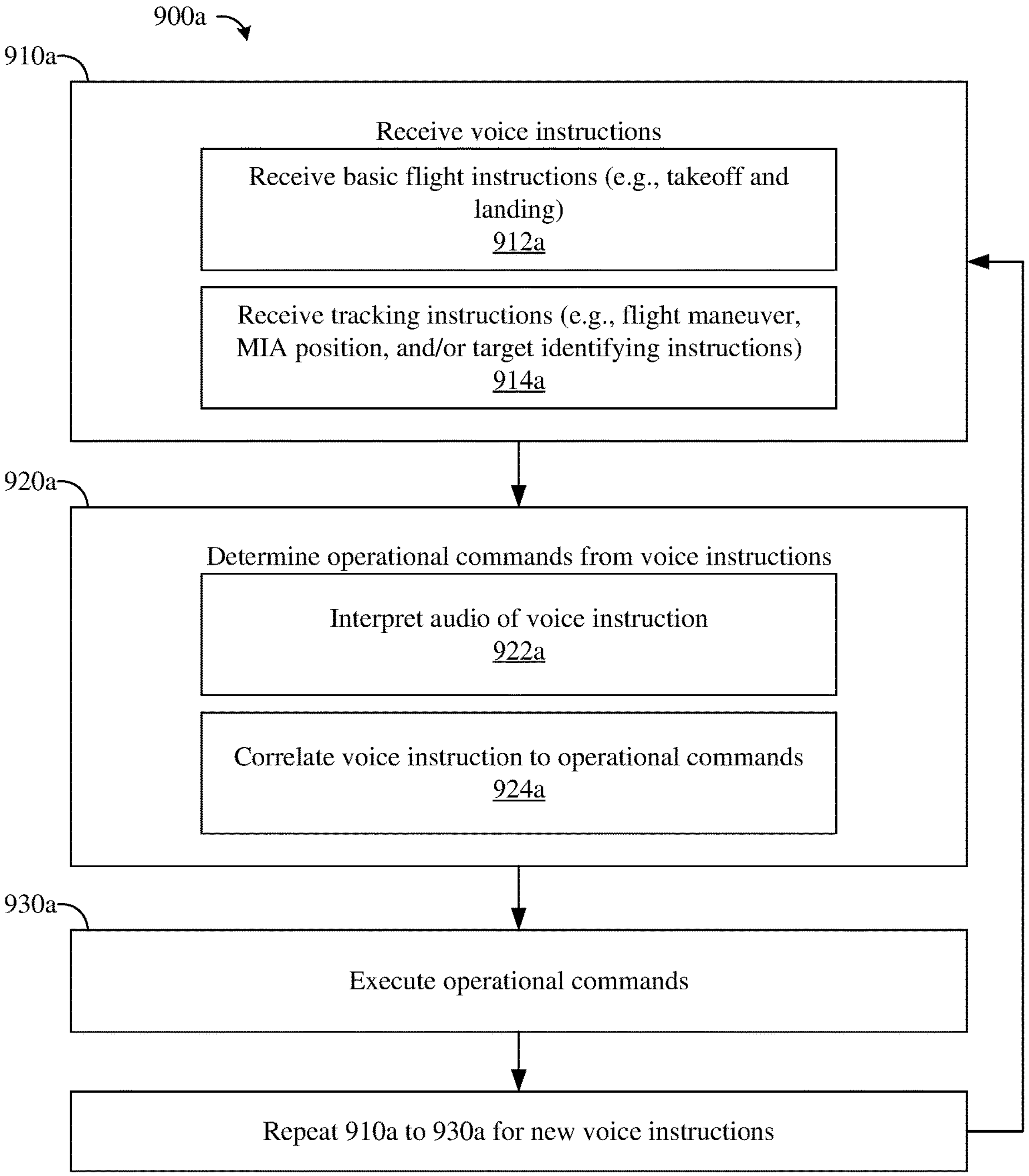
FIG. 9C is a flow diagram of a method implemented by the tracking system of FIG. 9B.
Figure 10:
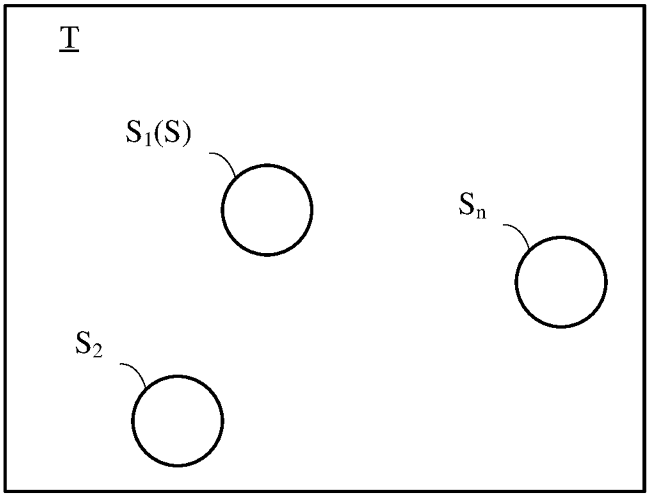
FIG. 10 is a pictorial diagram of a target T comprising a plurality of selectable subjects.

Referring to FIGS. 9A-10, a voice recognition system 70 or voice-controlled tracking or flight system 900 and a method or technique 900*a* are provided for a user or operator to control movement of the MIA 20 using voice commands. The tracking system 700' and the method performed thereby may be included in and/or implemented by various components of the movable imaging system 10 (e.g., the MIA 20, the imaging device 100, the external device 50, the tracking system 60, etc.).

When using visual tracking in a dynamic scenario (e.g., during action sports), the operator of the MIA 20 may not have the time or may not wish to control the subject tracking via physical (e.g., "hands-on") operation of the external device 50. This may occur in scenarios where an operator of a tracking system 60 is also the target T that is being tracked, such as a rider on a mountain bike, skate board, or surfboard.

FIG. 9A is a block diagram of an implementation of a voice recognition system 70 that may be utilized to perform the desired subject tracking without requiring, or by reducing, an amount of operator physical interaction with the external device 50. According to an implementation, the operator of the MIA 20 may carry or wear a microphone 701 connected to a voice recognition unit 703 that interprets audio or voice commands 702 from the operator and relays valid tracking commands 704 obtained from a command database 705 to the tracking system 60 of FIG. 1. The voice recognition unit 703 may comprise a speech-to-text converter unit. A searching algorithm can locate commands associated with the converted text in the command database 705 containing valid commands. The microphone 701 and/or the voice recognition unit 703 may, for example, be or be incorporated in the external device 50 or another device.

Using the voice commands 750, the operator may direct the MIA 20 to execute a wide variety of manners including, for example, basic flight and tracking instructions or commands. Commands for basic flight operations (e.g., basic flight commands) may, for example, pertain to starting flight (e.g., takeoff of the MIA 20 from a landed or home position) or ending flight (e.g., returning and landing the MIA 20 to the landed or home position). Such basic commands may be initiated basic control commands, such as "startup," "shutdown," or "stop," using the voice commands 750.

Tracking commands may, for example, include flight maneuver instructions and/or target identification instructions. Flight maneuver instructions may, for example, pertain to scripted flight maneuvers, which may be referred to herein as "ProMoves," and execute control over the MIA 20 to fly in a partially or wholly predetermined manner relative to the target T. Such scripted or predetermined flight maneuvers may, for example, including orbiting the target T, flying away from and back to the target T, or other predetermined flight maneuver (e.g., a user customized flight pattern). Flight maneuver instructions in the voice command 702 may specify further characteristics of the scripted flight maneuver, such as by specifying an orientation, relative vertical distance, relative horizontal distance, and relative speed of the MIA 20 to the target T. Target identification instructions in the voice command 702 allow the operator to specify which, of multiple subjects S, is to be the target T that the MIA 20 is to track or follow. As discussed below, the targets T may be pre-identified or may be identified during operation by a characteristic thereof identifiable with the imaging device 100.

In one example, the predetermined flight maneuver may be an orbit maneuver in which the MIA 20 orbits around the target T or a point of interested (POI). In an example where the voice command 702 includes "execute orbit at five meters altitude above the target T or a point of interest (POI) with a ten meter radius," the tracking system 60 may instruct the MIA 20 to move to a height of five meters above the target T and then continuously move tangentially about the target T at a distance of ten meters.

In another example, the predetermined flight maneuver may cause the MIA 20 to fly away and/or upward from the target T and/or may fly toward and/or downward toward target T. The voice command 702 may also instruct the MIA 20 to be positioned at an altitude five meters above the ground or to operate a "dronie" ProMove where the MIA 20 is directed to point at the target T or the POI and then fly backwards/upwards, etc. (e.g., to fly away and upward from the target T).

A variety of measurement units may be utilized. For example, the units of feet and meters may be mixed together in a single command, and the voice recognition unit 703 or the tracking system 60 could convert the mixed units to a standardized set of units accordingly. Also, specifics as to a number of repeated operations could be received as part of the voice command 702, such as "execute orbit twice." In the event insufficient parameters are supplied to generate a complete command (e.g., the "ten meter radius" was omitted from the above voice command 702), the operator could either be voice prompted for the additional information and/or some predefined default value could be used.

Absolute distances may be used in the voice commands 750 (e.g., "execute orbit at five meters") as well as relative distances (e.g., "execute orbit five meters higher"). In the event that a direction of travel or the orientation of the subject is available, the operator may also give voice commands 750 that take this information into account. For example, the voice command 702 can include language such as "take a shot from my right side." The above voice commands 750 are presented as examples, but do not constitute a comprehensive list of voice commands 750.

In another example, the predetermined flight maneuver may be to track the target T. For example, the operator may state "track" or "follow" as the voice command 702 in which case the MIA 20 follows the target T as the target moves in real space. The operator may also provide the orientation command as part of the voice command 702, for example, to instruct the MIA 20 to fly in an orientation relative to the movement of the target (e.g., rearward, forward, rightward, or leftward thereof) or in an orientation relative to a reference frame in real space, such as GPS coordinates (e.g., north, east, south, or west thereof). Still further, the operator may provide a position command as part of the voice command 702, for example, to fly in a particular spatial relationship (e.g., vertical height and/or horizontal distance) relative to the target T, as described above.

As reference above, the voice command 702 may include a target identifying instruction or command. FIG. 10 is a pictorial diagram of a target T comprising a plurality of selectable subjects $S_1$-$S_n$ for use in describing implementation examples for the voice recognition system 70 of FIG. 9A. In addition to focusing on a single subject S as a target T, the voice commands 750 sent to the voice recognition system 70 may specify a collection of subjects $S_1$-$S_n$ as the target T and/or be used to switch focus between several subjects $S_1$-$S_n$.

The specifying of subject(s) S as targets T may be performed in at least two ways: teaching and object recognition. In a first way (teaching), before a shot is taken, a teach-in phase during which the tracking system 60 learns characteristics of each subject, which may be later used for identifying the subject S as the target T (e.g., when receiving the voice commands 750 with a target identifying instruction). During the teach-in-phase, identifying characteristics of each subject $S_1$-$S_n$ are learned by the tracking system 60. For example, the MIA 20 may orbit each subject $S_1$-$S_n$, capture images subject $S_1$-$S_n$, and process the images to identifying various characteristics, such as a type (e.g., human, vehicle, etc.), color, and other suitable identifying information, for example, using suitable object recognition algorithms. Each subject $S_1$-$S_n$ may also be assigned a unique ID and/or voice identifier (e.g., name), which are associated with the identifiable characteristics thereof. Object recognition algorithms may be utilized to associate the subject S with its assigned ID. Then, in an operational phase, the operator may switch the focus of the tracking system 60 during the shots to different subjects $S_1$-$S_n$ using the voice commands 750, such as "switch focus to subject $S_1$." During the teach-in phase, instead of assigning unique IDs, actual names could be assigned to the subjects $S_1$-$S_n$ to make operation simpler for the operator (e.g., "switch focus to Alex"). For example, when receiving voice commands 750 that include target identifying instructions, the tracking system 60 may identify the subject S instructed to be the target T according to one or more the various identified characteristics. For example, a human recognition algorithm may be used to detect humans viewed by the imaging device 100, while further characteristics (e.g., color) may be used to distinguish the desired subject S from other human subjects S.

In a second way (object recognition), visual cues about objects may be used to select the subject(s) $S_1$-$S_n$. Object attributes such as color may be used ("switch focus to the person in the red shirt"). Object attributes such as position ("switch focus to the object in the lower left-hand of the screen") and shape may also be used, and these various object attributes may also be used in combination ("switch focus to the person with long, straight, brown hair").

In one example, the user may utilize the voice commands 750 within a planned or scripted shot or scene that may be planned out in advance using, e.g., software planning tools, so that cues may be given to move through the shot. An example shot might be one that statically frames two subjects $S_1$, $S_2$, then follows subject $S_1$ for ten seconds, then follows subject $S_2$ for five seconds, then pans out to frame both subjects $S_1$, $S_2$ with a horizon and other background elements of the scene. Such cinematic control could thus be integrated as part of the voice recognition system 70, and the composition of the shot may be controlled with commands such as: "places," "action," "next scene," (another) "next scene," "cut," "take it from the top," "take it from 'pan out.'" In this way, it is possible to create relatively sophisticated videos without requiring a high degree of physical interaction with the external device 50.

The types of control discussed above may be applied even when a controllable UAV is not used as part of the MIA 20. For example, when the imaging device 100 is connected to the imaging device movement mechanism 30, such as the gimbal mechanism discussed above, but there is no movable platform 40 or it is not one that is remotely controllable (e.g., a downhill skier uses the imaging device 100 with the imaging device movement mechanism 30 mounted to the skier's helmet or handheld by the skier), various types of the voice commands 750, such as subject selection and the like may still be utilized.

Referring to FIG. 9B, a block diagram of a voice-operated tracking system 900 is shown. In a first module 910 (e.g., a voice command receiving module) a voice command is received. The voice command, such as the voice command 702, is received from an operator, for example, with the microphone 701 or other listening device. The voice command 702 may be received from an operator that is the target T or is associated therewith (e.g., if the target T is a vehicle in which or on which the operator is riding) and pertain to another subject S. As described above, the voice commands 750 may, for example, include one or more of basic flight instructions and tracking flight instructions. The tracking flight instructions may include one or more of flight maneuver instructions (e.g., orbit, back and forth, or track or follow), orientation instructions (e.g., left, south, etc.), position instructions (e.g., vertical and/or horizontal distance and/or speed), and/or target identifying instructions (e.g., to switch between subjects), as described above.

In a second module 920 (e.g., a voice command interpreting module), the voice command is interpreted, for example with the voice recognition device 703, to process the audio of the voice command and correlate the voice commands (e.g., basic flight instructions, or the tracking flight instructions, including flight maneuver, orientation, position, and/or target identifying instructions) to operational commands. For example, the interpreted voice command may be correlated to the command database 705, from which the operational commands are determined. The operational commands may include one or more of flight maneuver commands (e.g., orbit, back and forth, or track or follow), orientation commands (e.g., left, south, etc.), position commands (e.g., vertical and/or horizontal distance and/or speed), and/or target identifying commands (e.g., to switch between subjects).

In a third module 930 (e.g., tracking execution module), the operational commands are executed by the MIA 20, the imaging device movement mechanism 30, and/or the imaging device 100 to move the MIA 20 relative to the target T and the imaging device movement mechanism 30 to execute the flight maneuver and maintain the target T in image frames captured by the imaging device 100. In executing the operational commands, the tracking system 900 may, when executing the flight maneuver with respect to a different subject S that has become the target T, identify the different subject S according to pre-identified characteristics (e.g., learned during a teach-in-phase) or object recognition (e.g., other identifiable characteristic, such as color).

The various modules of the imaging and tracking system 1210 and the display systems 1220, 1220', 1220" may be implemented by one or more of the tracking system 60, the MIA 20, the external device 50, the imaging device 100 and/or various hardware components thereof (e.g., processors, memories, and/or communications components).

Referring to FIG. 9C, a set of operations of the method 900*a'* are described for controlling the MIA 20 according to voice commands.

At 910*a*, voice commands or instructions are received. For example, voice commands may be received by the external device 50 or another device with the microphone 701. The voice instructions may include one or more of basic flight instructions received at 912*a* or tracking flight instructions received at 914*a*. The tracking flight instructions may include one or more of flight maneuver instructions, position instructions, or target identifying instructions. The basic flight instructions may, for example, be for takeoff and landing of the MIA 20. The flight maneuver instructions may include instructions for the MIA 20 to fly in a partially or wholly predetermined flight pattern relative to the target T (e.g., track/follow, orbit, etc.). The position instructions may include instructions for the MIA 20 to fly at desired positions relative to the target T.

At 920*a*, the voice instruction is interpreted, for example, with the voice recognition device 703. For example, audio of the voice instructions may be processed and correlated to operational commands. At 922*a*, the audio of the voice instruction is processed to interpret the voice instruction, for example, using a voice detection algorithm. The audio may be processed by the external device 50 or other device associated with the microphone 701, or may be sent to the external device 50 or MIA 20 for processing thereby. At 924*a*, the voice instruction is correlated to operational commands. The operational commands may, for example, be contained in the command database 705, which may be stored by the external device 50, other device associated with the microphone 701, or the MIA 20. The operational commands may include basic flight commands or tracking flight commands, the latter of which may include flight maneuver commands, position commands, and/or target identifying command.

At 930*a*, the operational commands are executed by the MIA 20. For example, the operational commands may be sent to from the external device 50 or another device associated with the microphone 701 to the MIA 20, as the case may be. The operational commands may then be executed by the tracking module 60 or other suitable tracking or flight module described herein (e.g., 300, 700, 700', etc.). For example, based upon a voice instructions to takeoff the MIA 20 begins flight, to land the MIA 20 lands or returns to a home position, for a flight maneuver instruction flies the MIA 20 according the predetermined flight pattern associated therewith, for a position instruction flies the MIA 20 in the instructed position relative to the target T, and/or for a target identifying instruction flies may change to target T to another subject S and executes flight instructions relative thereto (e.g., flight maneuver and/or position). Operations 910*a* to 930*a* are repeated upon receiving new voice instructions.

Ultra-Wide-Band Localization Using a Beacon Schema

A GPS device may be mounted to the MIA 20 and to the target T. The absolute positions of each may be read from the GPS devices and then a relative position between the two may be determined. However, the accuracy of GPS devices, particularly in measuring altitude, is generally limited and not sufficient to allow precise subject tracking control. It is desirable, when performing aerial subject tracking, to accurately know the position of the target T with respect to the MIA 20. The use of GPS beacons, i.e., devices that use GPS satellites to determine position and then broadcast that position to other GPS beacons, may be applied in the context of aerial subject tracking.

Figure 11A:
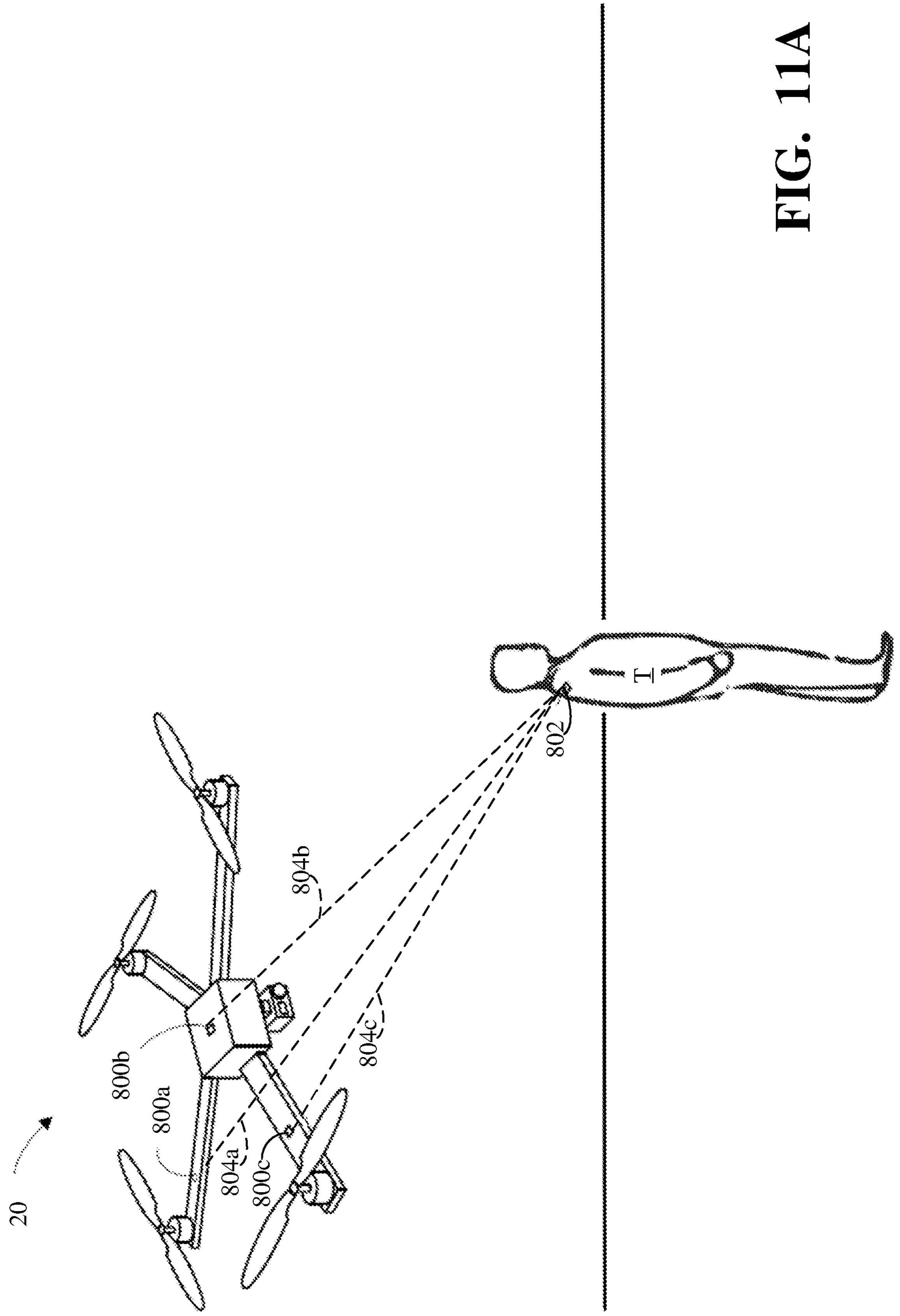
FIG. 11A is a pictorial representation of an MIA, such as the MIA of FIG. 2A, tracking a target using ultra-wide-band transceivers.

FIG. 11A is a pictorial representation of an implementation of the MIA 20 tracking a target T. In order to improve the accuracy in measuring a distance between the target T and the MIA 20, the system illustrated in FIG. 11 may utilize a set of ultra-wide-band transceivers (UWBTs) 800*a-c* (collectively or representatively, 800), 802 to directly estimate a relative position and velocity of the target T with respect to the MIA 20. This may be done by distributing anchor UWBTs 800 along the body of the MIA 20 and a target UWBT 802 to the moving target T, for example, by affixing three or more UWBTs 800*a*-800*c* with a known position (with respect to the MIA 20) on the MIA 20. Additionally, in this implementation, the target T has one additional target UWBT 802 affixed to it.

This implementation presents a low-cost approach to create a local relative position measurement system that can determine a distance between the MIA 20 and the movable target T having considerable accuracy. The accurately determined distance can then be provided to the tracking system 60 or other components of the MIA 20. Rather than using the UWBTs in static scenarios where a set of anchor UWBTs are distributed on the ground, the anchor UWBTs 800 are positioned such that all are movable with respect to a fixed-frame (e.g., earth-based) reference coordinate system, as is the target UWBT 802. Thus, this implementation performs subject tracking without requiring the use of static beacons. Static beacons may take time (and effort, in difficult environments) to place, set up, initialize, and/or configure, and the use of the MIA 20 may be restricted to locations close to where the static beacons are placed. A device that determines and analyzes positions calculated from the UWBTs 800, 802 can be located on the MIA 20 or the target T.

To perform subject tracking in this implementation, a distance between the target UWBT 802 on the target T and each of the anchor UWBTs 800*a*-800*c* anchored on the MIA 20 may be measured by a known time-of-arrival approach. For instance, at substantially the same time, one or more of the anchor UWBTs 800*a-c* may transmit a respective signal 804*a*, 804*b*, and 804*c*. Based on the times of travel for the signals 804*a-c* and a velocity thereof, individual distances between the anchor UWBTs 800*a-c* and the target UWBT 802 may be determined. From the individual distances, a relative position of the target T may be derived using, e.g., known sphere intersection techniques for four or more UWBTs 800*a-c*, 802 serving as anchors or known triangulation techniques (where only three UWBTs 800*a-c* serve as anchors).

By employing phase shift approaches, a relative direction of the target T with respect to the MIA 20 may be derived.

This becomes more useful once a position estimate degrades due to conditioning issues (e.g., a small anchor baseline relative to the subject-UAV distance). By fixing an inertial measurement unit on one or more of the UWBTs 800*a*-800*c* of the MIA 20 and/or the target UWBT 802 on the target T, relative position estimates may be improved. In addition, relative velocity estimates may be improved, both in terms of relative positions (between the target T and the MIA 20) and absolute positions (with respect to an earth framework).

Figure 11B:
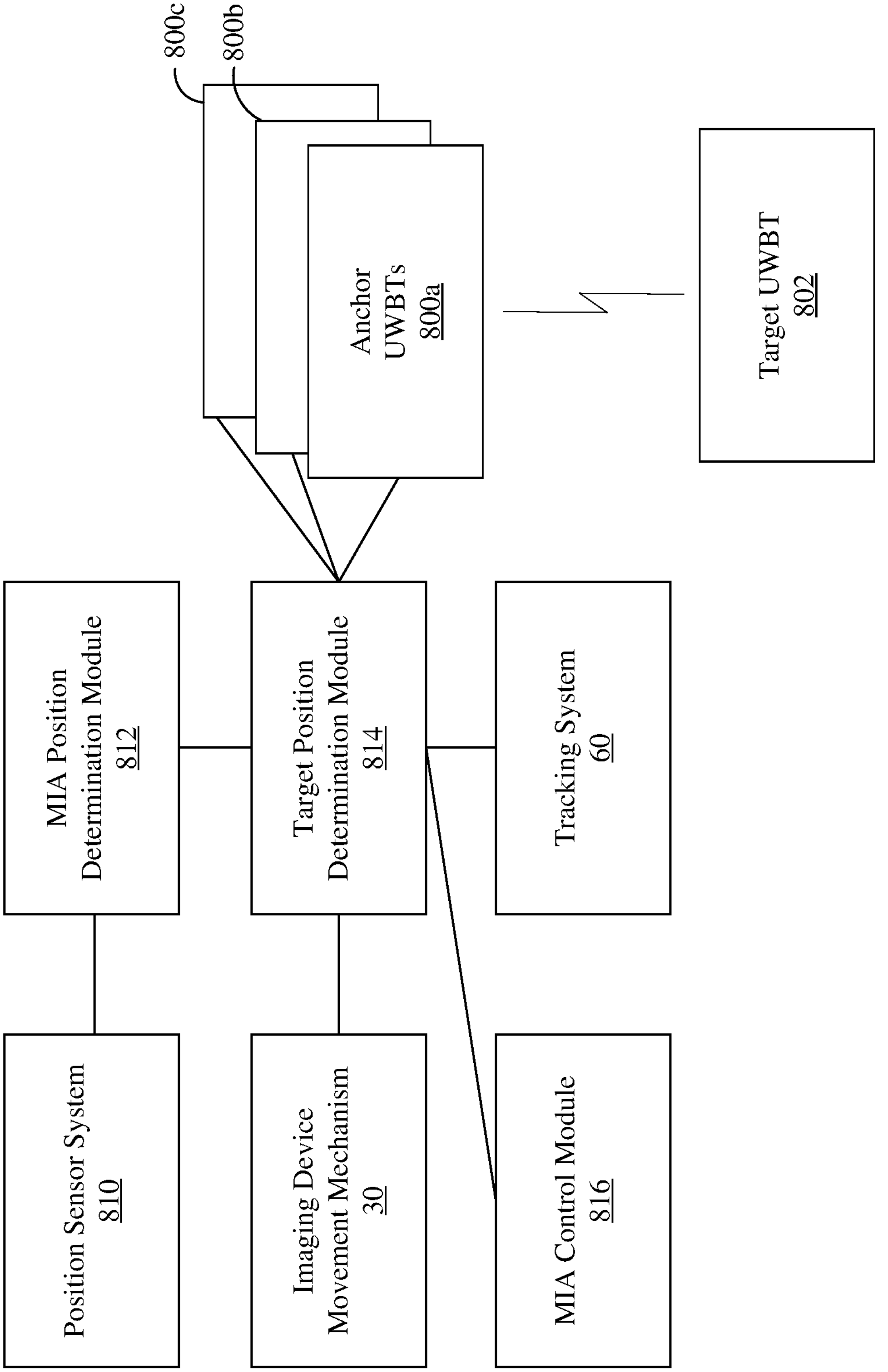
FIG. 11B is a block diagram of an implementation of another tracking system.

FIG. 11B illustrates an example system for tracking the movement of a target. The example system may include a set of three or more anchor UWBTs 800*a-c*, a target UWBT 802, a position sensor system 810, an MIA position determination module 812, a target position determination module 814, the tracking system 60, an MIA control module 816, and the imaging device movement mechanism 300. The system may include additional components not discussed. Furthermore, two or more of the components disclosed above may be integrated into a single component.

The position sensor 810 system may include one or more sensors that output signals that indicate a position of the MIA 20. For example, the position sensor system may include one or more metadata sources 144, such as one or more IMUs, accelerometers, gyroscopes, and/or a global positioning system (GPS). In implementations where the position sensor system 810 include accelerometers and/or gyroscopes, the position sensor system 810 may output position signals that are relative to a starting location. For instance, if the flight of the MIA 20 begins at a starting location that is assigned the coordinates (0,0,0), the position sensor system 810 may output position signals that indicate the position relative to the starting location. In this example, the coordinates are a triple that indicates an east/west value (e.g., along an x-axis), a north/south value (e.g., along a y-axis), and an altitude (e.g., along a z-axis), where the units are measured in any suitable metric (e.g., meters, feet, yards). Continuing the example, if the MIA 20 flies in an upward manner 10 meters, the position sensor system 810 may output a position signal indicating a location of (0, 0, 10). The position sensor system 810 may output position signals at predetermined time intervals, e.g., every second. To the extent that the position sensor system 810 includes a GPS, the GPS signal may be an absolute position signal (e.g., latitude and longitude) and may be blended with the output of an accelerometer and/or gyroscope to more accurately estimate the position of the MIA 20.

The MIA position determination module 812 monitors the position sensor system 810 to estimate a position of the MIA 20. In some implementations, the MIA position determination module 812 receives position signals from the position sensor system 810 and determines the position of the MIA 20 throughout the flight of the MIA 20. The MIA position determination module 812 may determine a relative position of the MIA 20 or an estimated absolute position of the MIA 20 at a given time. The output of the MIA 20 may include a time stamp, such that the output of the MIA position determination module 812 indicates a position of the MIA 20 and a relative time when the position of the MIA 20 was determined (e.g., (t, x, y, z)). For example, the MIA position determination module outputs the following series of positions (0, 0, 0, 0), (1, 0, 0, 8), (2, −3, 0, 8), (3, −6, 0, 8). In this example, the output of the MIA position determination module 812 indicates that the MIA 20 moved ten meters in an upward direction between time=0 sec and time=1 sec, and then proceeded to move in an easterly direction over the next two seconds. The output of the MIA position determination module 812 may indicate relative positions at a given time or estimated absolute positions of the MIA at a given time. The MIA position determination module 812 may output the time stamped positions of the MIA to the target position determination module 814, the tracking system 600, and/or the MIA control module 816.

The target position determination module 814 determines a position of the target UWBT 802 with respect to MIA 20 at a given time. The position may be an estimate of the actual position of the target UWBT 802 with respect to the MIA 20. In some implementations, the target position determination module 814 controls the anchor UWBTs 800*a-c* to determine the position of the target UWBT 802. The target position determination module 814 may command the anchor UWBTs 800*a-c* to transmit respective signals to the target UWBT 802. In response to the signals, the target UWBT 802 returns a corresponding response signal (or set of response signals) that is received by each of the anchor UWBTs 800*a-c*. Each of the anchor UWBTs 800*a-c* can pass the signal to the target position determination module 814. The target position determination module 814 can determine a roundtrip time for each instance of the response signal received via each respective anchor UWBT 800 from the target UWBT 802. Put another way, the target position determination module 814 can determine the total amount of time that lapses between a respective anchor UWBT 800 sending the signal to the target UWBT 802 and the respective anchor UWBT 800*a* receiving the response signal from the target UWBT 802. Based on the total amount of time to transmit and receive the signal to/from the target UWBT 802, the target position determination module 814 can estimate the distance between a respective anchor UWBT 800 and the target UWBT 802. Alternatively, the target position determination module 814 may instruct a single anchor UWBT 800 to transmit a signal to the target UWBT 802. In response to receiving the signal, the target UWBT 802 broadcasts a single signal that is received by each of the anchor UWBTs 800. In either scenario, the target position determination module 814 may utilize the amount of time that lapsed between the transmission of the signal(s) and receipt of the response signal(s) at the respective anchor UWBTs 800 to estimate the distance between each anchor UWBT 800 and the target UWBT 802. In these cases, the target position determination module 814 may account for the amount of time for the target UWBT 802 to transmit the response signal in response to receiving a signal from the anchor UWBT(s) 800. The target position determination module 814 may treat this time as a constant, c, such that the constant c is subtracted from the total roundtrip time. For each UWBT 800, the target position determination module 814 can estimate the distance between the respective anchor UWBT 800 and the target UWBT 802 by, for example, the following formula:

$$d=(t-c)v \quad (1)$$

Where t is the total round-trip time, c is the constant attributed to the target UWBT 802 responding, and v is the speed at which the signals travel.

Upon determining the distance between each anchor UWBT 800 and the target UWBT 802, the target position determination module 814 can calculate a position of the target UWBT 802 with respect to the MIA 20. Given that the anchor UWBTs 800 are fixed along a body of the MIA, and therefore, the distances between the anchor UWBTs are fixed, the target position determination module 814 can utilize these fixed points to determine the position of the target with respect to the MIA 20 or a specific point on the MIA 20. The position with respect to the MIA 20 may be a three-dimensional vector that imparts distances in the x, y, and z directions with respect to the MIA 20. In some implementations, the target position determination module 814 determines the position of the target UWBT 802 with respect to the MIA 20 using triangulation techniques. In determining the position of the target UWBT 802 relative to the MIA 20, the target position determination module 814 may also take into account an orientation of the MIA 20, which may, for example, be determined by the MIA position determination module 812 using the position sensor system 810 (e.g., accelerometers, etc.). For example, if the MIA 20 were to roll, pitch, or yaw about the x, y, and z-axes in real space between times at which the relative position of the target UWBT 802 is determined, the anchor UWBTS 800*a-c* would also move relative to the x, y, and z-axes, which may be accounted for when relating the relative motion or position of the target UWBT 802 back to the x, y, z coordinate system. As an illustration, if the MIA 20 were to yaw 180 degrees about the z-axis between two times without relative movement of the UWBT 802, the measured x and y distances would have opposite signs between the two times (e.g., the UWBT 802 might change from being behind to in front of the MIA 20).

Using the target position with respect to the MIA 20, as well as the position and orientation of the MIA 20 that is obtained from the MIA position determination module 812, the target position determination module 814 can determine an estimated location of the target UWBT 802. The estimated position of the target UWBT 802 may be relative to the starting point of the MIA 20 (e.g., in the case only gyroscopes and accelerometers are used) or an absolute location (e.g., if the position sensor system 810 includes a GPS). The target position determination module 814 may determine the location of the target UWBT 802 according to:

$$LOC_{Target}=POS_{MIA}+POS_{Target} \quad (2)$$

Where LOC Target is either the relative or absolute location of the target UWBT 802, POS MIA is the relative or absolute location of the MIA 20, and $POS_{Target}$ is the position determined with respect to the MIA using triangulation or other suitable method.

In some implementations, the target position determination module 814 can determine a direction of travel and/or velocity (which includes the direction of travel) of the MIA 20 and the target UWBT 802 with respect to the MIA 20. In these implementations, the MIA position determination module 812 can monitor the position of the MIA 20 at a first time and a second time. Based on the position of the MIA 20 at the first time and at the second time, the MIA position determination module 812 can determine the velocity of the MIA 20, where the velocity is a three-dimensional vector showing a magnitude of velocity with respect to x, y, and z axes. The amount of time between the first time and second time may be any suitable amount of time. Preferably, no more than two seconds should pass between the first time and second time, so that the velocity of the MIA 20 may be more accurately estimated.

Similarly, the target position determination module 814 can monitor the position of the target T (i.e., the UWBT 802) relative to the MIA 20 at a first time and a second time. Based on the position of the UWBT 802 at the first time and at the second time, the target position determination module 814 can determine the velocity of the UWBT 802 relative to the MIA 20. The velocity of the UWBT 802 relative to the MIA 20 may be added to the velocity of the MIA 20 to determine the velocity of the UWBT 802 with respect to x, y, and z axes. Instead, or additionally, the velocity of the of the UWBT 802 relative to the MIA 20 may be determined according to principles of the doppler effect by comparing a measured frequency of one or more of the signals 804*a*, 804*b*, 804*c* to a default frequency thereof (e.g., if no relative movement between the UWBT 802 and the MIA 20 were to occur).

The target position determination module 814 can output the position of the target UWBT 802 with respect to the MIA 20, the location of the target UWBT 802, and/or the velocity of the target UWBT 802 to the tracking system 60, the MIA control module 816, and/or the imaging device movement mechanism 30. In some implementations, the tracking system 60 and/or the imaging device movement mechanism 30 may utilize the position of the target UWBT 802 to adjust the orientation of the imaging device 100, such that the target may be observed in the field of view of the imaging device 100. Similarly, the tracking system 60 and/or the imaging device movement mechanism 30 may utilize the position of the target UWBT 802 to adjust a zoom setting of the imaging device 100. For example, if the location of the target UWBT 802 is relatively far away (e.g., more than 20 meters), the tracking system 600 and/or imaging device movement mechanism 300 may increase the zoom setting to better observe the target, T.

In some implementations, the MIA control module 816 controls the movement of the MIA 20. The MIA control module 816 may be programmed with one or more routines that define a motion of the MIA 20 with respect to a target (e.g., fixed distance from the target, circle the target, etc.), with respect to a starting location, or any other suitable reference. To perform the routines, the MIA control module 816 may utilize the location of the target UWBT 802 and/or the velocity of the target UWBT 802, and the routine being executed to control the flight path of the MIA 20. For example, if the MIA 20 is to keep a fixed distance from the target, then the MIA control module 816 may mirror the velocity of the target UWBT 802 to maintain a fixed distance from the target. The foregoing scenarios are provided for example only, as the tracking system 60, the MIA control module 816, and/or the imaging device movement mechanism 30 may utilize the position of the target UWBT 802 with respect to the MIA 20, the location of the target UWBT 804, and the velocity of the target UWBT 802 to control any number of settings of the imaging device 100 or movements of the MIA 20.

While shown as having three anchor UWBTs 800*a-c*, the MIA 20 may include any number of anchor UWBTs 800 greater than or equal to three. Furthermore, it is understood that the estimated position of the target UWBT 802 with respect to the MIA 20, the estimated location of the target UWBT 802, and the estimated velocity of the target UWBT 802, as determined by the target position determination module 814, may be blended with outputs of other components of the MIA 20 to obtain an estimated location and/or velocity of the target, T.

Figure 11C:
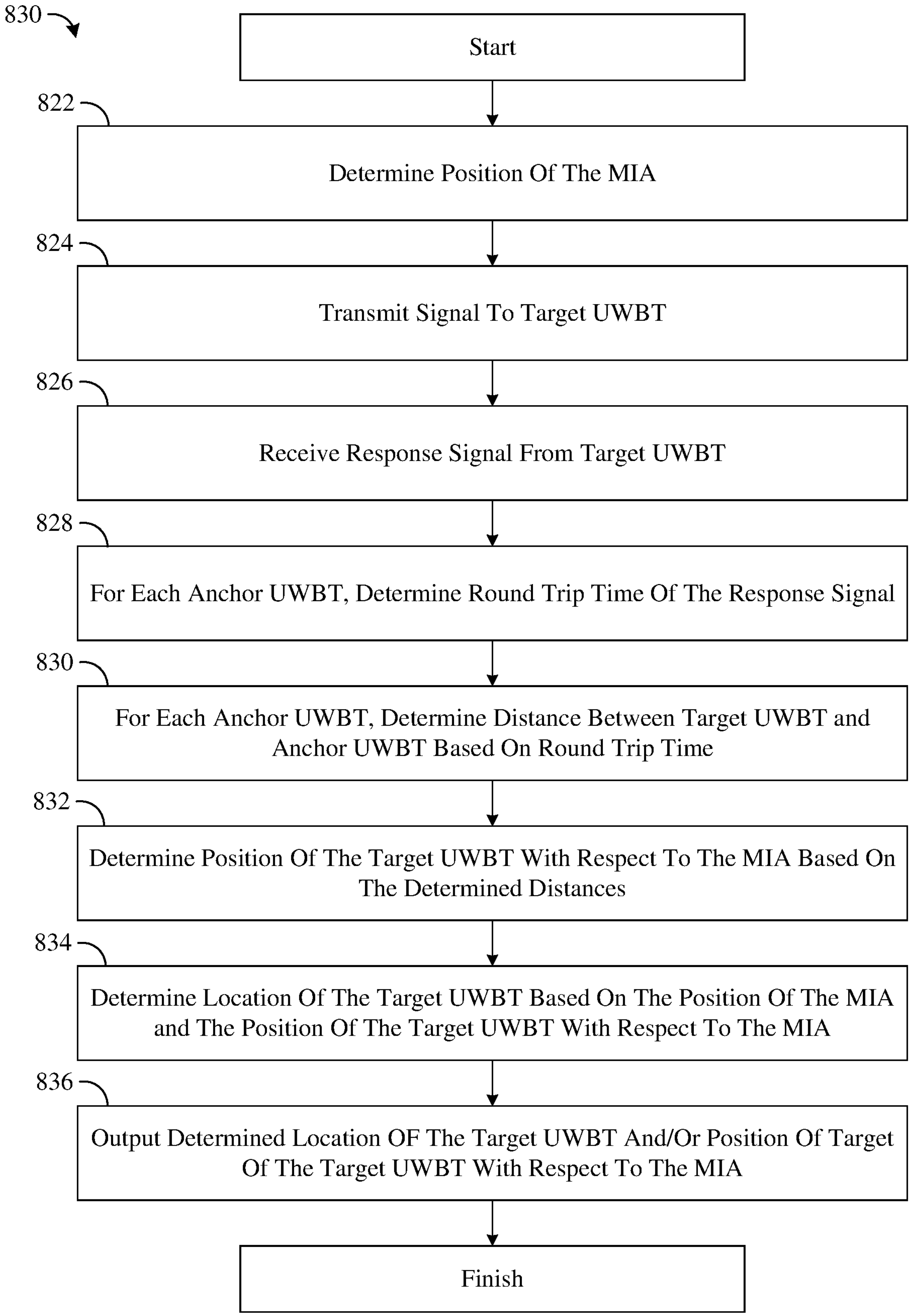
FIG. 11C is a flow diagram of a method implemented by the tracking system of FIG. 11B.

FIG. 11C illustrates an example set of operations of a method 820 for determining a location of a target UWBT 802. The method 820 is described as being performed by the components of FIG. 11B. It is appreciated that the method 820 may be performed by any suitable components of an MIA 20 (or similar device) without departing from the scope of the disclosure.

At 822, the MIA position determination module 812 determines a position of the MIA. The MIA position determination module 812 may receive position signals from the position sensor system 810. For example, the MIA position determination module 812 may obtain signals from an accelerometer, a gyroscope, and/or a GPS system of the MIA 20 to obtain a position of the MIA 20 (e.g., x, y, and z coordinates). The position may be a relative position that is relative to a starting point of the MIA 20 or an absolute position (e.g., longitude, latitude, and altitude). The orientation of the MIA 20 (e.g., roll, pitch, and yaw about x, y, and z axes) may also be determined, for example, relative to the starting point and/or fixed coordinates.

At 824, one or more of the anchor UWBTs 800 transmits a signal to the target UWBT 802. In response to receiving a signal from the UWBTs 800, the target UWBT 802 returns a response signal to the anchor UWBTs 800. At 826, each anchor UWBT 800 receives the response signal from the target UWBT 802. It should be appreciated, that each anchor UWBT 800 may receive the response signal at a slightly different time. At 828, the target position determination module 814 may determine the roundtrip time for the received response signal for each of the UWBTs 800. The roundtrip time for a respective anchor UWBT 800 may be the amount of time from when the initial signal was transmitted to the target UWBT 802 to when the respective anchor UWBT 800 received the response signal. At 830, the target position determination module 814 may determine, for each respective anchor UWBT 800, a distance between the respective anchor UWBT 800 and the target UWBT 802 based on the roundtrip time of the signal. As mentioned, the target position determination module 814 may account for any lag attributed to the target UWBT 802 receiving the signal and transmitting the response signal. In some implementations, the target position determination module 814 may utilize equation (1) to determine the distance between the respective anchor UWBT 800 and the target UWBT 802, as provided above.

At 832, the target position determination module 814 determines a position of the target UWBT 802 with respect to the MIA 20 based on the determined distances. The position of the target UWBT 802 relative to the MIA 20 may also be based on the orientation of the MIA 20. Using triangulation techniques, the target position determination module 814 can estimate a position of the target UWBT 802 with respect to the MIA 20. As previously discussed, the target position determination module 814 knows the positions of each of the anchor UWBTs with respect to the MIA. Using the positions of the anchor UWBTs 800 with respect to one another and the distances determined at 830, the target position determination module 814 determines the position of the target UWBT 802 with respect to the MIA 20, for example, using triangulation. At 834, the target position determination module 814 can optionally determine a location of the target UWBT 802. The target position determination module 814 can utilize the position of the MIA 20 and the position of the target UWBT 802 relative to the MIA 20 to determine the location of the target UWBT 802. In some implementations, the target position determination module 814 utilizes equation (2) to determine the location of the target UWBT 802. The location of the target UWBT 802 may be a relative location (e.g., with respect to a starting point of the MIA 20) or an absolute location (e.g., latitude, longitude, and height). At 836, the target position determination module 814 can output the determined location of the target UWBT 802 and/or the position of the target UWBT 802 with respect to the MIA 20. For example, the target position determination module 814 may output one or both of the values to the tracking system 60, the MIA control module 816, and/or the imaging device movement mechanism 300 to control the operation of the MIA 20.

It should be appreciated that the outputted values may be regarded as estimates of location, position, and/or velocity. The methods 830, 850 may be combined into a single method, whereby estimates of location, position, and/or velocity of the target, T may be output to the downstream components of the MIA 20.

Improvements in relative position and velocity estimates may be advantageous since the high-level output of the system may be noisy position measurements and/or a relative range between beacons. By fusing this output with gyroscope and accelerometer data in a sensor fusion framework, the system may be able to: a) increase frequency (internal measurement unit (IMU) data may be higher frequency than UWB measurements); b) reduce noise in position estimates; c) obtain accurate velocity information (by fusion of position and acceleration (which is a second derivative of position)); and d) reduce a delay in a position estimate by synchronizing a time between IMU measurements (very low latency) and UWBT measurements such that any delay in providing the UWBT measurements may be eliminated.

System Architecture and Dataflow: Latency and Synchronization

As described with respect to FIG. 1, the MIA 20 may include the imaging device 100, such as a camera, which may be mounted to the movable platform 40, such as a drone, via an imaging device movement mechanism 30, such as a gimbal as described above. The imaging device movement mechanism 30 can also provide for active stabilization of the imaging device 100, and/or the captured images themselves can be stabilized using image shake correction techniques. The external device 50, such as the MIA controller and user interface discussed above, may be utilized for controlling the MIA 20.

Referring to FIGS. 12A-12D, a tracking display system 1200 is configured to simultaneously display on the display screen of the external device 50 both video captured by the MIA 20 (e.g., the imaging device 100) and tracking information corresponding to the video being displayed (i.e., tracking information corresponding to the video image frames). The tracking and display system 1200 includes various modules that are included in and/or performed by various hardware components of the movable imaging system 10 (e.g., the MIA 20, the imaging device 100, the external device 50, the tracking system 60, etc.).

Figure 12A:
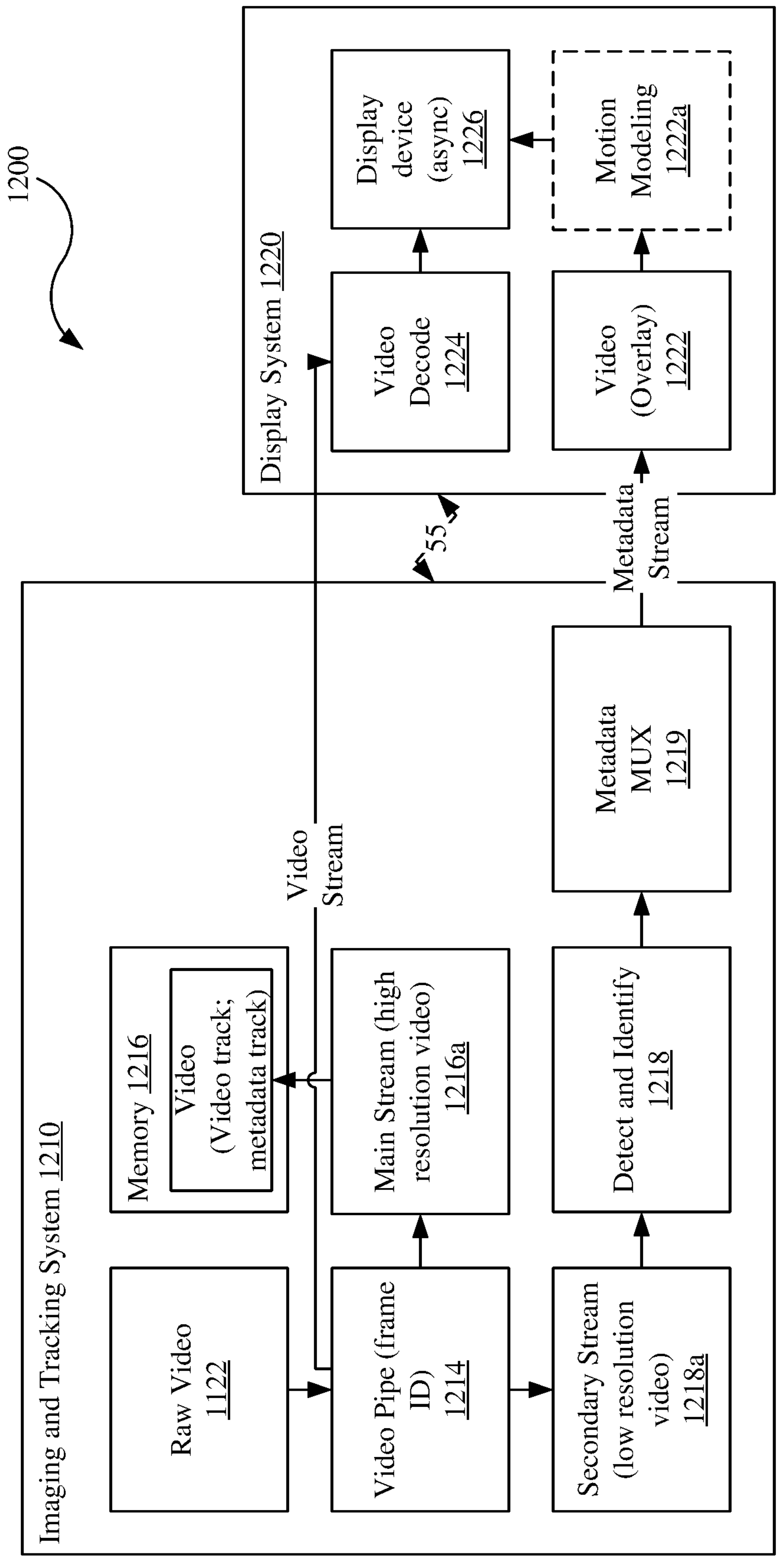
FIG. 12A is a block diagram of various modules of a tracking imaging system having an un-optimized display system, according to an implementation.
Figure 12B:
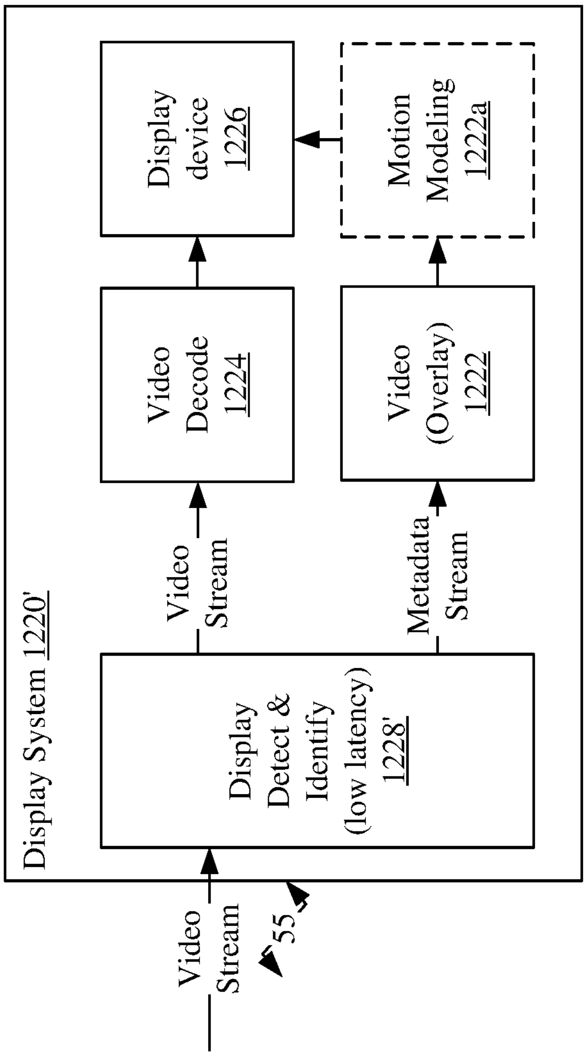
FIG. 12B is a block diagram of an alternative display system for use in the tracking imaging system of FIG. 12A.
Figure 12C:
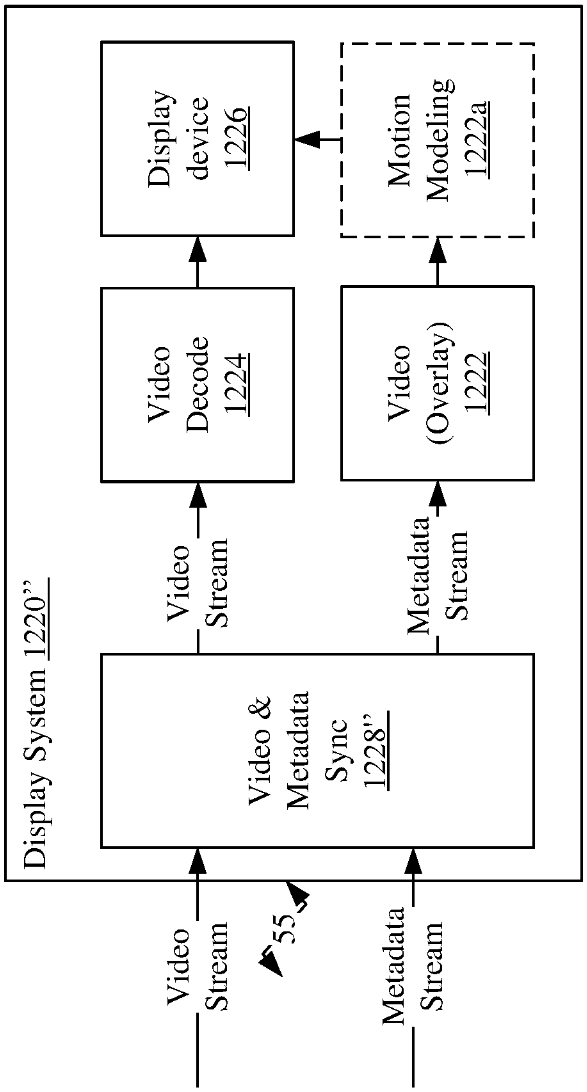
FIG. 12C is a block diagram of another alternative display system for use in the tracking imaging system of FIG. 12A.
Figure 12D:
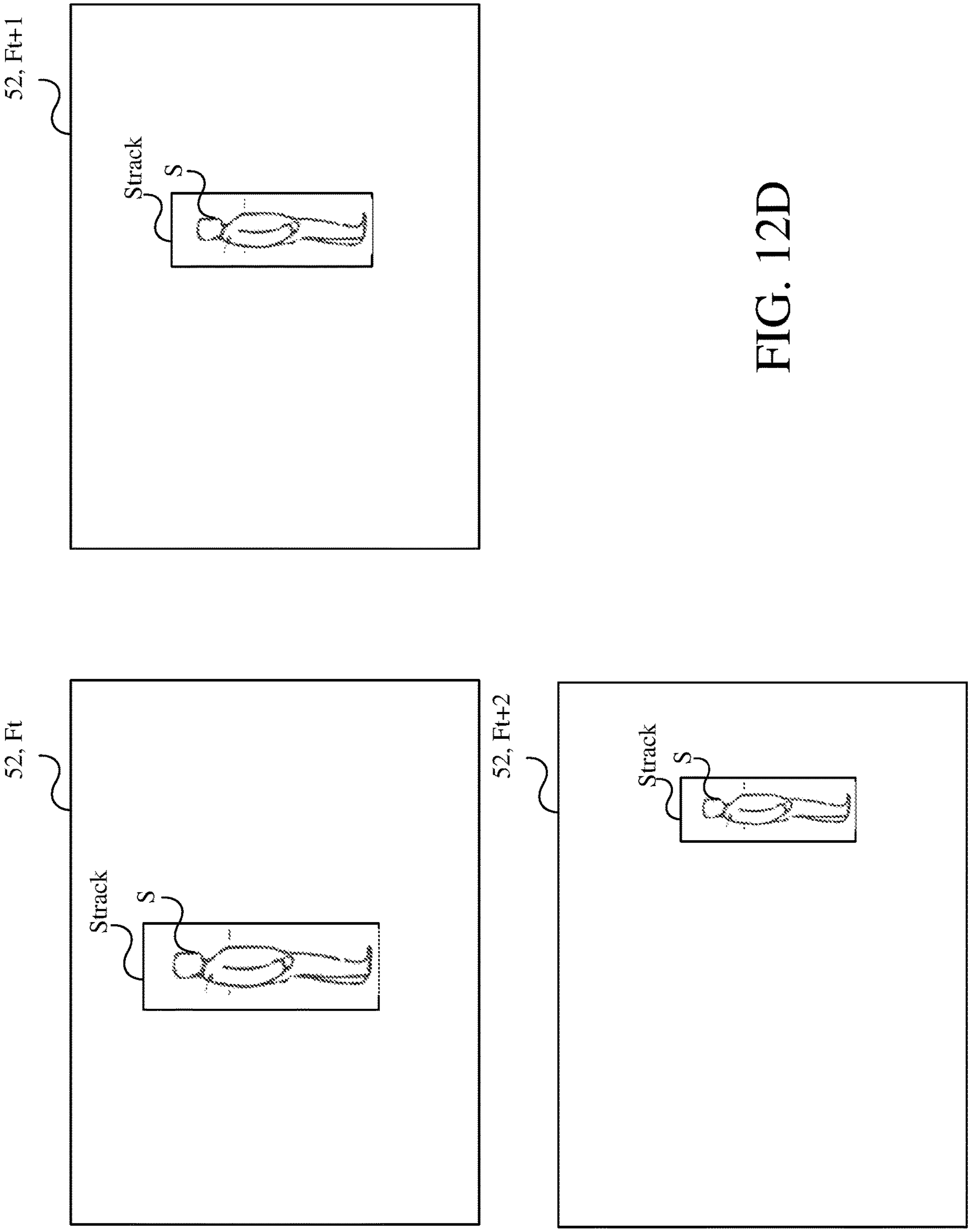
FIG. 12D is a sequence of display images on a display device provided by the tracking imaging system of FIG. 12A.

As shown in FIG. 12D, the display device 52 of the external device 50 displays a tracking graphic $S_{track}$ that visually identifies the subject S being tracked with the tracking graphic $S_{track}$ being displayed on the external device 50 in a generally constant spatial relationship relative to the subject S in successive video image frames $F_t$, $F_{t+1}$, $F_{t+2}$ even as the subject S moves to different positions and/or changes sizes within successive video image frames. The tracking graphic $S_{track}$ may, for example, be a bounding box (e.g., an outline of the bounding box) that is displayed around the subject S or a portion thereof in successive video image frames on the external device 50.

FIG. 12A is a block diagram of the tracking display system 1200 that includes an imaging and tracking system 1210 and a display system 1220, which may implement a tracking display method 1200*a*. The imaging and tracking system 1210 is operated by the MIA 20 (e.g., by the imaging device 100 and the tracking system 60, which itself may be operated by the imaging device 100). The imaging and tracking system 1210 may also be referred to as a combined imaging and tracking system 100, 60. The display system 1220 may be included with and/or be operated by the external device 50. A video stream (e.g., a display video stream) and a metadata stream (e.g., subject stream) may be sent simultaneously from the imaging and tracking system 1210 (e.g., be provided as outputs from the MIA 20 via the link 55) to the display system 1220 (e.g., the external device 50).

The imaging and tracking system 1210 includes various modules for capturing video image frames, storing the video image frames, generating tracking information from the video image frames, and sending the video image frames and the tracking information to the display system 1220 (e.g., from the MIA 20 via the link 55 to the external device 50). In a raw video module 1212 (e.g., image capture module), raw video is captured by the imaging and tracking system 1210 (e.g., by the image sensor 136 of the imaging device 100). In a video pipe module 1214, the raw video (or processed video) is sent or distributed to a storage module 1216, a tracking module 1218, and to the display system 1220.

The storage module 1216 receives a main video stream (e.g., high resolution video), which is stored as a video track along with a corresponding metadata track (e.g., having a time information and/or other metadata described previously) (e.g., by the electronic storage 138 of the imaging device 100). A main video stream module **1216*a* may process the raw video from the video pipe module 1214 (e.g., converting to an appropriate format and/or resolution) before being stored by the storage module 1216**.

The tracking module 1218 tracks a subject S (e.g., performs subject following), for example, by operating the tracking system 60. Algorithms of the tracking system 60 (e.g., software programming containing the algorithms) may be run on MIA 20, for example, by the imaging device 100. The tracking module 1218 receives a secondary video stream (e.g., low resolution video) and generates tracking information therefrom. A secondary stream module **1218*a* may process the raw video from the video pipe module 1214 (e.g., converting to an appropriate format and/or resolution) before being processed by the tracking module 1218. The tracking information generated by the tracking module 1218 is sent as a metadata to the display system 1220. A metadata module 1219 (e.g., operated by a MUX or multiplexer) may, for example, process the tracking information (e.g., converting to an appropriate metadata format, such as pertaining to the tracking display graphic $S_{track}$) to generate the metadata sent to the display system 1220. This tracking information (i.e., the output from the tracking algorithm running on the imaging device 100) may also be used by the MIA 20 for the physical (e.g., actual) tracking of the subject S (or the target T) with the MIA 20 and/or the imaging device 100**.

The pipe module 1214 may send the display video stream directly to the display system 1220. Alternatively, an intermediate module (not shown) may process the raw video (e.g., into an appropriate format and/or resolution) to be sent and received by the display system 1220.

Still referring to FIG. 12A, a block diagram of the display system 1220 includes various modules for processing the display video stream and the metadata stream, and for displaying the video image frames and the tracking information. The display system 1220 may be considered an un-optimized display system, as the video stream and the tracking information (e.g., overlay of the tracking graphic $S_{track}$) may be displayed asynchronously, as discussed below.

A tracking overlay module 1222 (e.g., video module) of the display system 1220 is provided with the metadata stream as an input, and processes the metadata stream to perform an overlay function for the display device 52. The metadata stream may include tracking information, such as a location and size (or shape) of the subject S based on which the tracking overlay module 1222 generates the tracking graphic $S_{track}$ for display (e.g., overlay on the video image frames on the display device 52 of the external device 50). For example, the tracking graphic $S_{track}$ may be a bounding box that moves position and is sized to be around the subject S as the subject S moves in successive video image frames.

The display video stream is provided as an input to a video decoding module 1224 (e.g., video decoder) of the display system 1220. The video decoding module 1224 processes the display video stream for displaying video image frames (e.g., converts to an appropriate format and/or resolution for display on the display device 52 of the external device 50).

A display module 1226 of the display system 1220 then displays both the video image frames and the tracking graphic $S_{track}$. For example, the display module may be or include the display device 52 of the external device 50.

The tracking graphic $S_{track}$ (e.g., tracking overlay) may be displayed asynchronously with the video image frames (e.g., decoded video) on the display device 52. Delay between the display image stream and the metadata stream from the image and tracking system 1210 to the display system 1220 may occur in various circumstances. For example, when the image and tracking system 1210 is operated entirely by the imaging device 100, the processor 132 of the imaging device 100 may execute those modules related to video (e.g., capture, processing, storage, and transfer of modules 1212, 1214, 1216, **1216*a*), while also executing those modules related to tracking (e.g., generation, processing and transfer in modules 1218, 1218*a*, and 1219). The processor 132 may, in some circumstances, lack sufficient processing powerful, for example due to size and power constraints, to perform both the video-related functions, which may be the primary task of the processor 132, and the tracking-related functions or tasks. Thus, running the tracking system 60 on the imaging device 100 may be relatively slow and introduce delay between the display video stream and the metadata stream. In turn, the display system 1220 may display the video image frames and the tracking graphic $S_{track}$ out of time sync with each other. Alternative display systems 1220' and 1220" are discussed below, which may reduce and/or eliminate this delay between the successive video frames and the tracking information to the user (e.g., with the bounding box around the subject S or other metadata on the display device 52 of the external device 50**).

Since a framerate of the display video stream (e.g., from the imaging device 100) may be higher than a framerate of the metadata stream (e.g., from the tracking system 60), for example, due to the high processing load of the processor 132 (e.g., performing both the video and tracking related functions, as discussed above), or high processing load of another processor of the MIA 20 otherwise performing the tracking functions. As a result, display of the tracking graphic $S_{track}$ (e.g., the bounding box around the subject S), but or other displayed metadata associated with the video image frames can be disjointed and have a stuttering look and feel to the user. For example, if the video image frames were displayed at 60 frames per second (fps) and the tracking graphic $S_{track}$ would displayed at 12 fps, the tracking graphic $S_{track}$ would move only once for every five video image frames and, thus, stutter (e.g., lag, jump, etc.) as the subject S moves to different positions within successive video image frames.

In order to smooth the appearance of motion of the tracking graphic $S_{track}$ (e.g., the bounding box), motion interpolation techniques may be used to move the tracking graphic $S_{track}$ for video image frames for which there is no metadata (i.e., due to the different frame rates). The motion interpolation techniques that are applied by the tracking system 60 to the subject S (or the target T) for determining the ROI in successive video images frames discussed above can also be applied to motion of the tracking graphic $S_{track}$ (e.g., the bounding box). Similar to determining the ROI of future video image frames, this motion interpolation of the tracking graphic $S_{track}$ may be done by using a motion model based on one or more previous locations of the bounding box. The motion model can be based on fitting a curve (polynomial, spline), a recursive filter (such as an EKF), or some other method, as described above. For example, the display system 1220 may include a motion modeling module 1222*a* that implements the motion interpolation technique. More particularly, the motion modeling module 1222*a* determines, based on preceding location information (i.e., known location information corresponding in time to one or more previous video image frames), determine modeled location information for video image frames having insufficient (e.g., no) known location information corresponding thereto. Based on the modeled location information, the tracking overlay module 1222, the motion modeling module 1222*a*, or another module generates the tracking graphic $S_{track}$ that the display module 1226 then displays for those video image frames for which the modeled location information is determined and/or insufficient (or no) known location information is available. The motion modeling module 1222*a* may also not be included, or functions of the emotion modeling module 1222*a* may be performed, for example, by the detect and identify module 1218 and/or the metadata module 1219.

Referring to FIGS. 12B and 12C, block diagrams of alternative display systems 1220' and 1220" that may be used with the imaging and tracking system 1210 of the tracking and display system 1100.

Referring to FIG. 12B, a block diagram of various modules of an optimized display system 1220' with a low-latency redundant detect and/or identify module 1228' are shown according to an implementation. Rather than receive separate video and metadata streams from the imaging and tracking system 1210, the display system 1220' instead receives and processes the video stream (e.g., from the video pipe module 1214) to generate the metadata locally (e.g., the tracking graphic $S_{track}$. That is, in order to reduce latency for the display device 52 to the user on the display system 1220" of the external device 50, the video stream may be fed to an input of a redundant detect and/or identify module 1228' on the external device 50 (e.g., being redundant to the detect and identify module 1218 of the imaging and tracking system 1210 of the MIA 20). The display system 1220' includes the video overlay module 1222 and the video decode module 1224, as described previously, but which instead receive the metadata stream and the video stream locally from the redundant detect and identify module 1228'. The tracking efficiency and robustness may additionally be improved by using the motion estimates of the MIA 20 and the estimated position and velocity of the target T as discussed above. In this implementation, the metadata stream may not be needed by the display system 1220' since the metadata is determined by the redundant detect and/or identify module 1228'. The benefit of this is that there may be a lower latency due to the display system 1220' having more processing power and potentially dedicated image processing hardware that can execute the algorithm more quickly without requiring propagation of the metadata.

FIG. 12C is a block diagram of various modules of an optimized display system 1220" using synchronization techniques according to an implementation. As described previously with respect to the imaging and tracking system 1210, the detection and identification functions may add additional latency to the system, and the tracking overlay or other detection/identification metadata output may trail the video frames constituting the video stream.

In the optimized display system 1220", a frame ID for each image frame is associated with the image frame and the metadata of associated with that image frame, and is sent by the imaging and tracking system 1210 with the video stream and with the metadata stream. The system may be pipelined by forwarding the video before the detection algorithm is run. In this optimized display system 1220", both the video stream and the metadata stream arrive at a video and metadata sync module 1228" of the display system 1220", which is able to use the frame ID, which is associated with both the image frames of the video stream and the metadata of the metadata stream, to synchronize the video metadata with the video frames. The metadata sync module 1228" may, for example, employ an elastic buffer that allows the image frames and the metadata to be sync but display such image frames and metadata with a slight lag behind when first received by the display system 1220". The result is that the display device 52 can present the video with its tracking overlay in a synchronized manner while minimizing latency. Use of pipelining can minimize the overall latency, and the synchronizing matches the video to the overlay.

The various systems 1210, 1220 and the modules thereof by one or more of the tracking system 60, the MIA 20, the external device 50, the imaging device 100 and/or various hardware components thereof (e.g., processors, memories, and/or communications components).

Figure 12E:
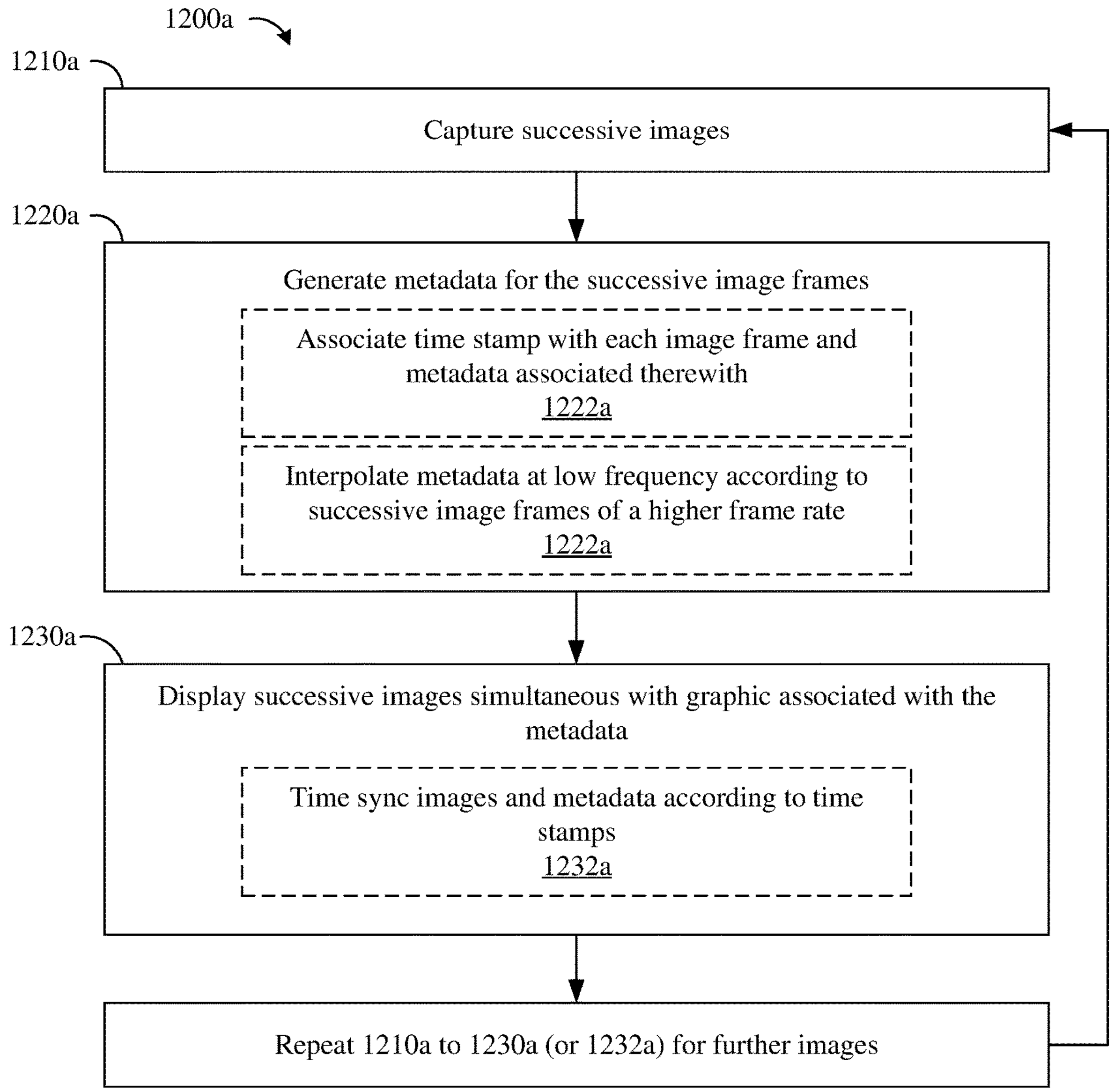
FIG. 12E is a flow diagram of a method implemented by the tracking imaging systems of FIGS. 12A-12C.

Referring to FIG. 12E, a set of operations of the method 1200*a* are described for simultaneously displaying a video image stream and metadata.

At 1210*a*, successive images forming a video stream are captured, for example, by the imaging device 100.

At 1220*a*, metadata is determined from the successive images. For example, the successive images may be processed to determine the metadata as a location and/or a size of a target T therein and/or a bounding box within which the target T is positioned. The metadata may be determined from the successive images remote from a display device, for example, by the MIA 20 (e.g., by the imaging device 20), and then sent as a metadata stream via the link 55 to the external device 50. Alternatively, the metadata may be determined from the successive image frames locally to the display device, for example, by the external device 50 from a video stream sent to the external device 50 via the link 55.

At 1222*a*, a common time stamp is associated with each of the successive images and the metadata associated therewith.

At 1224*a*, the metadata may be interpolated according to the successive images. For example, the metadata may be generated at a lesser frequency than a frame rate at which the successive images are captured (e.g., metadata may be generated at 12 Hz, while the frame rate is 60 fps), such that metadata is associated with every fifth image. For image frames between times at which the metadata is generated, the metadata may be interpolated, for example, according to a motion model (e.g., linear fitting, curve fitting (e.g., polynomial, spline), or a recursive filter).

At 1230*a*, the successive images and a graphic associated with the metadata are simultaneously displayed by a display device, such as the display device 52 of the external device 50. The graphic associated with the metadata may, for example, be a bounding box that is displayed generally around the target T (e.g., being overlaid with the successive images).

At 1232*a*, the successive images and the metadata having the same time stamp are displayed simultaneously. For example, a time buffer may be applied by which the successive images and the metadata associated therewith, which may be received by the display device 52 at different times, may be synced to each other according to the time stamp. Alternatively, the metadata may be generated locally to the display device 52, which may result in lower latency, without the metadata stream being transferred in parallel with the video stream via the link 55.

Operations 1210*a* to 1230*a* (or 1232*a*) are then repeated for still further successive image frames.

FIGS. 13-21 are block diagrams that illustrate several architectures that may be utilized to implement, detect, identify, and draw functionalities as implemented by different components of the movable imaging system 10.

Figure 13:
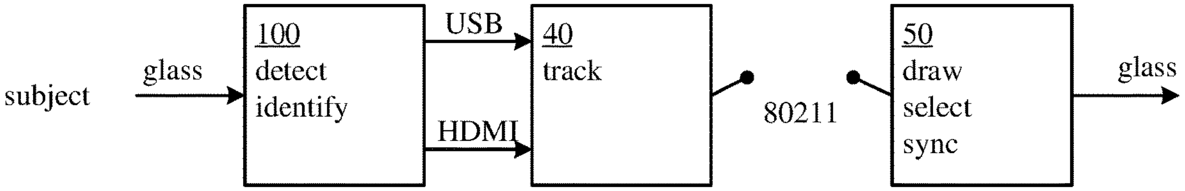
FIGS. 13-21 are block diagrams illustrating various architecture configurations for implementing certain functions of the movable imaging system.

FIG. 13 is a block diagram that illustrates an architecture according to an implementation showing the imaging device 100, movable platform 40, and the external device 50 along with the functionalities of detect, identify, track, draw, select, and synchronize.

Figure 14:
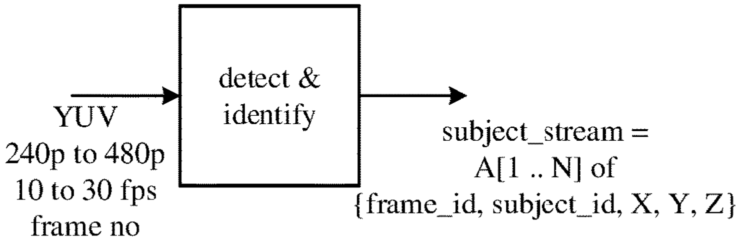

FIG. 14 is a block diagram illustrating the detect and identify functions, which may constitute an image processing block with a frame input and a frame-relative subject stream which contains data related to one or more subjects within the video image frame.

Figure 15:
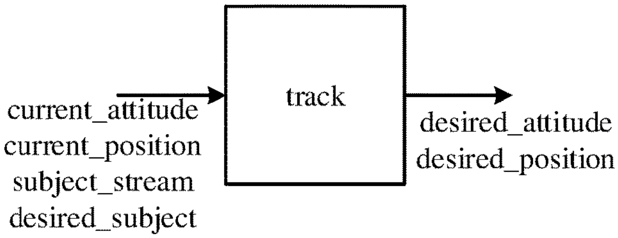

FIG. 15 is a block diagram illustrating the track function, which may use the current attitude and position of the movable platform 40, a subject stream, and a desired subject stream to compute a desired trajectory setpoint.

Figure 16:
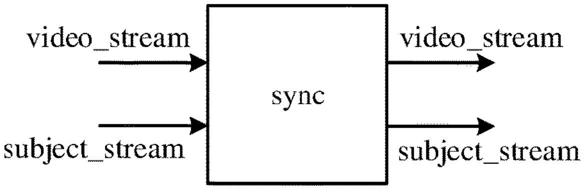

FIG. 16 is a block diagram illustrating the synchronize function (e.g., "sync"), which may be used to implement an elastic buffer to partially or fully align the subject and video stream, although this module may not be necessary if a synchronous architecture is chosen or an asynchronous architecture is chosen with acceptable video and subject layer misalignment.

Figure 17:
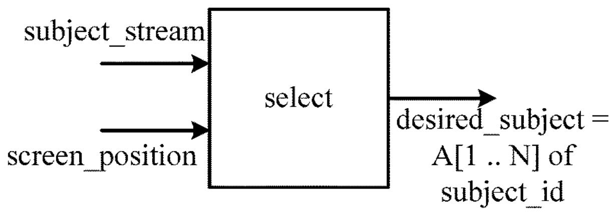

FIG. 17 is a block diagram illustrating the select function that may utilize a user input which is a screen position and the subject stream to compute a desired subject. The purpose of this module is to be able to permit a "touch to select" of a subject on the screen.

Figure 18:
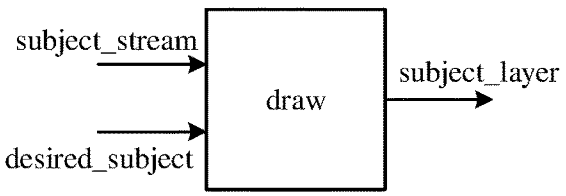

FIG. 18 is a block diagram illustrating a draw function that may use the desired subject stream or all subjects and the subject stream to compute an on-screen display (OSD) overlay layer to be drawn on top of the video stream. The purpose of this module is to visualize the detected and identified subjects on the UI of the external device 50.

Figure 19:
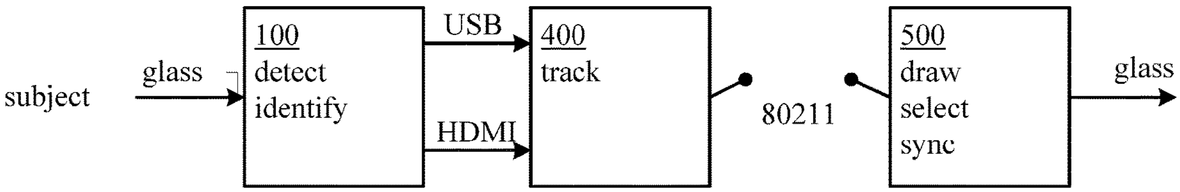

Various alternate solutions can be also provided. For example, FIG. 19 is a block diagram illustrating a distributed solution. In this solution, the detect and identify functions are implemented on the imaging device 100, the track function is implemented on the movable platform 40, and the draw, select, and synchronize functions are implemented on the external device 50.

Figure 20:
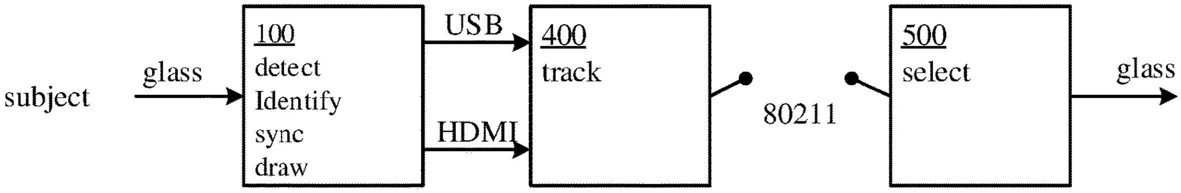

FIG. 20 is a block diagram illustrating a camera-centric solution in which the sync and draw functions are implemented on the imaging device 100 instead of the external device 50.

Figure 21:
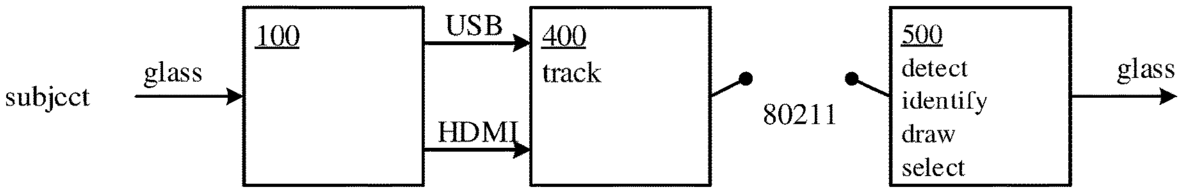

FIG. 21 is a block diagram illustrating a controller-centric solution in which all functionality other than tracking is implemented in the external device 50. In this design, the sync function is not required since this solution is completely synchronous.

In a distributed solution design, the detect and identify modules are implemented and optimized for the imaging device 100. Support may be added to handle a subject stream. The subject stream may contain, e.g., a subject ID, a subject location in the image in, e.g., pixel coordinates, a bounding box around a subject in pixels, a distance to a subject (in an absolute distance or up to scale). The video pipeline may be optimized for low latency and the low resolution video (LRV) stream may be optimized as input for the detect and identify modules. A metadata muxer may be configured to handle a subject stream and to write the subject stream to, e.g., a session mp4 text track. The muxer may be configured to write the subject stream out to a USB/MTP interface.

In the movable platform 40 of the distributed solution design, a USB/MTP interface may be configured to handle a subject stream. A universal asynchronous receiver/transmitter (UART) or other interface may be configured to push the subject stream and desired subject to a flight controller subsystem. A drone command and control (C&C) interface may be configured to handle the desired subject stream. It is possible to implement the sync module before the muxer block, but this design is chosen to implement the sync, if needed, either further up or downstream to minimize the total latency in the system.

In a flight controller of the movable platform 40 for the distributed solution design, the tracking system may be implemented using the subject stream and the desired subject to compute the desired trajectory. A desired MIA 20 trajectory setpoint may be parameterized by, e.g., position, velocity, acceleration, or attitude of the MIA 20. The UART or other interface may be configured to handle the subject stream and the desired subject. A state machine may be configured to implement a tracking state.

The external device 50 in the distributed solution design may be utilized to implement the select, draw, and identify functions as well as any further required UI functions. Optionally, the sync function may be implemented by the external device 50 in order to align the video stream with the subject stream. The native system may be configured to receive the subject stream over the interface of the movable platform 40 and pass it to an application layer. The external device 50 additionally may send the desired subject to the movable platform 40, while an application on the external device 50 may be configured to handle the subject stream and desired subject as well.

The following description is focused on the differences between the camera-centric and distributed solutions. The processor associated with the movable platform 40 and the flight controller implementations need not change. The imaging device 100 in the camera-centric solution is similar to that of the distributed solution with the addition of sync and draw modules being moved to a position before an HDMI or high speed image/data interface.

The following description is focused on the differences between the control-centric and distributed solutions. The processor associated with the movable platform 40 and flight controller implementations need not change. The imaging device 100 of the control-centric solution may have an added feature that extends the USB/MTP interface to receive a subject stream and mux into the session mp4 text track. In this design, the external device 50 may have the detect and identify functions implemented natively, and the draw function may be implemented natively as well. The sync function is removed because the design is synchronous.

Where certain elements of these implementations may be partially or fully implemented using known components, only those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J21ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. A method comprising:

capturing successive video image frames with an imaging device to generate a video;

processing the successive video image frames to determine positions of multiple subjects within the successive video image frames;

obtaining information for the multiple subjects from one or more motion sensors physically attached to respective ones of the multiple subjects;

determining a region of interest containing the multiple subjects in the successive video image frames of the video;

locating a first subject out of the multiple subjects according to the information from the one or more motion sensors;

determining the first subject is within the region of interest at a time based upon previously captured video image frames;

framing the first subject within future video image frames automatically or semi-automatically by adjusting the imaging device based upon the information from the one or more motion sensors;

obtaining additional video image frames that include the multiple subjects with the imaging device;

processing the additional video image frames so that one or more of the multiple subjects are maintained within the additional video image frames;

identifying the first subject out of the multiple subjects within the additional video image frames;

providing live videos that include the first subject to a sharing service via an application in communication with the imaging device;

switching focus from the first subject to a second subject out of the multiple subjects; storing, in a storage module, the successive video image frames including the first subject at the time; and storing a corresponding metadata track with the successive video image frames.

2. The method of claim 1, further comprising:

splitting the successive video image frames into a three by three grid so that the multiple subjects are fitted within the successive video image frames.

3. The method of claim 1, further comprising:

identifying the region of interest in the successive video image frames and processing the region of interest to identify the first subject.

4. The method of claim 3, further comprising:

specifying which of the multiple subjects is a target to be tracked by the imaging device.

5. The method of claim 3, further comprising:

displaying the live videos on external devices via the application.

6. The method of claim 1, further comprising:

synchronizing the video or the additional video image frames captured with the imaging device with the metadata track, wherein the video or the additional video image frames are overlaid with the metadata track so that a tracking graphic is displayed.

7. The method of claim 6, further comprising:

locating one subject of the multiple subjects within the region of interest.

8. The method of claim 1, wherein the region of interest is part of a scene and the multiple subjects are dynamic actors within the scene.

9. The method of claim 8, further comprising: repeating a step of determining a new region of interest, obtaining additional image frames, and processing the additional image frames associated with the new region of interest to track a third subject of the multiple subjects within the new region of interest.

10. The method of claim 1, wherein the imaging device detects the multiple subjects with a fisheye field of view.

11. A method comprising:

capturing successive video image frames of multiple subjects to generate a video comprising the multiple subjects with an image capture device;

processing the successive video image frames to determine positions of the multiple subjects within the successive video image frames;

obtaining information for the multiple subjects from one or more motion sensors physically attached to respective ones of the multiple subjects;

locating the multiple subjects in the successive video image frames according to the information from the one or more motion sensors physically attached to the multiple subjects and information from the video image frames that were previously captured;

determining a region of interest containing the multiple subjects in the successive video image frames;

locating a first subject out of the multiple subjects according to the information from the one or more motion sensors physically attached to the multiple subjects;

determining the first subject is within the region of interest at a time based upon the video image frames that were previously captured;

framing the first subject within future video image frames automatically or semiautomatically by adjusting the imaging device based upon the one or more motion sensors physically attached to the multiple subjects;

obtaining additional video image frames at a subsequent time with the image capture device;

processing the region of interest of the video image frames to locate the multiple subjects individually;

identifying the first subject that was located individually within the additional video image frames;

processing the additional video image frames so that one or more of the multiple subjects are maintained within the additional video image frames;

providing live videos that include the first subject to a sharing service via an application in communication with the image capture device;

switching focus from the first subject to a second subject out of the multiple subjects;

storing, in a storage module, the successive video image frames including the first subject at the time; and storing a corresponding metadata track with the successive video image frames.

12. The method of claim 11, further comprising:

determining a location of at least one of the multiple subjects within the region of interest.

13. The method of claim 12, further comprising:

determining a size of the region of interest;

wherein determining the size of the region of interest includes any of increasing the size of the region of interest and decreasing the size of the region of interest relative to a previous region of interest corresponding to a previous video image frame.

14. The method of claim 12, further comprising:

determining a size of the region of interest according to any of a predicted size of the multiple subjects and a predicted distance between the multiple subjects and the image capture device in real space.

15. The method of claim 11, further comprising:

displaying video clips as live videos on external devices via the application.

16. The method of claim 11, wherein the information from the one or more motion sensors of the multiple subjects includes position information of respective multiple subjects relative to real space.

17. The method of claim 16, further comprising:

tracking the first subject as the first subject moves within an area monitored by the image capture device.

18. An imaging system comprising:

a platform;

an imaging device in communication with the platform and configured to capture successive video image frames that form a video; and motion sensors associated with multiple subjects and the imaging device, wherein the imaging device is configured to:

process the successive video image frames to determine positions of the multiple subjects within the successive video image frames;

obtain information for the multiple subjects from the motion sensors physically attached to respective ones of the multiple subjects;

maintain the multiple subjects in the video image frames by locating a region of interest for additional video image frames of the multiple subjects;

locate a first subject of the multiple subjects according to information from the motion sensors;

determine the first subject is within the region of interest at a time based upon previously captured video image frames;

frame the first subject within future video image frames automatically or semi-automatically by adjusting the imaging device based upon the information from the motion sensors;

obtain additional video image frames that include the multiple subjects;

process the additional video image frames so that one or more of the multiple subjects are maintained within the additional video image frames;

identify the first subject out of the multiple subjects within the additional video image frames;

provide live videos that include the first subject to a sharing service via an application in communication with the imaging device; and switch focus from the first subject to a second subject out of the multiple subjects, a storage module configured to store the successive video image frames including the first subject at the time and a corresponding metadata track.

19. The imaging system of claim 18, wherein the imaging system is configured to display a bounding box around the first subject.

20. The imaging system of claim 19, wherein the motion sensors further provide coordinates of one of the multiple subjects wearing at least one of the motion sensors.

* * * * *